(12) United States Patent
Brubaker

(10) Patent No.: US 10,740,796 B2
(45) Date of Patent: Aug. 11, 2020

(54) SYSTEMS, METHODS, AND DEVICES FOR GENERATING CRITICAL MASS IN A MOBILE ADVERTISING, MEDIA, AND COMMUNICATIONS PLATFORM

(71) Applicant: BCAT, LLC, Monarch Bay, CA (US)

(72) Inventor: Curtis M. Brubaker, Monarch Bay, CA (US)

(73) Assignee: BCAT, LLC, Monarch Bay, CA (US)

( * ) Notice: Subject to any disclaimer, the term of this patent is extended or adjusted under 35 U.S.C. 154(b) by 601 days.

(21) Appl. No.: 15/413,120

(22) Filed: Jan. 23, 2017

(65) Prior Publication Data

US 2017/0200197 A1 Jul. 13, 2017

Related U.S. Application Data

(63) Continuation of application No. PCT/US2015/042040, filed on Jul. 24, 2015.
(Continued)

(51) Int. Cl.
*G06Q 30/00* (2012.01)
*G06Q 30/02* (2012.01)
(Continued)

(52) U.S. Cl.
CPC ....... *G06Q 30/0266* (2013.01); *B60Q 1/2619* (2013.01); *B60Q 1/2696* (2013.01); *B60Q 1/30* (2013.01); *B60Q 1/503* (2013.01); *G06Q 30/0241* (2013.01); *G06Q 30/0275* (2013.01); *G08G 1/0965* (2013.01); *G08G 1/167* (2013.01); *G09F 9/30* (2013.01); *G09F 9/35* (2013.01); *G09F 21/048* (2013.01); *G09F 27/00* (2013.01); *B60Q 1/24* (2013.01); *B60Q 1/50* (2013.01);
(Continued)

(58) Field of Classification Search
None
See application file for complete search history.

(56) References Cited

U.S. PATENT DOCUMENTS

D246,772 S 12/1977 Brubaker
D246,775 S 12/1977 Brubaker
(Continued)

FOREIGN PATENT DOCUMENTS

CN 1325100 12/2001
CN 2573322 9/2003
(Continued)

OTHER PUBLICATIONS

Evans, Scott, "German Firm EDAG Previews 'Light Car' Concept Ahead of Geneva Debut", published Jan. 20, 2009, pp. 3.
(Continued)

*Primary Examiner* — Michael W Schmucker
(74) *Attorney, Agent, or Firm* — Knobbe, Martens, Olson & Bear, LLP

(57) ABSTRACT

Methods and systems relating to a vehicle display are provided. One or more exterior vehicle body panels having an integral visual display portion are configured to show digital content and conform to the contours of the one or more exterior body panels. The visual display portion includes a light emitting portion and a covering portion. Additionally, one or more processors are configured to generate a signal received by the visual display portion and affect the digital content displayed by the visual display portion.

19 Claims, 41 Drawing Sheets

Related U.S. Application Data

(60) Provisional application No. 62/028,795, filed on Jul. 24, 2014.

(51) Int. Cl.

| | | |
|---|---|---|
| *B60Q 1/50* | (2006.01) | |
| *G08G 1/16* | (2006.01) | |
| *G09F 9/35* | (2006.01) | |
| *G09F 9/30* | (2006.01) | |
| *G09F 21/04* | (2006.01) | |
| *G09F 27/00* | (2006.01) | |
| *G08G 1/0965* | (2006.01) | |
| *B60Q 1/26* | (2006.01) | |
| *B60Q 1/30* | (2006.01) | |
| *G02F 1/1333* | (2006.01) | |
| *B60Q 1/24* | (2006.01) | |
| *G08G 1/0967* | (2006.01) | |
| *G08G 1/00* | (2006.01) | |

(52) U.S. Cl.
CPC ............ *G02F 2001/133314* (2013.01); *G02F 2001/133331* (2013.01); *G08G 1/096716* (2013.01); *G08G 1/096783* (2013.01); *G08G 1/166* (2013.01); *G08G 1/202* (2013.01)

(56) References Cited

U.S. PATENT DOCUMENTS

| | | | |
|---|---|---|---|
| 4,080,922 | A | 3/1978 | Brubaker |
| 5,150,116 | A | 9/1992 | West |
| 5,481,257 | A | 1/1996 | Brubaker et al. |
| 6,150,930 | A | 11/2000 | Cooper |
| 6,484,148 | B1 | 11/2002 | Boyd |
| 6,545,596 | B1 | 4/2003 | Moon |
| 6,587,755 | B1 | 7/2003 | Smith et al. |
| 6,812,851 | B1 | 11/2004 | Dukach et al. |
| 7,659,808 | B1 | 2/2010 | Cooper et al. |
| 9,147,192 | B2 | 9/2015 | Dawson et al. |
| 9,183,572 | B2 | 11/2015 | Brubaker |
| 9,293,042 | B1 * | 3/2016 | Wasserman ...... H04N 21/41422 |
| 9,299,077 | B2 | 3/2016 | Brubaker |
| 9,607,510 | B1 | 3/2017 | DeLorean |
| 9,759,420 | B1 * | 9/2017 | Baloga ................ F21V 33/0012 |
| 9,878,666 | B2 | 1/2018 | Brubaker |
| 10,293,750 | B2 | 5/2019 | Brubaker |
| 2001/0013016 | A1 | 8/2001 | Hunter |
| 2002/0009978 | A1 | 1/2002 | Dukach et al. |
| 2002/0084891 | A1 * | 7/2002 | Mankins ............. B60Q 1/2611 340/425.5 |
| 2002/0135515 | A1 | 9/2002 | Rankin et al. |
| 2002/0164962 | A1 | 11/2002 | Mankins et al. |
| 2002/0167416 | A1 | 11/2002 | Polyakov |
| 2003/0006911 | A1 | 1/2003 | Smith et al. |
| 2003/0050744 | A1 | 3/2003 | Saraiva |
| 2003/0195670 | A1 | 10/2003 | Smith et al. |
| 2004/0008157 | A1 | 1/2004 | Brubaker et al. |
| 2004/0036622 | A1 | 2/2004 | Dukach et al. |
| 2004/0226204 | A1 | 11/2004 | Green |
| 2005/0012598 | A1 | 1/2005 | Berquist |
| 2005/0024189 | A1 | 2/2005 | Weber |
| 2005/0091890 | A1 | 5/2005 | Snyder |
| 2005/0231385 | A1 | 10/2005 | Haase |
| 2005/0253699 | A1 | 11/2005 | Madonia |
| 2006/0213100 | A1 | 9/2006 | McCann |
| 2007/0030212 | A1 | 2/2007 | Shibata |
| 2007/0079331 | A1 | 4/2007 | Datta et al. |
| 2007/0112762 | A1 | 5/2007 | Brubaker |
| 2007/0115138 | A1 | 5/2007 | Arakawa |
| 2007/0132664 | A1 | 6/2007 | Weissman |
| 2008/0030427 | A1 * | 2/2008 | Lanham ................ G06Q 30/02 345/2.3 |
| 2008/0068455 | A1 | 3/2008 | Pratt |
| 2008/0085985 | A1 * | 4/2008 | Nakamura ............. C08L 63/00 528/25 |
| 2008/0231067 | A1 | 9/2008 | Nagle |
| 2009/0208109 | A1 | 8/2009 | Kakinami et al. |
| 2009/0299857 | A1 * | 12/2009 | Brubaker ............... G06Q 30/02 705/14.66 |
| 2010/0036717 | A1 | 2/2010 | Trest |
| 2011/0066324 | A1 | 3/2011 | Odland et al. |
| 2011/0295697 | A1 | 12/2011 | Boston et al. |
| 2012/0044429 | A1 | 2/2012 | Guerra |
| 2013/0231828 | A1 | 9/2013 | Seal |
| 2013/0265414 | A1 | 10/2013 | Yoon et al. |
| 2013/0325629 | A1 | 12/2013 | Harrison |
| 2014/0078407 | A1 | 3/2014 | Green et al. |
| 2014/0098229 | A1 | 4/2014 | Lu et al. |
| 2014/0247160 | A1 | 9/2014 | Glascock |
| 2014/0316900 | A1 | 10/2014 | Amla et al. |
| 2014/0379475 | A1 | 12/2014 | Sarangi |
| 2015/0194082 | A1 | 7/2015 | McEwan |
| 2015/0266421 | A1 | 9/2015 | Brubaker |
| 2015/0282346 | A1 | 10/2015 | Ganim et al. |
| 2015/0317687 | A1 | 11/2015 | Ramesh et al. |
| 2015/0365306 | A1 * | 12/2015 | Chaudhri ............. G06F 3/0416 715/736 |
| 2016/0110759 | A1 | 4/2016 | Polehn et al. |
| 2016/0140614 | A1 | 5/2016 | Brubaker |
| 2018/0304810 | A1 | 10/2018 | Brubaker |
| 2019/0061318 | A1 | 2/2019 | Jung et al. |
| 2019/0213931 | A1 | 7/2019 | Brubaker |

FOREIGN PATENT DOCUMENTS

| | | |
|---|---|---|
| CN | 101444003 | 5/2009 |
| CN | 101689340 | 3/2010 |
| CN | 202029737 | 11/2011 |
| CN | 103886482 | 6/2014 |
| JP | 02-093147 | 7/1990 |
| JP | 03-290689 | 12/1991 |
| JP | 3020426 U | 1/1996 |
| JP | 10-207413 | 8/1998 |
| JP | 11-065434 | 3/1999 |
| JP | 2000-071895 | 3/2000 |
| JP | 2002-006293 | 1/2002 |
| JP | 2003-125379 | 4/2003 |
| JP | 2003-131604 | 5/2003 |
| JP | 2003-186777 | 7/2003 |
| JP | 2003-252153 | 9/2003 |
| JP | 2004-029572 | 1/2004 |
| JP | 2004-070181 | 3/2004 |
| JP | 2004-072475 | 3/2004 |
| JP | 2004-271738 | 9/2004 |
| JP | 2004-272007 | 9/2004 |
| JP | 2004-279509 | 10/2004 |
| JP | 2005-164858 | 6/2005 |
| JP | 2005-173836 | 6/2005 |
| JP | 2006-285225 | 10/2006 |
| JP | 2007-526165 | 9/2007 |
| JP | 2013-209697 | 10/2013 |
| KR | 10-2000-0062502 | 10/2000 |
| KR | 10-2001-0081864 | 8/2001 |
| KR | 10-2002-0025393 | 4/2002 |
| KR | 10-2005-0008281 | 1/2005 |
| KR | 10-2005-0043353 | 5/2005 |
| KR | 10-2005-0072369 | 7/2005 |
| RU | 145277 | 9/2014 |
| WO | WO 2006/136847 | 12/2006 |
| WO | WO 2007/109541 | 9/2007 |
| WO | WO-2008019105 A2 | 2/2008 |
| WO | WO-2011/080715 | 7/2011 |
| WO | WO 2016/014966 | 1/2016 |
| WO | WO 2017/180900 | 10/2017 |

OTHER PUBLICATIONS

Paukert, Chris, "Geneva 2009: Clever EDAG "Light Car Open-Source" is like safety television for tailgaters", http://www.autoblog.com/2009/03/03/geneva-2009-clever-edag-light-car-open-source-is-like-safety/, published Mar. 3, 2009, pp. 2.

(56) References Cited

OTHER PUBLICATIONS

Reid, Rory, "Light Car—Open Source: Bringing OLED TVs to the Streets", http://www.cnet.com/roadshow/pictures/light-car-open-source-bringing-oled-tvs-to-the-streets/, published Mar. 4, 2009, pp. 7.
Official Communication received in Chinese Patent Application No. 200780017509.5 dated Mar. 1, 2012 in 3 pages.
International Preliminary Report on Patentability and Written Opinion received in PCT Application No. PCT/US2007/064175 dated Sep. 16, 2008 in 8 pages.
International Preliminary Report on Patentability and Written Opinion received in PCT Application No. PCT/US2015/042040 dated Feb. 2, 2017 in 10 pages.
International Search Report and Written Opinion received in PCT Application No. PCT/US2007/064175 dated Oct. 12, 2007 in 8 pages.
Official Communication received in Chinese Patent Application No. 201310310267.6 dated Dec. 15, 2015 in 12 pages.
Official Communication received in Chinese Patent Application No. 201310310267.6 dated Oct. 31, 2016 in 3 pages.
Official Communication received in European Patent Application No. 07758697.2 dated Apr. 13, 2017 in 4 pages.
Official Communication received in European Patent Application No. 07758697.2 dated Apr. 25, 2014 in 4 pages.
Official Communication received in Indian Patent Application No. 8686/DELNP/2008 dated Jun. 24, 2016 in 8 pages.
Official Communication received in Japanese Patent Application No. 2009-500627 dated Jun. 30, 2015 in 1 page.
Official Communication received in Japanese Patent Application No. 2009-500627 dated Oct. 28, 2014 in 7 pages.
Official Communication received in Japanese Patent Application No. 2013-207242 dated Oct. 7, 2014 in 4 pages.
Official Communication received in Japanese Patent Application No. 2013-207242 dated Sep. 6, 2016 in 10 pages.
Official Communication received in Japanese Patent Application No. 2015-214596 dated Jan. 10, 2017 in 4 pages.
Official Communication received in Korean Patent Application No. 10-2008-7025185 dated Apr. 29, 2015 in 2 pages.
Official Communication received in Korean Patent Application No. 10-2008-7025185 dated Dec. 28, 2012 in 5 pages.
Official Communication received in Korean Patent Application No. 10-2008-7025185 dated Jun. 3, 2014 in 6 pages.
Official Communication received in Korean Patent Application No. 10-2008-7025185 dated May 25, 2012 in 5 pages.
Official Communication received in Korean Patent Application No. 10-2008-7025185 dated Nov. 26, 2013 in 4 pages.
Official Communication received in Korean Patent Application No. 10-2013-7017232 dated Dec. 22, 2014 in 2 pages.
Official Communication received in Korean Patent Application No. 10-2014-7033391 dated Mar. 30, 2016 in 6 pages.
Official Communication received in Korean Patent Application No. 10-2014-7033391 dated May 21, 2015 in 3 pages.
Official Communication received in Korean Patent Application No. 10-2017-7006678 dated Jul. 3, 2017 in 4 pages.
Felton, Ryan, "The Fully-Autonomous Electric Smart ForTwo Concept Car Has a Grille That Will Greet You With 'Hey'", https://web.archive.org/web/20170913205308/http://jalopnik.com/the-fully-autonomous-electric-smart-fortwo-concept-car-1798631981, Aug. 30, 2017, pp. 5.
International Search Report and Written Opinion received in PCT Application No. PCT/US2017/027464 dated Aug. 17, 2017 in 6 pages.
Torchinsky, Jason, "The Mercedes-Benz Concept EQA Shows How Mercedes Can Phone in an Electric Hatch With a TV for a Grille", https://web.archive.org/web/20170913210224/http://jalopnik.com/the-mercedes-benz-concept-eqa-shows-how-mercedes-can-ph-1803775986, Sep. 12, 2017, pp. 5.
U.S. Appl. No. 13/847,925, filed Mar. 20, 2013.
U.S. Appl. No. 13/860,891, filed Apr. 11, 2013.
U.S. Appl. No. 61/613,898, filed Mar. 21, 2012.
International Search Report and Written Opinion dated Apr. 22, 2016 for International Application PCT No. PCT/US2015/042040.
Orlove, R. The Secrets of the Rig That Can Transform Into Any Car. Sep. 7, 2016. Available at http://jalopnik.com/the-secrets-of-the-rig-that-can-transform-into-any-car-1786339083. Accessed Mar. 6, 2017.
Misener, Dan, "Billboards Deliver Targeted Ads by Identifying Your Car", CBC News, https://www.cbc.ca/news/technology/vehicle-recognition-1.3695631 Posted Jul. 26, 2016, pp. 5.
Toyota USA, "Fun Vii Concept Car", https://www.youtube.com/watch?v=ZOAC_sPCWME Published on Dec. 20, 2012, pp. 3.
International Preliminary Report on Patentability and Written Opinion received in PCT Application No. PCT/US2017/027464 dated Oct. 25, 2018 in 6 pages.
Official Communication received in European Patent Application No. 15824646.2 dated Oct. 18, 2018 in 11 pages.
Official Communication received in Japanese Patent Application No. 2015-214596 dated Jun. 5, 2018 in 5 pages.
Official Communication received in Korean Patent Application No. 10-2017-7006678 dated May 28, 2018 in 5 pages.
Youtube, page and screenshot of "Adroady #1st mobile digital out-of-home media", https://www.youtube.com/watch?v=4WsO_3odMbc, retrieved Nov. 19, 2018, 4 pages.
Adroady, Digital Mobile OOH Network, https://adroady.com/, retrieved Nov. 19, 2018, 7 pages.
Official Communication received in Japanese Patent Application No. 2009-500627 dated Apr. 2, 2013 in 5 pages.
Official Communication received in Japanese Patent Application No. 2015-214596 dated Nov. 28, 2017 in 3 pages.
Official Communication received in European Patent Application No. 07758697.2 dated Dec. 20, 2018 in 7 pages.
Official Communication received in Japanese Patent Application No. 2017-503091 dated Apr. 16, 2019 in 5 pages.
Firefly, https://www.fireflyon.com/ as capture via Page-Vault.com Sep. 20, 2019 in 7 pages.
Firefly—Agencies, https://www.fireflyon.com/agencies as captured via Page-Vault.com Sep. 20, 2019 in 3 pages.
Firefly—Blog, https://www.fireflyon.com/blog as captured via Page-Vault.com Sep. 20, 2019 in 1 page.
Firefly—Blog, https://www.fireflyon.com/blog with contact tab shown as captured via Page-Vault.com Sep. 20, 2019 in 1 page.
Firefly—Brands, https://www.fireflyon.com/brands with contact tab shown as captured via Page-Vault.com Sep. 20, 2019 in 3 pages.
Firefly—Jobs, https://jobs.lever.co/fireflyon as captured via Page-Vault.com Sep. 20, 2019 in 4 pages.
Firefly—Measurable Outdoor Advertising, https://www.fireflyon.com/measurable-outdoor as captured via Page-Vault.com Sep. 20, 2019 in 3 pages.
Firefly—Press, https://www.fireflyon.com/press as captured via Page-Vault.com Sep. 20, 2019 in 2 pages.
Geopath, https://www.geopath.org as captured via Page-Vault.com Sep. 20, 2019 in 8 pages.
Geopath—GeekOUT, https://www.geopath.org/geekout as capture via Page-Vault.com Sep. 20, 2019 in 5 pages.
Geopath—News, https://www.geopath.org/news as captured via Page-Vault.com Sep. 20, 2019 in 3 pages.
Geopath—Our Organization, https://www.geopath.org/our-org as captured via Page-Vault.com Sep. 20, 2019 in 4 pages.
Geopath—Tools, https://www.geopath.org/tools as captured via Page-Vault.com Sep. 20, 2019 in 2 pages.
Lightout, https://www.lightout.com/ as captured via Page-Vault.com Sep. 20, 2019 in 4 pages.
Lightout—About https://www.lightout.com/about-us as captured via Page-Vault.com Sep. 20, 2019 in 4 pages.
Lightout Blog, https://www.lightout.com/blog as captured via Page-Vault.com Sep. 20, 2019 in 4 pages.
Lightout—Careers, https://www.lightout.com/careers as captured via Page-Vault.com Sep. 20, 2019 in 2 pages.
Lightout—Cities, https://www.lightout.com/cities as captured via Page-Vault.com Sep. 20, 2019 in 2 pages.
Lightout—Drivers, https://www.lightout.com/drivers as captured via Page-Vault.com Sep. 20, 2019 in 3 pages.
Lightout—Frequently Asked Questions, https://www.lightout.com/faq as captured via Page-Vault.com Sep. 20, 2019 in 2 pages.

(56) References Cited

OTHER PUBLICATIONS

Lightout—Nonprofits, https://www.lightout.com/nonprofits as captured via Page-Vault.com Sep. 20, 2019 in 2 pages.
Lightout—The Fin, https://www.lightout.com/fin as captured via Page-Vault.com Sep. 20, 2019 in 4 pages.
Lightout—The Portal, https://www.lightout.com/portal as captured via Page-Vault.com Sep. 20, 2019 in 4 pages.
Official Communication received in Chinese Patent Application No. 201580052015.5 dated Nov. 4, 2019 in 5 pages.
Official Communication received in European Patent Application No. 07758697.2 dated Nov. 5, 2019 in 20 pages.
Official Communication received in European Patent Application No. 17783153.4 dated Oct. 24, 2019 in 9 pages.
Roderick, Leonie, "Renault Tries 'Not to be Creepy' as it uses Vehicle-Scanning Tech to Personalise Outdoor Ads", Jul. 13, 2016, https://www.marketingweek.com/renault-on-trying-not-to-be-creepy-as-it-uses-vehicle-recognition-tech-for-campaign/.

* cited by examiner

FIG. 2A
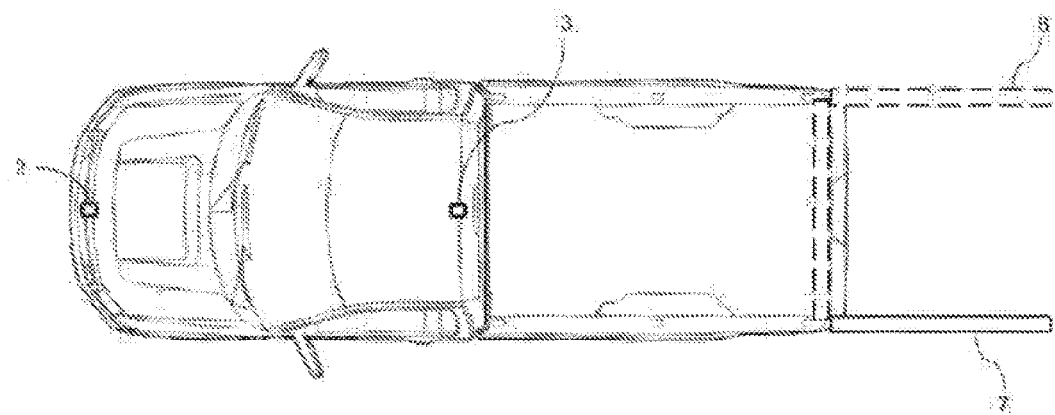
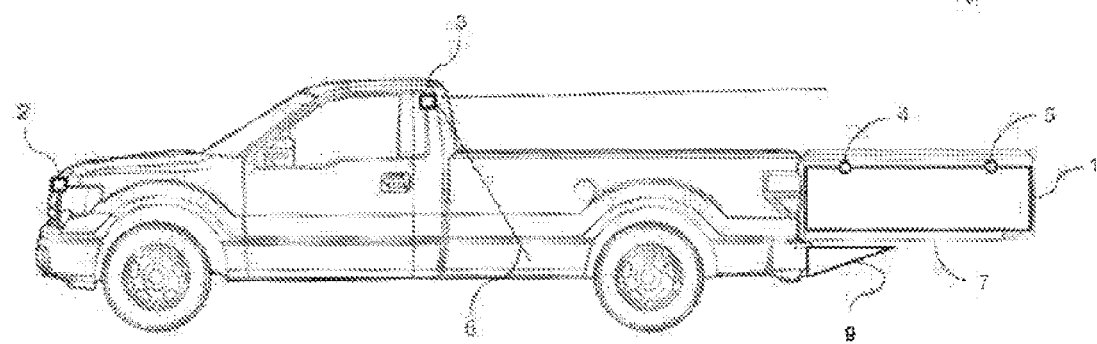
FIG. 2B

FIG. 7
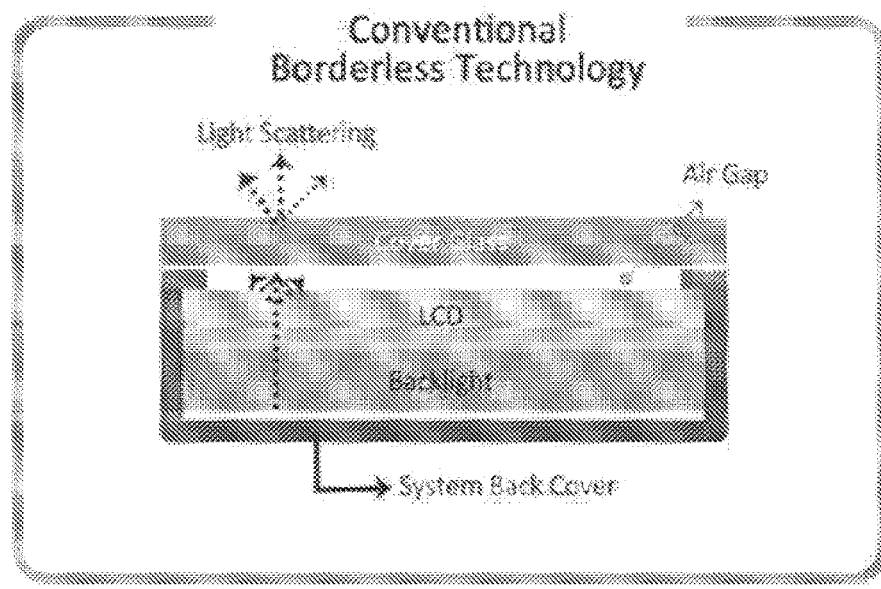
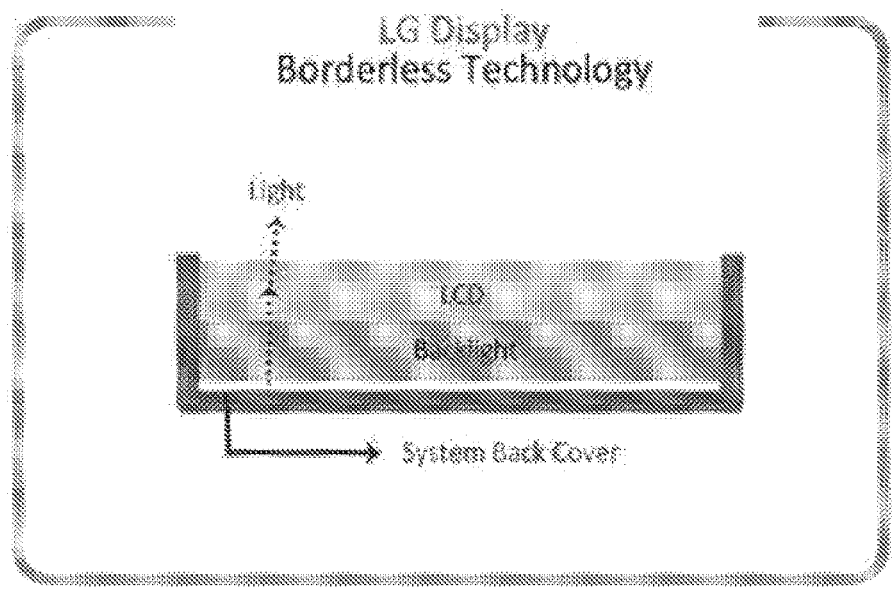
FIG. 8

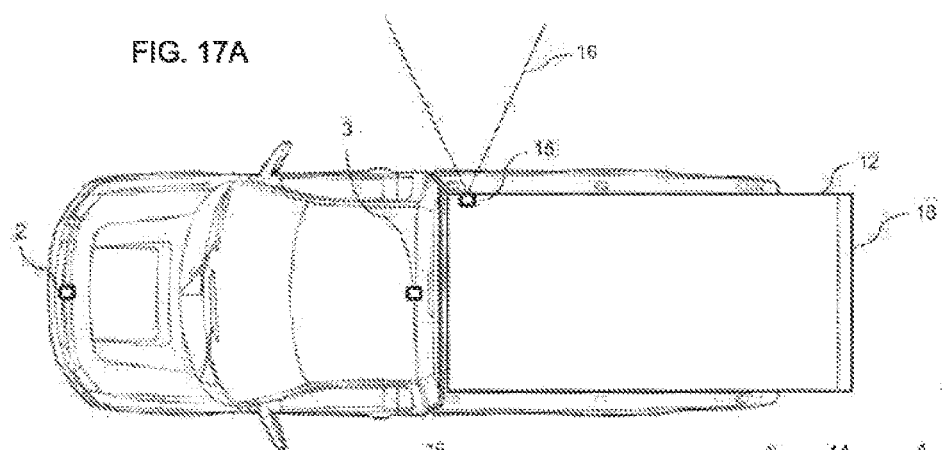
FIG. 17A
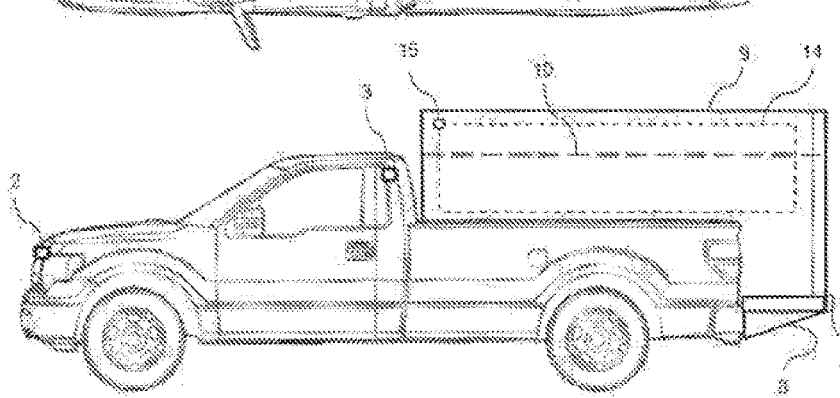
FIG. 17B
FIG. 17C

Amazon's Smile Box

SYSTEMS, METHODS, AND DEVICES FOR GENERATING CRITICAL MASS IN A MOBILE ADVERTISING, MEDIA, AND COMMUNICATIONS PLATFORM

CROSS-REFERENCE

This application is a continuation application of International Application No. PCT/US2015/042040, filed Jul. 24, 2015, which claims priority to U.S. Provisional Patent Application Ser. No. 62/028,795, filed Jul. 24, 2014, which is entirely incorporated herein by reference. Additionally, this application is related to U.S. patent application Ser. No. 12/293,277, filed Jan. 20, 2009, the disclosure of which is entirely incorporated herein by reference.

BACKGROUND OF THE INVENTION

Pickup tracks have traditionally been year over year the largest selling vehicle segment worldwide. Pickup truck owners use pickup trucks for multiple applications, varied professions, small business individual use to large fleet deployments, for business or personal reasons in all climates and environments from deserts to mountains, cities to farms, open road to urban traffic—nationwide or globally.

SUMMARY OF THE INVENTION

Disclosed are systems and methods that may be used to benefit large numbers of people by contributing to 1) transportation and 2) self-employment in the field of Mobile Advertising and/or On-Demand Delivery (also referred to as; Same Day Delivery (SDD) or Last-Mile Delivery). In examples, systems and methods as provided herein may be used so build user critical mass for a unique advertising and media platform by adopting platform technology that may be used with pickup trucks. Additionally, systems and methods provided herein may be used to incentivize pickup track sales, lease, use, and platform ownership through the generation of personal incomes from the display of commercial or non-commercial content on the pickup truck's exterior surfaces. Additionally, a computer driven application ("App") may be enabled for use with the platform to enhance and sustain the platform owner's ability to earn revenue.

In examples, revenue may be generated from, the display of content on the exterior surfaces of fixed or moving objects. Additionally, an optimum number of volume-produced objects may be simultaneously engaged for this purpose within the least amount of time. In other examples, revenue that is generated from the display of content on the exterior surfaces of said fixed or moving volume-produced objects may be applied towards the purchase of those objects. Further, a dedicated computer application to be used with said fixed or moving volume-produced objects, to enable, enhance, sustain, and/or optimize said object's abilities to generate revenue, facilitate use (work), measure performance, and harvest big data.

INCORPORATION BY REFERENCE

All publications, patents, and patent applications mentioned in this specification are herein incorporated by reference to the same extent as if each individual publication, patent, or patent application was specifically and individually indicated to be incorporated by reference. In particular, this application incorporates by reference U.S. patent application Ser. No. 13/860,891, filed Apr. 10, 2012; U.S. patent application Ser. No. 13/847,925, filed Mar. 30, 2013; U.S. patent application Ser. No. 14/663,352, filed Mar. 19, 2015; and U.S. Patent Application Publication No. 2007/0112762, filed Oct. 25, 2006.

BRIEF DESCRIPTION OF THE DRAWINGS

The novel features of the invention are set forth with particularity in the appended claims, A better understanding of the features and advantages of She invention may be obtained by reference to the following detailed description that sets forth illustrative embodiments, in which the principles of the invention are utilized, and the accompanying drawings of which:

FIG. 2A illustrates a bird's eye view of a hyper-relevant digital surface integrated into a tailgate that is swung open about a side hinge, in accordance with embodiments of the invention.

FIG. 2B illustrates a side view of a hitch-mounted tailgate accessory shelf and a hyper-relevant digital surface integrated into a tailgate that is swung open about a side hinge, in accordance with embodiments of the invention.

FIG. 7 illustrates a cross section of a digital structure having an air gap between a covered glass layer and an LCD layer, in accordance with embodiments of the invention.

FIG. 8 illustrates a cross section of a digital structure having an uncovered LCD layer, in accordance with embodiments of the invention.

FIG. 17A illustrates a bird's eye view of a storage module that, is fitted into a cargo bed of a vehicle, in accordance with embodiments of the invention.

FIG. 17B illustrates a side view of a storage module that is fitted into a cargo bed of a vehicle that has a hitch-mounted tailgate accessory shelf, in accordance with embodiments of the invention.

FIG. 17C illustrates a rear view of a storage module that is fitted into a cargo bed of a vehicle that has a hitch-mounted tailgate accessory shelf, in accordance with embodiments of the invention.

DETAILED DESCRIPTION OF THE INVENTION

Figure 1A:
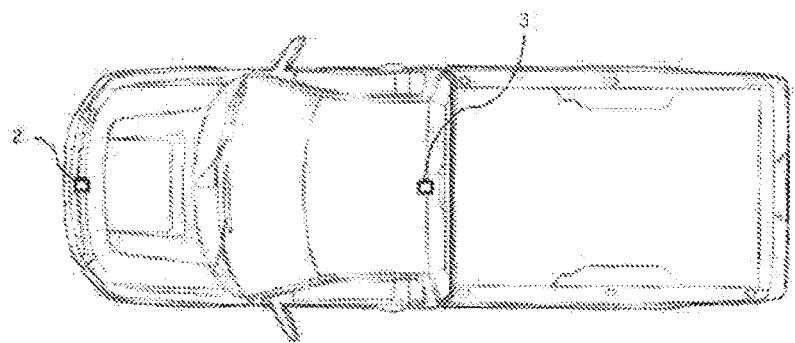
FIG. 1A illustrates a bird's eye view of cameras mounted on a vehicle and networked to a hyper-relevant digital surface, in accordance with embodiments of the invention.

While various embodiments of the invention have been shown and described herein, it may be obvious to those skilled in the art that such embodiments are provided by way of example only. Numerous variations, changes, and substitutions may occur to those skilled in the art without departing from the invention, ft should be understood that various alternatives to the embodiments of the invention described herein may be employed.

Tailgate Video Communications System

Examples of tailgate video communications systems are provided. In particular, systems and methods are disclosed for replacing a standard production pickup truck tailgate with a tailgate that incorporates an integrated video display. The video display may be partially integrated into the tailgate. Alternatively, the video display may be fully integrated into the tailgate. The video display may be rear-facing. Additionally, the video display that is integrated into the tailgate may be connected to a special-purpose DVR with content storage, microprocessors, an audio system, receivers, transmitters, remote controls, and/or a multi-camera video security/sensor network. In examples, the components of the special-purpose DVR may be used for high-volume OEM or retrofit production yielding an advanced Vehicle to Vehicle ("V2V")/Vehicle to Infrastructure ("V2I") mobile media & communications network. Additionally, the V2V or V2I may produce revolutionary income streams; a novel, affordable vehicle purchase or lease financing; and/or an innovative, vehicle owner/user application ("App") which may mitigate the costs of transporting people or one or more payloads. Additionally, examples of revenue generation may be sustained by keeping vehicles equipped with tailgate video communication systems active and on the road.

Accordingly, disclosed is a system and method for producing a robust, all-weather, glass-surfaced or glass-encased video display designed for installation, into the same space occupied by an original tailgate of a basic pickup truck. Systems and methods of tailgate video communication systems as provided herein may attractively conform to a truck's underlying original design and character lines as well as a vehicle's utility and operation. In examples, the tailgate video communications systems may serve as a personal outdoor television system. Additionally, in examples, a tailgate video communications system may form a new, self-contained tailgate assembly which may be configured to replace an original tailgate system. A system of hardware and software may be provided so as to display hyper-relevant advertising, personalized content, and social media in s mobile environment on exterior digital video surface. In particular, the content may be displayed on differing types of fixed or moving objects. In example, the content may be displayed on a new, manufactured, or retrofitted production vehicle tailgate, door, hatch, deck, glazing, illumination panels or any similarly-contoured body panel of a motor vehicle.

Examples of disclosed systems and embodiments may be used to enable a creation of a solid-state outdoor digital television in a unique aspect ratio which by design can consume the full-width and full-height of a standard pickup truck tailgate (of approximately 60×24 inches) for the side by side presentation of two standard aspect ratio of 16:9 flat screen televisions for full-motion HDTV video, special-purpose content, and/or real-time imagery. The video, content, and/or imagery may be captured for storage using on-board or remote cameras. Additionally, the video, content, and/or imagery may be displayed to nearby, or immediately following (tandem), motor vehicles, cyclists, pedestrians, or seated viewers. In examples, video, content, and/or imagery that is displayed using a tailgate video communications system may be requested from vehicles, networks, or mobile devices that are near to a vehicle having the tailgate video communication system.

Examples of system features of a tailgate video communications system may include an integrated GPS/video security and tracking system. The integrated security and tracking system may interact with other moving objects. Additionally or alternatively, the integrated security and tracking system may interact with networks on an ad hoc basis to enable content targeting, facial & brand recognition, system security, theft prevention, tailgate, or vehicle tracking & recovery. Additionally, the integrated security and tracking system may interact with social media/social fulfillment hyper-App created expressly for pickup truck owners & operators. In examples, the integrated security and tracking system may interact with an App that includes a financial rewards model that may be configured to compensate consumers for the use of their vehicles as billboards as well as for membership in a unique pickup truck/enthusiast user base & community.

Additionally, systems and methods may also be provide a unique Vehicle Purchase or Lease Financial Model that may be designed to make vehicles which use the invention available to a lessee who might otherwise find it difficult to obtain such a vehicle. In particular, the model may work with a specialized computer-assisted owner/user business computer Application ("App") that may be designed to engage new purchasers or lessees, should they wish to, in the business of OnDemand or Same Day/Same Hour Delivery. In examples, lessees may find that their efforts are compensated fully or in part by Mobile Digital Out Of Home video advertising that may be displayed to viewers operating other vehicles, or to nearby pedestrians, while the lessees are operating their own vehicles.

Further, systems and methods for utilizing Hyper-Relevant Digital Surfaces (HDSs) are provided herein, in particular, HDSs may be used in the context of producing video displays that may be integrated with vehicle body panels.

FIGS. 1A-1D illustrate views of cameras mounted on a vehicle and networked to a hyper-relevant digital surface (HDS), in accordance with embodiments of the invention. In particular, a high aspect ratio custom-made flat-wrapped or compound curved glass, optically bonded OLED digital display with infra red controller/sensor under glass is provided as component 1 in FIGS. 1A-1D. Additionally, a nose-mounted camera is provided as component 2; a payload monitoring video camera and rear-looking targeting/vehicle recognition/security camera is mounted inside or outside a truck cab is provided as component 3; a camera with this same functionality is/or can be provided as component 4; a backup camera can be included with the foregoing or may be added separately as provided in component 5; wide-area optics can be incorporated at camera 3 to produce a low sight-line to see inside the payload bed shown at 6; and any traditionally-located center tailgate lock or latch handle would be removed from the desired display area as is provided for as component 13 in FIGS. 1A-1D. Additionally, an example of HDS system hardware (DVR, microprocessor, display drivers, together with DSRC/WiFi transceivers) may be located in the vehicle's cab, typically beneath a rear seat and wired to an umbilical with a connector at the tailgate. Models which include a tailgate-installed security camera, a targeting camera, GPS receiver and theft beacon, may locate those components in the tailgate structure itself (in cavity 6, FIG. 20) with a rechargeable battery pack for powering its built-in theft prevention systems. In examples, functional systems required for operation may be contained within the tailgate assembly itself.

Figure 1B:
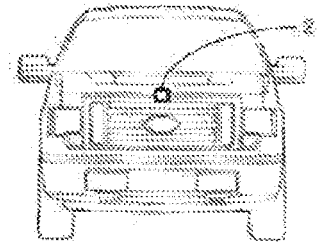
FIG. 1B illustrates a front view of a camera mounted on a vehicle and networked to a hyper-relevant digital surface, in accordance with embodiments of the invention.
Figure 1C:
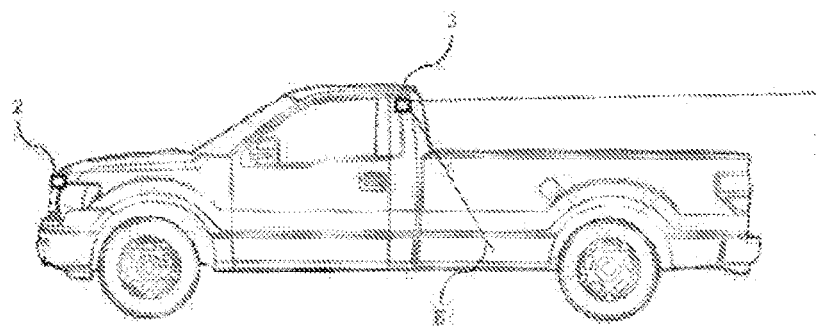
FIG. 1C illustrates a side view of cameras mounted on a vehicle and networked to a hyper-relevant digital surface, in accordance with embodiments of the invention.
Figure 1D:
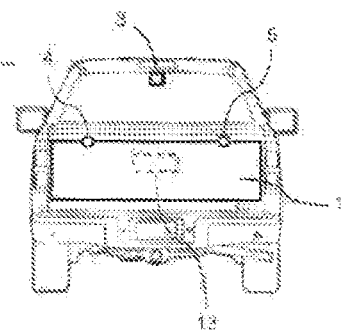
FIG. 1D illustrates a rear view of a hyper-relevant digital surface integrated into a tailgate and of a camera mounted on the vehicle and networked to the hyper-relevant digital surface, in accordance with embodiments of the invention.

In particular, FIG. 1A illustrates a bird's eye view of cameras mounted on a vehicle and networked to a hyper-relevant digital surface, in accordance with embodiments of the invention. FIG. 1B illustrates a front view of a camera mounted on a vehicle and networked to a hyper-relevant digital surface, in accordance with embodiments of the invention. FIG. 1C illustrates a side view of cameras mounted on a vehicle and networked to a hyper-relevant digital surface, in accordance with embodiments of the invention. FIG. 1D illustrates a rear view of a hyper-relevant digital surface integrated into a tailgate and of a camera mounted on the vehicle and networked to the hyper-relevant digital surface, in accordance with embodiments of the invention.

FIGS. 2A-2B illustrate views of a hyper-relevant digital surface integrated into a tailgate that is swung open about a side hinge, in accordance with embodiments of the invention. In particular, a high aspect ratio custom-made, flat-wrapped or compound-curved glass, optically bonded QLED digital display is provided as component 2 in FIGS. 2A-2B. Additionally, a nose-mounted camera is provided as component 2; a payload monitoring video camera and near-looking targeting/vehicle recognition/security camera is mounted inside or outside a truck cab is provided as component 3; a rear-looking targeting/vehicle recognition/security camera is provided as component 4; a backup camera is provided as component 5; wide-area optics can be incorporated at camera 3 to produce a low sight-line to see inside the payload bed is shown at 6; a tailgate video display swung to the left side for optional left side viewing is provided as component 7; and a hitch-mounted tailgate accessory-shelf and bumper is provided as component 9 in FIGS. 2A-2B. In particular, FIG. 2A illustrates a bird's eye view of a hyper-relevant digital surface integrated into a tailgate that is swung open about a side hinge, in accordance with embodiments of the invention. FIG. 2B illustrates a side view of a hitch-mounted tailgate accessory shelf and a hyper-relevant digital surface integrated into a tailgate that is swung open about a side hinge, in accordance with embodiments of the invention.

Figure 3:
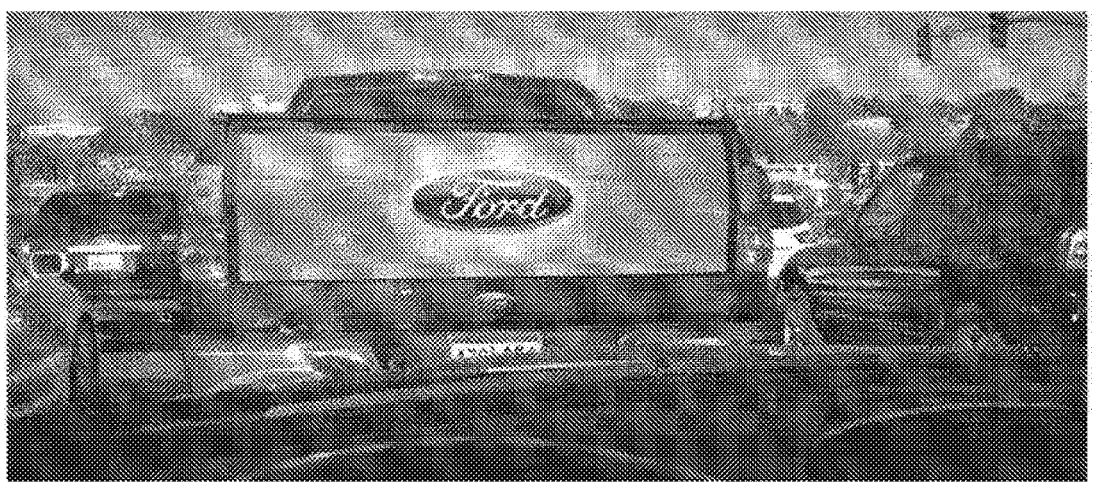
FIG. 3 illustrates a hyper-relevant digital surface integrated into a tailgate of a first vehicle, the hyper-relevant digital surface displaying an image that is independent of a second vehicle, in accordance with embodiments of the invention.
Figure 4:
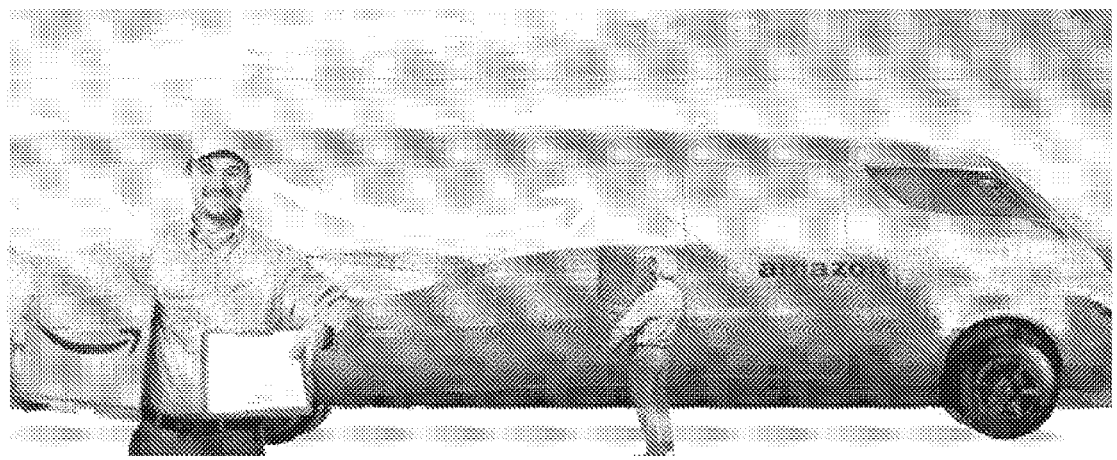
FIG. 4 illustrates a vehicle with an extensive hyper-relevant digital surface, in accordance with embodiments of the invention.

Additionally, FIG. 3 illustrates a hyper-relevant digital surface integrated into a tailgate of a first vehicle, the hyper-relevant digital surface displaying an image that is independent of a second vehicle, in accordance with embodiments of the invention. Further, FIG. 4 illustrates a vehicle with an extensive hyper-relevant digital surface, in accordance with embodiments of the invention.

HDSs may also be used in the context of the glazing of various kinds of moving objects, personal or commercial vehicles, and/or fixed signage. Although these systems can be deployed as add-ons to current products, structures, or surfaces, HDSs may additionally be designed to merge with new products. In examples, HDSs may be integrated such that a display matrix itself (LED, OLED, AMOLED or such other television or optical display type) may become an aesthetically-integral part of vehicle body panel(s) and/or contour(s). In such configurations, Hyper-Relevant Digital Surface (HDS) displays may functionalized by responding to externally-generated electronic queues such as wireless signals from other HDS-equipped vehicles, local networks, "wearables," and/or personal handheld devices. Dedicated Short Range Communications (DSRC) or similar forms of recently mandated wireless transmissions may be used for the targeting and delivery of personally-requested content, hyper-relevant mobile media, public service announcements (PSAs), and/or advertising.

HDSs may be used to generate owner income when integrated into a vehicle. In examples, HDSs may be deployed as part of new motor vehicle production. In other examples, HDSs may be deployed as aftermarket panels for retrofit or replacement installations. In these examples, the HDSs may be used to display content, such as required vehicle illumination; mandated vehicle illumination; operating system content; and/or commercial content. In particular, HDSs may display content by utilizing a digital display as billboards and/or interim, display devices. In examples, an HDS may be used to enhance automotive safety. Additionally, an HDS may enable a variety of user/owner lifestyle improvements, such as creating millions of new jobs and secondary incomes for HDS owners; neutralizing driver distractions from outside vehicles (e.g., roadside digital displays); mitigating driver distractions inside vehicles handhelds & in-vehicle displays; offsetting the higher costs of green vehicles and/or traditional fuels; making HDS-enabled cars & trucks the world's most desired, thus easiest to sell; financially driving advanced Intelligent Highway Systems (ITS); eliminating the need for vehicle license plates and annual registration stickers; attracting Federal co-investment; rekindling youth interest in cars; bringing new high-tech (display/vehicle manufacture) to impoverished areas; offsetting or mitigating transportation costs such as moving people & goods; and being used in a way so as to pay for itself by generating revenue so as to replenish the cost of installation.

HDSs may be used to reach unique, untapped, un-served mobile audiences through a powerful advertising/media initiative based on a novel model of consumer compensation, in examples, HDSs may target motor vehicle owners worldwide. By integrating HDSs with vehicle displays, HDSs may be used to target audiences of legal driving ages, and may be used to provide information to an audience that includes diverse genders, nationalities, demographics, economic, and ethnic backgrounds. Additionally, HDSs may be used to deliver individually personalized Digital Out Of Home (DOOH) advertising; target a conservatively-forecast $80 billion DOOH global market; tap a share of China & India's 26% ad industry growth thru 2016; and/or incentivize ownership of higher-cost green vehicles in all fast-growing markets.

Examples of HDSs may be used as a target anywhere/display anywhere/measure anywhere mobile video platform. In examples, an HDS system may respond to one or both DSRC & WiFi proximity queues from HDS-enabled vehicles, networks, smart-phones, and/or other personal mobile or wearable devices. Addition ally, HDSs may present hyper-relevant—often profile-requested—content to users under privacy-compliant user protocols, in examples, content may be determined, to be hyper-relevant based on content that is profile-requested. As such, hyper-targeted HDS displays may be used to offer automakers the first safe solution for displaying ads to the drivers of cars; present content which is not distractive to nearby or passing motorists; presented content located on moving objects, private automobiles & public transportation; presented content installed in public restroom stalls, malls, point-of-sale/point-of-wart & drive thrus, and in numerous mobile or fixed-base viewing applications; offer a means to mandate removal of distractive roadside digital clutter; queue branding, FMVSS lighting, DMV Licensing & Registration; facilitate automobile design upgrades as App downloads (like smart-phones); replicate critical highway signage & first responder messaging in real-time; deliver hyper-relevant mobile engagement while discouraging advertising on tiny smart-phone displays through a far superior alternative; deliver more engaging content to previously unreachable audiences; introduce a variety of novel consumer-maintained/incentivized overhead models; and/or introduce hyper-targeting & measurement to traditional DOOH billboards.

The use of HDSs may be used to generally improve a driving environment. In particular, HDSs may be used to increase the number of vehicles that are used, as vehicles may become an additional mode of collaborative communications. The use of HDSs may also turn traffic congestion into time that may be used to generate revenue. In examples, HDSs may average revenue of $40/day to $100/day per vehicle in daily-drive scenarios. This, in turn, may be used to generate as much as $40-$80 bn gross sales w/2 mm vehicles (2.6% annual global production). In examples, HDS owners may be paid $300/month towards a vehicle purchase or lease. In additional examples, HDS owners may produce six-figure incomes per vehicle, per year in On Demand/Same Day Delivery models. In this way, the use of HDSs may enable 20%-70% margins from hyper-relevant ad/content display. HDSs may also be used to remove clutter as roadside digital attractions (e.g. billboards) may be reduced. Additionally, HDSs may provide a safer driving environment by allowing drivers to use HDS systems rather than handheld mobile devices.

HDSs may be utilized in the context of ongoing design initiatives that may be focused on several independent segments, such as Corporate Concept Cars (International); Revenue-producing Fleets/Unique On-Demand/Unique Same Day Delivery Concepts w/AS/AR (Automated Storage/Automated Retrieval Systems); Step Van, Sprinter, pickup, USPS, FedEx, UPS & SUV conversions; Automotive Mass-Market Production w/select motor companies; and as a robust initial market with respect to this patent disclosure: the production of pickup truck tailgates for OEM or aftermarket installations.

Throughout history, vehicles have been designed so that their surfaces aid in the process of transportation—by lighting the way, identifying their presence, providing maneuvering alerts, emergency warnings, legal identification, product branding and a wide variety of communications for vehicle general safety and operations. As an example, contemporary automobiles may be designed, tested, approved and produced under Federal Motor Vehicle Safety Standards (FMVSS). Such standards provide guidelines, performance and testing criteria for such components as brake lights, tail lights, turn signals, emergency flashers or center mount stop lights. Other requirements exist for license plates and registration. Additionally, manufacturers may have standards for their own corporate branding and product identification. In examples, a vehicle's surface may comprise reflective, painted, mirrored, matt, tinted, transparent or illuminated objects or materials. These materials may also have standards to which they generally adhere. Additionally, the vehicle's surface may include signs, stickers, and animated mechanical or electronic devices attached by their owners. In examples, HDS may be used by automotive designers and engineers the opportunity to integrate and optimize the graphic and visual performance of aesthetic and operational elements of a vehicle's communications. For example, an HDS may be used to introduce a prioritized display so as to include the potential standardization of critical imagery and an opportunity to link the communications of one vehicle to many to an external environment counterpart or threat in real time. Additionally, HDS may be used to produce digital rear ends which may cost less to manufacture than conventional designs because HDS is capable of rendering 3D objects, such as deep automotive tail lights or chrome jewelry, or to render and animate reflections on such simulated reflective surfaces, using its on-board cameras to capture, simulate and render digitally the reflections of a vehicle's immediate surroundings in real time. The use of HDSs may also be used to introduce possibilities for consumer personalization and customization using improved, cost-effective mobile communications.

With respect to so-called "driver distractions," e.g., a driver's attention being attracted to or drawn from the aft surfaces of an HDS-equipped vehicle in one's path, controlled content displays may be used. In examples, content may be queued for display on a video communications system on an exterior of a vehicle.

In further examples, the display of content may be authorized when tandem vehicles are comfortably within viewing proximities and/or when tandem, vehicles have fallen, into a predetermined/test-confirmed speed and relative-motion envelope. For example, content may be authorized to be displayed when vehicles are within, a certain distance of each, other, in particular, content may be displayed on an exterior surface of a first vehicle when the first vehicle is within 6 inches, 10 inches, 1 foot, 2 feet, 3 feet, 4 feet, 5 feet, 6 feet, 7 feet, 8 feet, 9 feet, 10 feet, 15 feet, 20 feet, 30 feet, 40 feet, 50 feet, 60 feet, 70 feet, 80 feet, 90 feet, 100 feet, 1.50 feet, 200 feet, 300 feet, 500 feet 1,000 feet, half a mile, a mile, or more than a mile of a second vehicle. Additionally or alternatively, content may be displayed when a first vehicle is moving below a certain speed threshold, in particular, the content may be displayed on an exterior surface of a first vehicle when a first vehicle is moving below 50 miles per hour, 45 miles per hour, 40 miles per hour, 3.5 miles per hour, 30 miles per hour, 25 miles per hour, 20 miles per hour, 19 miles per hour, 18 miles per hour, 17 miles per hour, 16 miles per hour, 15 miles per hour, 14 miles per hour, 13 miles per hour, 12 miles per hour, 11 miles per hour, 10 miles per hour, 9 miles per hour, 8 miles per hour, 7 miles per hour, 6 miles per hour, 5 miles per hour, 4 miles per hour, 3 miles per hour, 2 miles per hour, 1 miles per hour, or less than 1 miles per hour, in additionally examples, the content may be displayed on an exterior of a first vehicle when it is determined that a second vehicle is moving below 50 miles per hour, 45 miles per hour, 40 miles per hour, 35 miles per hour, 30 miles per hour, 25 miles per hour, 20 miles per hour, 19 miles per hour, 18 miles per hour, 17 miles per hour, 16 miles per hour, 15 miles per hour, 1.4 miles per hour, 13 miles per hour, 12 miles per hour, 11 miles per hour, 10 miles per hour, 9 miles per hour, 8 miles per hour, 7 miles per hour, 6 miles per hour, 5 miles per hour, 4 miles per hour, 3 miles per hour, 2 miles per hour, 1 miles per hour, or less than 1 miles per hour. As such, vehicles may be assessed, using a constantly-monitored predetermined proximity based on speed and relative criteria to determine when content may be displayed.

Additional factors may be used to determine whether to display content on an exterior of a vehicle. For example, other factors may include time of day, surrounding moving objects, surrounding pedestrians, ambient light, travel into the sun or bright light, rapid light changes (such as tunnels) and similar criteria as discussed herein. Additionally, animations, color, or rapidly changing graphic content may not be displayed if it can be seen by the driver of a passing vehicle, such as on a highway, in a driveway, or in a parking structure. Additionally, incoming V2V and/or V2I signals (WiFi or DSRC signals between. HDS vehicles) may cause HDS displays to fade (or enter a controlled freeze/fade) to a neutral or to a default (body) color when another vehicle approaches or when the viewing angle is such that the moving vehicle may be able to see or be distracted by a displayed image.

Vehicle rear display may be used for primary viewing by the occupants in (or on) an immediately following vehicle, e.g. by a driver and front seat passenger(s) of a second vehicle following a first vehicle. Viewers may include pedestrians or a person that is inside a vehicle who might be passing within range. In examples, however, precautions may be taken to prevent displays from distracting passing drivers from the task of driving. For example, narrow-field viewing may be used to restrict a lateral field of view of a rear-facing HDS panel so as to encompass the sightlines of a driver if on the left to a far right side front seat passenger of average percentile and eye-point, seated in an average mid-sized sedan. Sightlines wider than this would cause an image to wash-out or to produce a blank or faded-out display which is invisible to the occupants of a vehicle positioned to either side in an immediately adjacent, lane. As an adjacent vehicle stops further to the rear, thus moving its occupant's sightlines into the display's lateral field of view, the primary tandem/viewing vehicle itself begins to block the adjacent vehicle's direct view of the display. Additionally, digital screen filters, optical overlays, louvers, and various electronic methods for controlling viewing angles may be used to restrict viewing of video displayed on an exterior of a vehicle. Examples of these am discussed in FIGS. 5 and 6 as provided herein.

Figure 5:
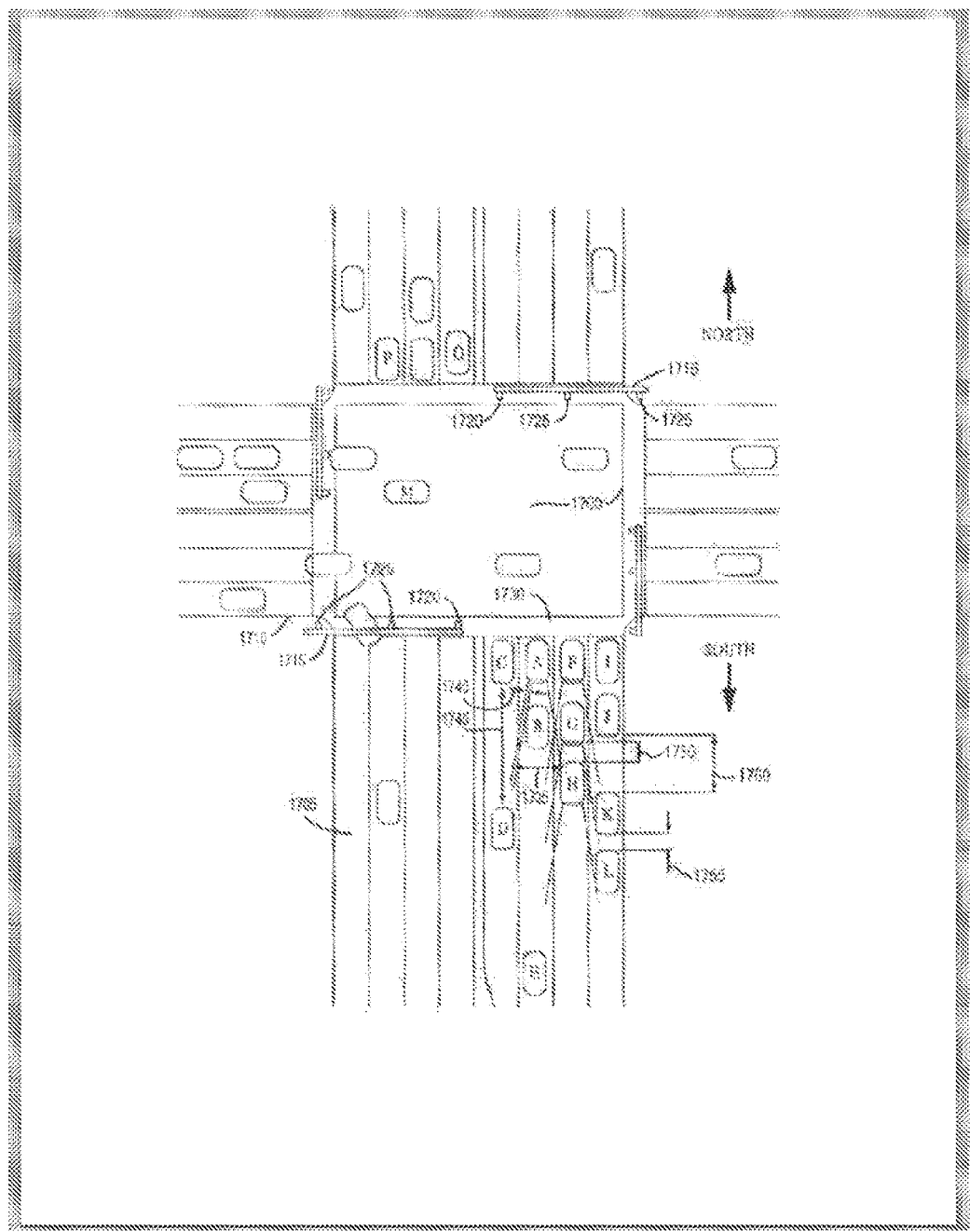
FIG. 5 illustrates a first vehicle and a second vehicle stopped at an intersection, the first vehicle having a hyper-relevant digital surface that displays content to the second vehicle, in accordance with embodiments of the invention.

FIG. 5 illustrates a first vehicle and a second vehicle stopped at an intersection, the first vehicle having a hyper-relevant digital surface that displays content to the second vehicle, in accordance with embodiments of the invention. Vehicle-to-vehicle communications may be governed through testing, rule making, and the administration of content delivery procedures that define where, when, and under what conditions various types of content can be displayed without compromising; highway and traffic operational safety. In some examples, it is desired that content not detract from, a vehicle operator's need to focus on the movements of objects around them rather than on any graphic content those objects might be displaying, beyond federally mandated lighting and safety systems. Embodiments as discussed may ensure that content may only be viewed or presented when vehicles are fully stopped. It can also assure that content cannot be viewed by vehicles that are passing in adjacent lanes, because this could produce a significant distraction. The kinds of displays anticipated by the invention can be combined with thin film overlays or integral layers that can optically or electronically increase or reduce the angles at which imagery can be seen. Optical filters, for example, can be embedded into the outer protective layers for these displays. One basic filter of this kind is 3M Corporation's micro-louvre technology which optically restricts the viewing angles in flat panel displays. Still another technique, created by Sharp Corporation and Sharp Laboratories of Europe, Ltd., permits an LCD to simultaneously display different information and image content in right and left views on a single display by directionally controlling the viewing angle of the LCD. This makes it possible to provide information and content tailored to specific users depending on the precise angle at which they view the display. Such an application could, for example, direct requested hyper-relevant video content directly rearward to a following vehicle, while the view from vehicles passing at more oblique angles could cause the same imagery to dissolve into the default body color for a given vehicle, or into content appropriate for generic or non-requested viewing.

A primary reason for selective or controlled viewing is that content requests are generally private and based on non-identifiable information requests. If an individual in a following (viewing) vehicle has allowed preferences which request content that is quite personal in nature, it would not be desirable for that content to be viewable by the occupants of vehicles in adjacent traffic lanes. Note, for example, Vehicle A, which is presenting requested hyper-relevant content to vehicle B behind it. Note the angular spread indicated at 1735. This lateral spread controlled by the previously mentioned technologies prevents the occupants of surrounding vehicles D, G, or H from seeing what is being displayed on the rear-facing surfaces of Vehicle A. Vehicle D's exposure is blocked by vehicle B, as shown by dimension 1740. If Vehicle B were not in close proximity to Vehicle A, this condition would be detected by Vehicle A's proximity sensor 770, and the system should prevent the queuing of highly personal hyper-relevant content. Vertical, viewing angles can be controlled in the same way as horizontal viewing angles to prevent, for example, the viewing of personal content from adjacent trucks or busses having seating positions that are inherently higher relative to the ground. Additionally, all such imagery would not incorporate animations or otherwise distractive content until the surrounding viewing vehicles have come to a complete stop.

Note that at 1745, Vehicle D has requested content, from Vehicle C, Vehicle C can select and queue that content; however, it cannot present it until Vehicle D has come to a full stop at a predetermined range behind Vehicle C, such spacing predicated on the respective VINs of the two vehicles. Such optimum spacing is reflected by Vehicles G and H, at dimension 1750. Here, vehicle G is a high SUV and vehicle H is a low two-door sports coupe. The VIN numbers exchanged between these vehicles during the requesting protocol has identified the respective heights of each vehicle along with the eye envelope for an average percentile driver in the following (viewing) vehicle. This information yields art optimum viewing range between these two objects. Furthermore, as vehicle H closes the gap with vehicle G, a small green dot may appear on the rear-facing display of Vehicle G. As the driver of Vehicle H continues forward, this spot may grow increasingly amber and finally red which indicates the optimum stopping point for best viewing through vehicle H's windshield. At this point, the dot may disappear and content viewing may commence. This fore/aft vehicle spacing feature of the invention may additionally conserve thousands of square feet of space in traffic lanes simply by allowing vehicles to maintain more efficient vehicle-to-vehicle tandem spacing.

By contrast, vehicles K and L have reached optimum spacing, as shown at distance 1755; however, vehicle K cannot present content because both vehicles are drifting slowly forward in the same lane. Once both vehicles reach a full stop, they can commence content display. On the other hand, Vehicle K has made an automatic content request of Vehicle J at a relatively distant range shown at 1760. Because vehicle J is at a full stop, it might be allowed to queue and present certain kinds of static content (such as a non-animated corporate logo) until Vehicle K is fully stopped at optimum spacing behind vehicle J.

Figure 6:
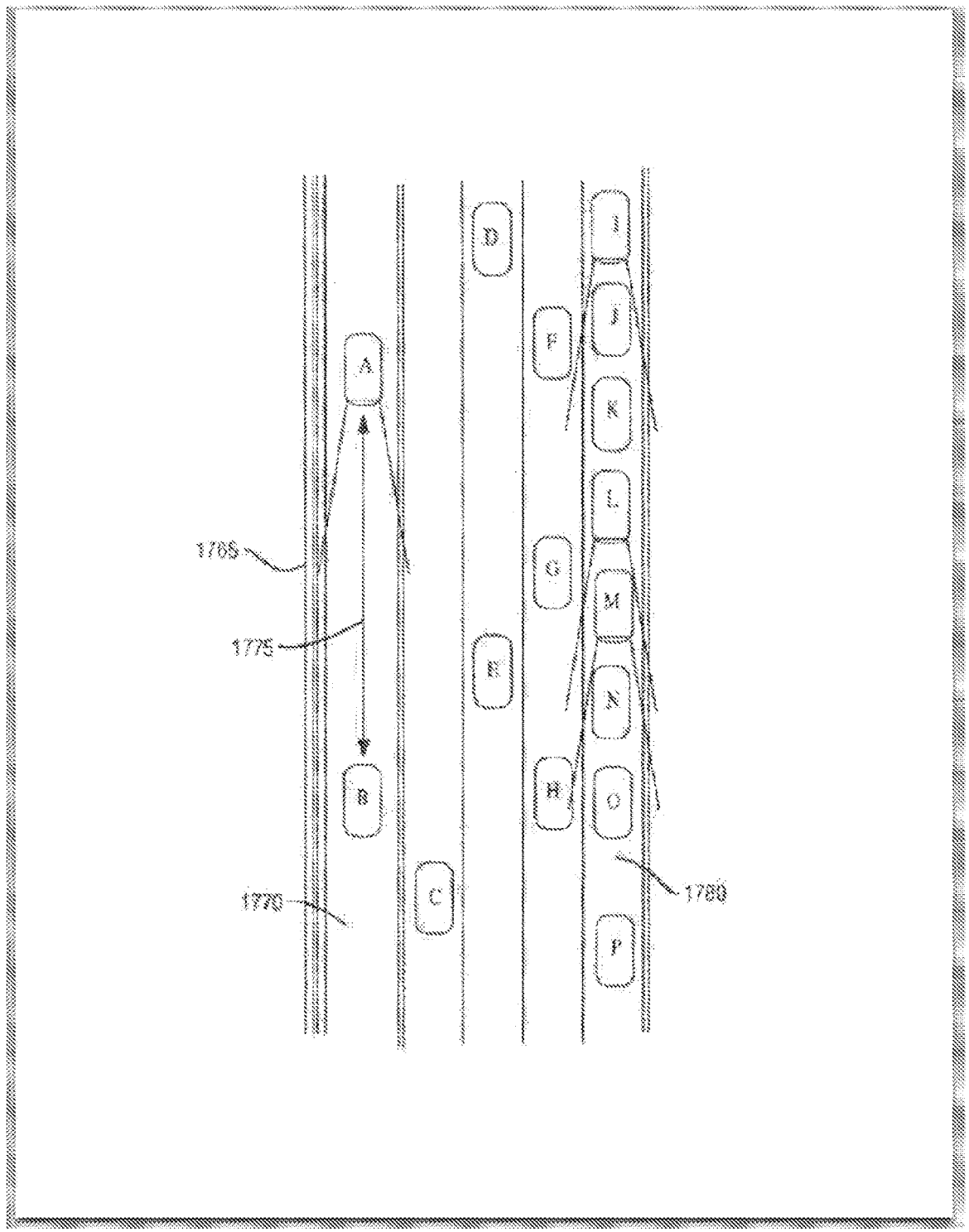
FIG. 6 illustrates a first vehicle and a second vehicle moving in traffic, the first vehicle having a hyper-relevant digital surface that displays content to the second vehicle, in accordance with embodiments of the invention.

FIG. 6 illustrates a first vehicle and a second vehicle moving in traffic, the first vehicle having a hyper-relevant digital surface that displays content to the second vehicle, in accordance with embodiments of the invention. In particular, FIG. 6 illustrates a section of freeway with lanes. In one direction, having a center divider 1765 and a carpool lane 1770. Moving at consistent freeway speeds. Vehicle B may make content requests forward to Vehicle A, as shown at 1775, however, such requests may be fulfilled only on a limited basis due to relative vehicle speed and range protocols. During day and night hours at speed, commercial imagery is likely to be limited to small centrally-located display areas on digital rear-ends and animation would not be permitted, unless vehicles are fully stopped. This is because animated or moving images can distract nearby drivers. At the same time, protocols would not want to dissolve or delete commercial imagery before engaging a vehicle's lighting and safety systems as this could introduce dramatic changes in object appearance while they are underway. Additionally, during night driving hours, all lighting and safety systems would remain active on all moving objects, regardless of speed, proximity, or location since uniform taillights, turning lights, and turn signals are vital elements in allowing drivers to judge the distances and conditions of vehicles ahead.

An exception might occur between stopped or extremely slow stop and go traffic as depicted in the far right lane 1780. Such a condition could be caused by a backed-up off ramp. If, over time, such blockages on heavily traveled freeways become repetitive, these conditions would gradually be recorded on the Intersection Clocks of moving objects equipped with the invention. Estimates of such delays can then be monitored for consistency and certain kinds of content or public service alerts can be displayed. In such cases, vehicles can use their on board transmitters to measure the relative movements in long rows of vehicles and opportunities can be identified for the queuing and display of short duration content while these vehicles are near-stationary. In lane 1780 from top to bottom. Vehicle I is presenting nonspecific (generic) commercial content to Vehicle J (which does not possess the invention), Vehicle L is presenting hyper-relevant content to vehicle M (which has requested it), and vehicle M is presenting generic content to vehicle N. Of significant value in such situations is the ability of any vehicle fitted with the invention to synchronize public service or traffic safety displays with other properly equipped vehicles. As previously mentioned, freeway speed changes, when communicated uniformly by radio between multiple vehicles simultaneously, followed by a uniform response (such as causing all of the vehicle's rear lighting systems to glow amber (for caution) and then transition at the same rate to red-amber and then red at uniform brightness levels (as opposed to individual brake lights flashing instantly on without warning), may result in considerably safer driver control and in the virtual elimination of progressively exaggerated slowing which leads to rear-end collisions. The U.S. Government currently has programs in place to develop such highway technologies which could easily adopt or interface with the Invention, One such program is the Forward-Looking Rear-End Collision Warning System (FCW) designed to explore and ultimately deploy driver warning methodologies. The digital vehicle rear-end and lighting safety-systems anticipated by the invention conforms to all of the targeted Warning Display Characteristics and to the Following-Too-Closely Warning Methodologies dictated by the study since it approaches the FCW warning display in a distinctly novel way. Of equal importance is the invention's consumer adoption plan—one driven by commerce rather than legislation—because it enables participating consumers to generate revenue and, as a result, represents a unique opportunity for new technology adoption. Suppose we wanted to stimulate the broad adoption of energy-efficient vehicles. By incorporating the invention into such vehicles first, we allow consumers to generate significant personal revenues, which effectively offset their inherently higher manufacturing, acquisition, and infrastructure costs In examples where a vehicle is moving perpendicular to the backs of parked cars, such as when the vehicle is moving down an aisle of a parking garage, the presence of the moving car relative to the parked and potentially displayable cars may be detected by V2V DSRC transmissions. Additional examples may include detection of a vehicle that is moving along a street and passing displayable cars. Once a moving vehicle is detected, content may be displayed on an HDS until the moving vehicle has passed. In addition, displayed content may be provided so as to avoid the display of content to the left or right of a moving car's path, which might be distracting to the passing driver.

The display of content, on a displayable vehicle may be affected by input from a passing driver in a second vehicle. For example, a passing driver may engage options within his vehicle to alert approaching drivers to the presence of a soon-to-be-available parking space, or to the presence of an available handicapped spot. These examples may be driver-initiated functions. In examples, these driver-initiated functions may default to OFF once a parking spot locator has been used. In additionally examples, pedestrians can deliberately trigger targeting or display signals as they walk past parked cars so that a vehicle may receive hyper-relevant video information or messages related to the presence of pedestrians that are moving within the vicinity of a vehicle. Such content queuing signals may generated by a pedestrian's smartphones, their portables, or wearable devices as, for example, the pedestrians move through a parking structure. Additionally, this content may be overridden by an approaching vehicle.

Narrow-field technologies may stem from, the display matrix and the makeup of the digital substrates or masks of the LED, OLED, AMOLED, or other elements of the composite since different structures can be designed to increase or decrease a display's lateral viewing angle. Additionally, variations of micro-louvers of can be integrated into a video display's outer surface to limit lateral angles much as overlay micro-louver privacy screens do for laptops, Other alternatives may include clear-ribbed lenticular screens combined with selective pixelization to produce variable lateral viewing angles or multiple images each with a different angle spread. Additionally, advancements in electrically-charged masks or matrix layers, liquid mirrors (such as those produced by Texas Instruments), forms of polarization, electronic shuttering and other concepts can be employed to create new types of fixed or variable lateral fields of view, depending upon the nature and display intent of the content queued.

Longer range simple image viewing may be possible in traffic before tear/tandem vehicle spacing closes up due to stops or slowdowns. Prior to such events, and/or during normal highway/freeway travel, the digital equivalent of a still (or like a painted-on) image may be electronically generated on multiple vehicles simultaneously within a defined area, including wide areas such as several city blocks.

In additional examples, automakers, manufacturers, advertisers, and platform designers may establish mutually-acceptable criteria and standards for the various types or qualities of display that may be permitted in road environments for non-animated long-field viewing scenarios. In particular, standards may be established relating to the ranges of colors, saturations, brilliance, size, placement and movement, if any, to determine the optimum attention-grabbing vs. non-distractive qualities and timing for such imagery. These standards may be established so as to draw a driver's attention with HDS when it is required (e.g., display of an Amber Alert), yet avoid distracting a driver's attention when it is not required (e.g. for recreational display of digital content). Standards may also be provided to prioritize content and prevent conflicts with established vehicle operating functionality such as vital illumination or V2V/V2I visual vehicle alerts.

In examples, company logos or simple graphics which are devoid of animation, movement, rapid dissolves, or color changes may be permitted once tested and approved for long-field viewing and display. In particular, visual shifts which do not compete (in terms of color, saturation, brilliance, location, timing or other factors) with FMVSS lighting and safety systems, law enforcement, licensing, registration, NHTSA signage, emergency and 1st responder alerts or other highway communications may be permitted once tested and approved for long-field viewing and display.

Animation and/or moving images that may draw the eye and attention of drivers may be heavily controlled and precluded from situations where it is beneficial for a driver's attention to remain on a vehicle or an object in his path. Conversely, animation may be used to call attention to said vehicles in one's path to ensure an object's presence, location, and/or visibility. For example, combinations of color, flashing, and/or strobing light may be developed to better gage the presence or proximity of vehicles ahead, in dense fog, rain, etc., as opposed to or to augment conventional tail lights.

In examples, animations may only be permitted during tandem vehicle relationships once speed and proximity requirements are met. For example, animations may only be permitted when both vehicles in a tandem vehicle relationship are appropriately paused, stopped, and/or turned off. Additionally, a threshold of content distraction may be applied when displaying animations to other nearby drivers while moving, or of unduly confusing pedestrians, children or cyclists. For example, animations that include flashing lights or the use of attention-grabbing color or graphics may be used to alert drivers in advance of hazardous traffic, critical or desired traffic flow in large parking areas, impending weather, or environmental conditions.

In examples, it may be most effective to cause visual, images to appear or flash suddenly and repeatedly to deliberately attract attention of nearby drivers or passersby. However the reverse may be true when we want to draw the least amount of attention visually. Accordingly, content that is intended to be less distracting may be presented slowly (e.g., content may cross-fade or materialize slowly) so as not to distract drivers.

In an additional example, content may be displayed over a large amount of surface area in a way that is noticeable, but not distracting, to a driver. For example, a corporation that has leased a several block zone in an area where it wants to promote a special event or product may provide for the steady display of a common brand or logo simultaneously on multiple vehicles within the several block zone in the area. In other examples, content, may be displayed on an exterior of a vehicle in a way that emerges slowly so as to not be confused with emergency actions, such as brake lights or turn signals. In examples, content may be displayed without auxiliary audio.

In examples of displaying content, certain bright or primary colors may be reserved for specific driving activities and/or critical messages: RED for Stop; GREEN for Go; AMBER for Caution and Slowing, etc. At the same time, other colors may be used to designate special zones: Parking vs. No Parking, loading, stopping, timed or metered parking, handicapped, etc. An HDS system may anticipate general use of established colors and visual systems so as to a void conflicting or contradicting colors or graphics when a message might be confused or diluted, such as a message being confused or diluted with another message. For example, a red corporate logo would not be allowed to appear at a time or in a way that it could be confused with/mistaken for a vehicle's brake light or turn signal.

Additionally, certain light colors when flashing rapidly may induce desirable or undesirable optical effects, or may cause color shifts or changes which command attention. Coupled with a digital display on a pickup truck's tailgate (or other automotive panels), an HDS may become a serious highway lighting, flashing, and/or alert platform which may be used in a variety of emergencies or hazardous highway conditions to public safety advantage. The proliferation of high-volume LED or OLED displays may allow digital content, planners to identify the lighting or visual effects having the greatest potential for highway/transportation safety and utility. These lighting or visual effects may then be used to assign colors or effects to the functionalities where they may provide the most of a particular effect. Tail lights, brake lights, turn signals and backup lights may each have a basic utility such that a fully-integrated HDS body panel display may have the long-term potential to replace most if not all of such basic automotive communications functions with a simple and cost-effective digital, diaphragm component. OLED digital matrix displays can further enhance lighting functionality by offering lighting solutions which may perform better at certain times of day under different temperatures, ambient illumination or weather conditions. In examples, an HDS may be used in the development and testing of unique light modulations or frequencies, combinations of color, strobing patterns and color/temperature shifts where optical contrasts may be optimized to draw attention to those surfaces which alert drivers and passengers to impending hazards, accidents or the presence of objects, their physical perimeters and in some cases enable objects to simulate transparency to eliminate blind spots for other drivers. Additionally, the use of HDSs may be used to create a tangible real-world/real-time visual connection between an in-vehicle alert (a red flashing LED on the instrument panel (IP), for example) and the physical, presence and location of that hazard in the immediately surrounding viewable environment.

Additionally, HDSs may be used for emergency utility lighting. In examples, an HDS may be configured to be switched ON so as to illuminate a ten square foot digital tailgate surface. In this example, the use of the HDS as Integrated within a tailgate may effectively provide an outdoor work lamp to assist in searches or work crews—and by virtue of previously mentioned functionality, to rotate around its own integral hinges to aim light in a variety of directions. In other examples, the HDS may be configured to provide a flashing array of bright, animated color to warn for approaching traffic on an otherwise dark road, and a multiplicity of vehicles can be used when available and necessary.

HDSs may also be used for standardized vehicle illumination. For example, today's tail lights may be used for estimating the range of a vehicle some distance ahead by assessing the changing space between its left and right side perimeter illumination as one nears such lighting. Such a measure may be improved by an order of magnitude if vehicles used a standardized illumination of tail light spacing. In particular, standardized lighting may make it easier to daisy-chain vehicles so that vehicles in a single lane or section of a highway receive, for example, a "traffic slowing" alert simultaneously, thereby avoiding the sharp, subsequent surprise overreactions with exaggerated braking which may cause a rear-end accident. Additionally, HDS may be used to provide innovative lighting standardization at highway speeds for improved spacing or safety.

Determining a selection of displayed content may be assessed based on content display priorities for operational safety. For example, display of personal, social or commercial, content may be subordinated to the display of content that is associated with vehicle operation, safety, or design (for example FMVSS lighting and NHTSA performance), vehicle identification, vehicle emergency, security or law enforcement. General content may be displayed, on an HDS based on a prioritization of content categories. Content categories may include FMVSS/NHTSA Highway Lighting, Safety & Utility Systems. In particular, these may include Highway Emergency Lighting/Flashing; Daisy-chained vehicles; and Blind spot elimination. Another content category may include V2V/V2I DSRC Visible-Vehicle Driving Alerts. Examples of these Driving Alerts may include Accident Early Warnings; and Pedestrian, child, pet presence alerts. An additional content category may include Public Safety/User Security. Examples of this category include First-responder/stolen vehicle takeover; GPS component tracking/monitoring; Ad hoc theft deterrent/tampering systems; and Retained suspect imagery, memory & data relay. A further example of a content category may include Public Service Announcements (PSAs). Examples of PSAs may include Amber Alerts; Detours, road hazards, Area Alerts; Targeting Marketing, Recognition & Research. Another content category may include Commercial Signage & Branding. A further content category may include Paid Advertising (owner/user revenue). An additional content category may include Personal Fulfillment, Promotion & Advertising. Another content category may include Social Networking. A further content category may include Entertainment or Infotainment.

Accordingly, a self-contained pickup truck tailgate assembly may comprise a full-tailgate width (and optionally a full tailgate height) hyper-relevant digital surface (HDS) video display that is integrated with tempered glass in a metallic or carbon fiber tailgate structure designed to fit the original tailgate opening for a standard production pickup truck, produced as either an OEM factory component or installed as an aftermarket item by an authorized dealer or installer. In addition to the primary tailgate assembly, a tailgate installation kit (or assembly line components package) may include the electronics to drive the video display, a microprocessor with memory for content storage; a TiVo-type DVR trip recorder, crash recorder & content player, a forward looking video camera, with one or more rear-looking targeting/security cameras; WiFi and/or DSRC transmitter/receivers (to interface with new vehicle-to-vehicle/vehicle-to-infrastructure (V2V/V2I) automotive networks; a standard or optional (available) automatic tailgate opener w/shock mitigation/damper; a standard or optional (available) powered automatic tailgate closer; a wireless key pad or smartphone App remote controller for tailgate locking and unlocking, opening/closing and arming of the security system, and for remotely controlling video content or media during owner/operator (entertainment content) viewing. The system may further include (built-into the basic tailgate structure) an external stereo/surround-sound speaker system and an integrated theft prevention system consisting of variations in standard or available components utilizing concealed video camera(s), a GPS tracker/transmitter with Internet connectivity and a tailgate tampering alarm linked to an internal dedicated tailgate alarm or the base vehicle's existing theft alarm system.

A tailgate video communications system that is integrated with an exterior of a vehicle may include a corresponding mobile App. In examples, the mobile App may include membership in a pickup truck owners community. The mobile app may include a unique social fulfillment component; a pick-up & delivery component; and a network business component that features secure, car-to-car inter-communications and social networking. The mobile App may also include highway features similar to OnStar, Sync or mbrace for highway Automatic Collision Notification & Stolen Vehicle Location Assistance. In example, a Tailgate Video Communications System described as herein may be factory ordered with a new production pickup truck or the system components can be installed later by a dealer or through an appointment with an authorized HDS/Tailgate Installation center.

In examples, HDS panels can be integrated into a truck, van, SUV, Crossover, sedan, or other vehicle classification. Production solutions may involve integration as hang-on parts such as doors, hatches, decks or their glazing. In an example, a physical incorporation of HDS technology for basic tandem-vehicle viewing may be engineered by integrating the HDS into a pickup truck tailgate.

Engineering components and functional components as discussed herein may be contained within the replaceable tailgate assembly itself. While design for an SUV or a passenger car may involve changes to vehicle rear lighting, glazing, backlite wiper, license plate, backup lights or center-mount stop light, a tailgate installation may not demand such alterations. In examples, the tailgate itself is a simple rectangular element which attaches and hinges along its bottom edge and can traditionally be easily removed and reattached at this junction. The illuminated license plate mount and recess is placed below the tailgate so it is always visible in the bumper area on all pickups and the lighting package is placed outboard of the tailgate in the aft corners of the truck bed. The tailgate itself is typically devoid of odd shapes or contours and may be a relatively flat-wrap surface (contoured in one plane) yet increasingly compound (two or more planes) and is supportive of an integral video display, it is a simple task to delete the center tailgate handle & lock/latch and replace it with an internal electrical latch controlled remotely via keypad remote, a keyless entry or a keypad entry on the upper edge of the tailgate. In fact for 2015 Ford has introduced an automatic opener and shock mitigation device for its popular F-150 line. A new lock/latch mechanism can be easily added to the interior cavity of the new tailgate structure and be configured to function with the existing tailgate striker assembly. A soft-opener mechanism may be added to the standard HDS tailgate—for example a torsion spring at the hinge or a shock strut to counter the tailgate weight and to cushion the tailgate's downward travel. Additionally, as either standard or optional (available) equipment a powered door raiser can be engineered permitting tailgate opening, closing and security system arming via with a single vehicle-supplied remote or a free smart phone App.

There are several, important design advantages to adapting HDS panels to pickup trucks vs. other vehicle categories such as SUV's, vans. Crossovers, sedans, station wagons, sports ears or compacts. The pickup truck tailgate is an example of a stand-alone, "hang-on" automotive component which functions as an independent, articulating body panel. As such, a pickup tailgate is easier and less costly to design, test, manufacture, ship, distribute, stock, retrofit, install, and/or market than other vehicle body panels. An advantage of using pickup trucks for the integration of HDSs is that the following components from original production may not need to be modified for HDS tailgate adoption: tail lights, turn signals, backup lights, center-mount stop light, license plate and illumination, locks, and/or latches. In particular, tail lights/turn signals/backup lights may remain on aft bed/fender outboard corners. Additionally, center-mount stop lights may be mounted stop the aft cab. Further, license plate and illuminations may be mandated in a bumper of a vehicle so as to be visible when a tailgate is open, and locks/latches may be built into the track bed corners, ad as such may use new tailgate mechanics in examples. As such, the lack of modification of these areas may result in significant cost savings and benefits for an early production of an HDS integrated into a tailgate of a vehicle.

Additionally, vehicle exterior surfaces may be compatible with anticipated video display surface contours. In examples, tailgate design contours may be compatible with vehicle exterior surfaces. Accordingly, a quality aesthetic of a tailgate HDS may be executed on a vehicle at a nominal cost. In some examples, the general simplicity of a tailgate's original sheet metal may be used to execute contour-matching substitution of tempered glass or silica-coated transparent plastics to serve as robust optical faces for a video display component.

The following components may be added to a new tailgate assembly, or may be optionally incorporated into the existing pickup truck, bed floor, side walls, fenders, bumpers or cab: outdoor speakers (for use with video entertainment systems); tailgate opener/dampers (shock mitigation); tailgate actuation hardware (automatic opening/automatic closing); internal electric latch & locks; and/or keyless entry or touch pad opening (with wireless remotes).

In contrast, non-pickup truck categories (such as SUVs, sedans, Crossovers, compacts, etc) may include the following elements which may be associated with integration of an HDS as compared to integrating an HDS into a pickup tailgate: numerous variable (non flat-wrap) contours; split rear doors or hatches; FMVSS lighting (numerous changes or relocations); latch/lock/handle relocations; rear window wiper arm relocations; license plate mounts, recesses, and/or lamp relocations.

FIG. 7 illustrates a cross section of a hyper-relevant digital surface having an air gap between a covered glass layer and an LCD layer, in accordance with embodiments of the invention. In particular, FIG. 7 provides a conceptual cross section of a hyper-relevant digital surface having an air gap between a covered glass layer and an LCD layer, in accordance with embodiments of the invention. However, an air gap between the outer glass and the digital layers may be conventional and problematic. In contrast, additional embodiments may provide an air gap behind the display element (FIG. 9, item 6), but that air gap may provide some insulation (air or materials), or can contain or enable stiffening elements on the hack of the display element so the glass and display matrix can be produced lighter and still be supported in its mount. Additionally, FIG. 8 illustrates a cross section of a hyper-relevant digital surface having an uncovered LCD layer, in accordance with embodiments of the invention.

Figure 9:
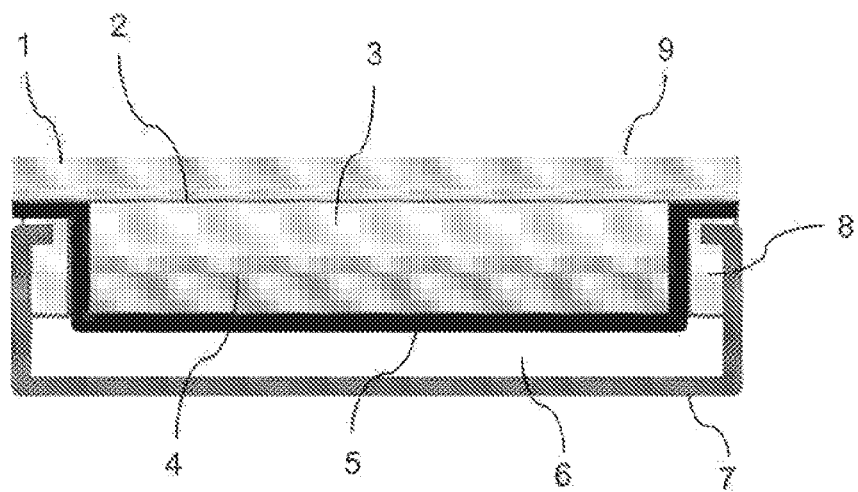
FIG. 9 illustrates a cross section of a hyper-relevant digital surface having a glass layer that is transparently sealed to a backlit liquid display layer without an air gap, in accordance with embodiments of the invention.
Figure 10:
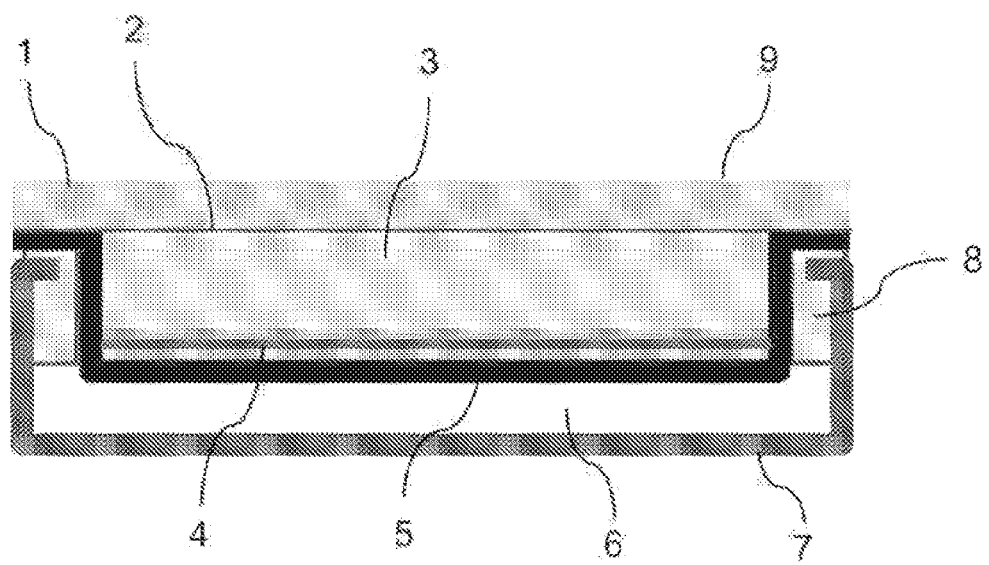
FIG. 10 is a horizontal cross section of a hyper-relevant digital surface having a glass layer that is transparently sealed to an OLED layer without an air gap, in accordance with embodiments of the invention.

FIGS. 9 and 10 show a horizontal section through a graphically-simplified, not to scale drawing of an HDS tailgate structure and display. This configuration would produce a contemporary trimless (or "borderless") appearance to the glazed edge typical of many if not most glazed hatches, windows, sunroofs and pop-out windows from contemporary sedans, crossovers or SUVs. It is indeed possible that truck tailgates may opt for a trim-protected vertical left and right tailgate edges, or the use of a unique pop-out protective seal to cover those glazed, edges at times the tailgate is open (or horizontal) and thus more vulnerable to side or loading impacts.

FIG. 9 illustrates a cross section of a hyper-relevant digital surface having a glass layer that is transparently sealed to a backlit liquid display layer without an air gap, in accordance with embodiments of the invention. In particular, FIG. 9 includes a tempered glass component 1. In examples, tempered glass may be a light, strong component that may be is quality tested by a vendor. Glazing may include very light tints to enhance image filtering, color, product external appearance and life cycle. Additionally, FIG. 9 may include an adhesive layer component 2. The adhesive layer may be used for optically bonding a coverplate to LED or LCD. FIG. 9 may further include an LCD or LED liquid crystal/color filtering layer 3; a backlight component 4; a lightweight display structural housing component 5; and an air-cavity 6 in tailgate or door structures. In examples, these cavities may be filled with foam-like or aerogel-like materials for structural impact and/or insulating qualities for temperature control, pending manufacturer quality, and design/engineering testing. Additionally, the cavities may also be used to house electronics components relating to the system, such as cameras, beacons, receivers, transmitters and optical & security/proximity sensors, and tailgate operating mechanisms. FIG. 9 may also include a lightweight carbon fiber composite 7, aluminum or comparable formed or stamped tailgate (or inner door/hatch) structural panel. This panel may be surfaced with a separate tailgate wear and appearance surface (not shown). Additionally, FIG. 9 may include an elastomeric shock-mount 8 assembly and installation joint/seal. The mount 8 may be a soft-mount. Additionally, the shock-mount may further accommodate temperature changes and part expansion, shock from door or tailgate, slamming and normal vibration. The mount may be formed or installed in sections or as continuous molded part, completely surrounding the independently-sealed, display component FIG. 9 may also include tempered glass may be contoured, as seen in component 9. In examples, the countered glass may be curved in one direction (not shown) and eventually in two or more directions as display development and production follows normal formed glazing development/deployment timelines.

FIG. 10 is a horizontal cross section of a hyper-relevant digital surface having a glass layer that is transparently sealed to an OLED layer without an air gap. In accordance with embodiments of the invention. FIG. 10 may include a tempered glass component 1; an adhesive layer 2 for optically bonding coverplate to OLED color refiner layers; an OLED or AMOLED component 4; a lightweight display structural housing 5; and an air-cavity 6 in tailgate or door structures. In examples, these cavities may be filled with foam-like or aerogel-like materials for structural impact and/or insulating qualities for temperature control, pending manufacturer quality and design/engineering testing. These cavities may also be used to house electronics components relating to the system, FIG. 10 may also include a lightweight carbon fiber composite 7, which may be aluminum or a stamped tailgate, such as an inner door/hatch, structural panel, in examples, an OLED may be bonded to fully transparent glazing may have a different composition. In particular, the composition may be one similar to laminated glazing. In examples, this panel may be surfaced with a separate tailgate wear and appearance surface (not shown). FIG. 10 may include an elastomeric shock-mount 8 and assembly and installation joint/seal. These may accommodate temperature changes and part expansion, shock from door or tailgate slamming and normal vibration; may be formed or installed in sections; or as continuous molded part completely surrounding the independently-sealed display component. FIG. 10 illustrates tempered glass that may be contoured as in component 9. The countered glass may be curved in one direction or may be curved in two or more directions as display development and production follows normal formed glazing development/deployment timelines.

Display technology may vary and evolve as improved technologies are developed, come online, and are refined for the competitive television marketplace. Additionally, HDS may see much the same variations and evolution. In examples, HDSs may be executed using high-resolution LED, OLED and/or AMOLED diaphragm printed matrix displays. Additionally, display matrix structures may also vary. Examples of installations of an HDS on the sides or rear surfaces of the very box-like, flat-sided step vans may not include contours when no contours are required for external appearance, in these examples, installations comprise literally flat, conventional displays. Additionally, these displays may have an air gap which may be prone to condensation and/or may have three times the amount of reflection of external sunlight. In this way, the reflecting surfaces (either side of the air gap) may be multiplied, thereby increasing the image quality and/or brilliance. For optimum brilliance, an outer glazing coverplate (whether flat or curved) may be optically-bonded to the immediate inner LCD, LED or OLED color refining layers using high temperatures and an adhesive layer. This is illustrated in FIGS. 9 and 10, In the absence of curving both the coverplate and the display matrix, it may be possible as a lower cost to seal a traditional flatscreen display beneath curved, tempered, automotive type glazing. Additionally, it may be possible to air-condition an air cavity to minimize condensation and control temperature extreme. In an example, an HDS embodiment may be provided so as to optically-bond the desired display matrix to the specified curved glass to create a final, properly sealed, visually-trimless ("borderless") component having only ⅓rd the reflection (4.5% reflection vs. 13.5%) from using the section shown in FIG. 10. This procedure may also remove the potential for parallax issues.

Additionally, automotive applications may be developed so as to account for temperature extreme. In example, compensation solutions may be provided for responding to temperature changes. In particular, electrical currents may be changed according to temperatures after reading the current in the OLED and the display data. Automotive applications may also be developed to account for bright sunlight viewing. In particular, LABC (Light Automatic Bright Control) can change display brightness according to the environmental light. In examples, display brightness may become brighter in a bright environment and darker in a dark environment. Alternatively, display brightness may become darker in a bright environment and brighter in a dark environment. Further, automotive applications may be designed for carved display in which a stiffer mechanical chassis may surrounds the display panel. Additionally, one or more foams may be used between display/glass and a chassis, thereby reducing vibrations. Further, leakage that is caused by the use of inorganic sealing materials may be reduced by utilizing organic sealing materials and/or strengthening these bonds using lasers.

An example of a pickup truck tailgate—such as an example of a pickup truck tailgate that is more than 60 inches, and in examples as much as 64 inches, of overall width and well over 24" of vertical available dimension within which to house a display—may permit a wide variety of final display aspect, ratios, depending on specific design objectives (such as matching display perimeters with inherent design lines). In examples, based on the current standard television aspect ratio of 16:9 it is possible to array two standard TV formats side by side within a single tailgate so that in a tailgate pasty scenario for example, viewers could watch two football games simultaneously on side by side screens and still have an abundance of unused surface area on the tailgate left over for an image divider or space to display scores, graphics or photos, PIP's, margin advertising or broadcast logos. Alternatively, and merely for comparison purposes it would be possible to array two 21.9 TV aspect ratios side by side to simultaneously enjoy a pair of wide screen movies—or a specially formatted video games. For personal signage, advertising, readable messaging, visual personalization or compatibility, considering the lines and designs of the original truck and tailgate, it may be preferable to use the full maximum available width when determining a target tailgate aspect ratio for mass-market production. In examples, content providers, advertisers, or owners may not choose to use or power-up the full display. In particular, less than the full display may be used to display content. In particular, content presentation may be subject to content and technical broadcast standards so as to manage power consumption preserve readability, time, delivery, safety and other considerations. Additionally, the tailgate video communication system may not be limited to single vs. multiple display formats, but rather, may be configured to provided either or both displaying format options. Similarly, nothing in this filing should restrict the use of existing or replaceable vehicle glazing (its frames, moldings, latches or seals) from incorporating transparent OLED displays.

In examples, advanced digital displays can be substituted for individual hardware items such as vehicle lighting, licensing or branding—traditionally among the more costly parts of a motor vehicle to design, manufacture, assemble, ship, stock and maintain, HDS allows many dozens of such parts to be consolidated and produced in single or small multiples of digital sheets dramatically lowering their costs over time. Such digital integration would normally involve a lengthy adoption period as parts come online separately-over time, each needing to meet economies of scale, testing and production at levels affordable enough to pass on to the consumer without unreasonably escalating the price at retail. However when so many digital surface parts can be combined with the volume production of a high-demand, revenue-producing, essentially printed diaphragm component—and further when a revenue generating innovation can advance consumer adoptions in another and otherwise costly safety-related field like Intelligent Transportation Systems (ITS), the public benefit can be enormous.

In examples, three video cameras may be used for tailgate installations of HDS systems. For example, video cameras may include a back-up camera (present in many pickup tailgates as a dealer option); an HDS targeting camera (which may use facial recognition techniques and apply these techniques to cars); in-cab/payload camera—inside truck rear window for bed/tailgate security; and HDS see-thru camera—on truck nose to capture view of road in front of vehicle.

In additional examples, an onboard HDS DVR may routinely capture and store time-stamped video imagery. The HDS DVR may be used as a video trip recorder; as an accident/event recorder; and/or as a content storage, memory, content queuing & playback system. Additionally, the HDS DVR may be used to record from security cameras located on the vehicle; tailgate camera, cab/payload camera, and/or nose/forward view camera.

In examples, tailgate theft may be common problem in some states, particularly Texas. States notwithstanding, it is a concern that thefts involving considerably more value such as a tailgate containing a large television display may be an even greater enticement for theft. Countering this, three video cameras, an on-board DVR, the vehicle's HDS DSRC & WiFi transmitters with GPS tracking may all be used to protect the tailgate from being stolen along with anything the truck's payload bed.

In the event that someone attempts to open, disable, use or otherwise remove an HDS tailgate in an unauthorized manner, imagery from all three video cameras may be retained for a predetermined amount of time. Additionally, imagery may continue to be captured in real time, even after the tailgate is violated or removed. After such removal, the on-board camera(s) may continue to function under battery power collecting video and transmitting this video via the Internet to the truck owner and/or to a theft-prevention/tracking service (similar to LoJack, OnStar or SYNC) for eventual receipt by the truck owner and/or police authorities. The GPS receiver built into the tailgate may continue to function—transmitting the tailgate's physical location in real-time to a secure remote location—until, batteries run out or until the system is disabled.

In a related innovation, if an HDS vehicle or a key HDS component such as a tailgate is stolen, the HDS theft-prevention system, once activated automatically or remotely by the truck's owner, may emit a constant wireless signal alerting all other HDS-equipped vehicles within the vicinity of the stolen vehicle, as well as any fixed-base security cameras that have signed onto the HDS system. Thus when a "stolen-vehicle" or a major stolen component such as a tailgate comes within the potential field of view of fixed-base HDS cameras or HDS-equipped vehicles, the DVRs within those vehicles or fixed base systems may record, time-stamp and secure that video in their databases for transmission to law enforcement authorities, who may be able to compose an event stream documenting the alleged theft. In other words, when an HDS vehicle or a component such as a tailgate, is stolen, a GPS coordinates/video trail is automatically generated which can directly link a stolen vehicle (or component) to a crime scene with a time history (until batteries run out or the GPS is disabled) and it then sends the GPS coordinates of its current or last known location with the progressive video route footage from intersecting ad hoc HDS vehicles to law enforcement teams. Such a real-time/time-stamped, GPS-generated, video-confirmed trail may be invaluable, both in recovering stolen goods and in prosecuting crimes. An additional feature of an HDS system may include the ability to use its multiple camera system together with its vehicle-recognition software to identify vehicles on the open road which may have been previously stolen or be the new subject of law enforcement action.

Additionally, many HDS-equipped vehicles may include a "see-through" proximity passing or "blind-spot" elimination feature in which imagery from a nose camera on the vehicle is transmitted in real time to the rear-mounted HDS display on that vehicle for the temporary, intermittent use of vehicles wishing to pass. The passing system may be used as a particularly valuable safety feature for highway locations where a larger vehicle (e.g., a truck) can obscure a passing car's view of the road beyond. In the proposed embodiment, a pickup truck's HDS nose camera may switch on and collect live moving imagery when activated by the vehicle's operator (or software) as a trip recorder; prior to and during an emergency stop, maneuver or impact (crash recorder); by receipt of a "stolen vehicle" alert, or; when activated for proximity passing by: a vehicle's driver; a following or passing vehicle's turn signal, flasher or horn; a dedicated DSRC V2V or V2I on/off signals; or an external disturbance to the pickup truck potentially attributable to abuse, mischief, theft or the environment.

When a following vehicle wishes to pass an HDS-equipped vehicle, and when the nose camera has been activated by a visible, audible, or radio signal from, a following vehicle or by the driver of the HDS vehicle or another potential input, the live feed from the nose camera may be sent to the FIDS display at fee rear of the vehicle so that the driver of the trailing vehicle who is preparing to pass can "see-through" the vehicle ahead which he is preparing to pass in real time by virtue of this displayed/confirming video image of the road beyond the vehicle to be passed.

An HDS tailgate structure, bed surfaces, edge flanges, latch and opener reveals may comprise relatively standard finishes which may correspond to an original tailgate. The bed surface materials and fittings may be nearly identical to (and may even use) the original tailgate components or trims depending on the actual structures and designs of the new/replacement HDS tailgate assembly. If a carbon fiber structure is used, one common and still marketable surface finish may be to show the composite carbon fiber weave within the composite part. To the greatest extent possible tempered protected glazing surfaces may be trim-less and edgeless in keeping with common glazing design and installations and may thus be factory bonded and sealed against the weather and possible condensation.

The aft surfaces on many pickup truck tailgates may approximate a constant vertical section transversely (right to left edges) typically in a convex flat-wrap contour top to bottom. Such original contours may sometimes be modified by subtle bulges or local sculpting for styling definition or to accommodate handles, add panel stiffness, accept branding, or other details. Transverse character lines and plane changes may add interest and reduce the apparent visible height in a tailgate's exterior surface. In examples, character lines may align with a truck's tail lights or other details to complete the design. In many cases, executing a tailgate design may combine opaque body panels with the glass surfaces of a video display may maintain these character lines and may use them to create the visible parting lines or surface changes between glass, paint, trim or carbon fiber. Additionally, initial HDS display panels may be of dark-appearing glass (similar to tinted rear vehicle windows) therefore blending these with any black composite, black paint, black rubber or traditional non-skid, wear-resistant finishes and panels with hardware represent resolvable design challenges. Additionally, it may be feasible to match a tailgate's digital display color to the overall truck's color and finish although there may be variations due to the way they are generated and respond under changing light conditions. Vehicle branding (such as logos, lettering and traditional automotive jewelry can be added to either the opaque or glazed (display) surfaces to great advantage, however a unique feature of HDS is that branding can also be digitally simulated using graphics, and optionally using cameras or other types of simple exterior body optical sensors and baste rendering algorithms to create realistic logos, chrome or reflective finishes and other traditional automotive hardware to realistically change as the daylight and shadow changes—as a vehicle passes into a tunnel for example—or as the vehicle rotates to reflect different parts of the surrounding sky or environment.

An HDS system that is integrated into a tailgate video communications system may be used to provide basic business signage and branding. In particular, the HDS system may include basic truck signage (e.g., large fleets or small, single vehicle business users). The HDS system, may also be used to provide personal promotion and/or advertising. In examples, the HDS system may display ads and/or self-promotion for a vehicle owner's business, in additional examples, a v!e/HDS business ad network (e.g., free business advertising) may be provided. Further, v!e social fulfillment, such as personal networking may be provided.

3rd Party Advertising may be displayed using an HDS. This, in turn, may be used to generate owner revenue. Examples of 3$^{rd}$ Party Advertising may include static tailgate billboard; hyper-relevant tailgate billboard; active location-based mobile retail (e.g., discounts, deals); and ad systems programmed to optimize ad revenue for drivers, lenders & company. Marketing aspects may also be displayed on an HDS system, such as the use of human facial recognition for automobiles for targeting purposes.

An HDS that is integrated within a tailgate video communications system may be used to display entertainment options. In particular, the HDS may be used to display Netflix movies; TailgateTV/TTV—(e.g., similar to MTV); aspects similar to the use of a Smart TV (e.g., watching stills, home videos, etc); uploading of exterior files (e.g., remote db); Tailgate Stickers—(e.g., electronic bumper stickers, either as downloads or self-created); Tailgate parties—(download ideas, tips, menus, equipment, Apps & Entertainment); and/or Vacation/Trip Recorder—software for the HDS on-board DVR.

Social Networking may also be enabled using an HDS system integrated within, a tailgate video communications system. For examples, the HDS may be used to display and interact with Tweets; SnapChat; Pinterest; Facebook; Breaking News; an HDS App Store; and basic v!e functionality.

Highway Safety & Utility may be increased using a tailgate video communications system. In particular, the use of an HDS integrated within a tailgate video communications system may be used to enable Amber Alerts; an empty parking spot locator; an alert to locale kids/pets between cars; V2V DSRC on-vehicle visible driving alerts; emergency/first-responder signage; law enforcement/stolen vehicle alert; law enforcement display override (e.g., takeover); general trouble & utility lighting (e.g., night work, trailer hitch, boat towing, etc); daisy-chaining slowing vehicles; see-through/blind spot reduction; vehicle spacing/stopping cue; traffic slow-creep alert (e.g., visual/audible warning); detour, road closures; and/or handicapped plaque.

Security for use with a tailgate video communications system may include a theft deterrent/tampering alarm (system); a database that retains suspect photos in memory; a GPS tracker/monitoring via Sync, OnStar, mbrace et al.; a system, that relays theft image w/audio to Ford (also law enforcement); and an alert to owner remotely via Internet.

Components of a tailgate video communications system may include an OLED display under curved glass; a carbon fiber tailgate structure; a handle/latch moving kit; a shock dampening/torsion spring kit; an automatic closer (optional); a microprocessor w/content storage (TiVo); a WiFi/DSRC transceiver; one or more stereo speakers (e.g., in the tailgate); a rear view camera; a front view camera; a proximity radar/sensor; a HDS free app (advertising/FAQs/all functionality); a remote tree app (smartphone to operate tailgate); a theft alarm w/GPS locator; and a microphone (e.g. for 2-way external communications).

App Developer Open Platform may include a v!e/HDS open developer platform SDK. In examples, the use of an open platform may incentivize developers for unlimited creativity.

Accessories of a tailgate video communications system may include an erectable sunshade/umbrella (e.g., attached to the tailgate); flip-out extra tailgate speakers; high-end remote & accessories similar to TV; a hitch tailgate seating, coolers, etc.; and a protective display cover.

A tailgate video communications system may be utilized to make, use, and sell an OEM or replacement truck tailgate assembly incorporating a (the largest possible) rear-facing digital video display within the basic physical package and dimensions of the original tailgate.

In examples, a replacement pickup truck tailgate assembly containing a digital television may be made, used, and sold.

In examples, a pickup truck tailgate assembly containing a digital television may be made, used, and sold exclusively for Ford F-150 pickup trucks.

In examples, the traditional center-mounted latch/handle/lock mechanism may be removed to produce a clear, full-width, unbroken digital video surface.

In examples, a curved, glass-faced video tailgate the full width of the traditional tailgate which is devoid of glass trim may be made, used, or sold, similar to the rear glazing on the rear/backlite of a contemporary SUV.

In examples, the outer surface of the tailgate's glass or plastic video display may be executed and a visible painted or opaque tailgate surfaces may be executed to conform to the pre-existing primary tailgate design contours, character lines and aesthetic queues (such aligning breaks and cut lines with pre-existing rear lighting or character lines) to maintain the vehicle's overall design and branding integrity.

In examples, a shock dampening system may be added as part of the new tailgate installation to cause the tailgate to lower slowly to its horizontal, position reducing or eliminating physical shock to its internal components.

In examples, the tailgate may be allowed to hinge not merely from the bottom, (as is conventional practice), but also from the right side, the left side, or both sides, rearward to an angle roughly perpendicular to the vehicle's rear bumper.

In examples, a new latch mechanism may be connected to the original or existing striker mechanism on the vertical inside jamb of the truck bed sides.

In examples, a new manual latch mechanism may be located along the upper edge or the inside edge of the new tailgate assembly.

In examples, a torsion rod, a negator spring, a shock strut or other load-alleviation means to counter-balance the weight of a tailgate assembly may be added for softer opening and closing.

In examples, an automatic powered closer mechanism may be provided for the tailgate assembly.

In examples, a remote access keypad or a smart-phone App may be provided to open and/or close the tailgate remotely or from a distance along with a wireless open vs. closed status alert.

In examples, a remote controller may be provided to allow users to choose video content or control the digital display from a remote location.

In examples, a small video camera may be placed or concealed for targeting purposes in or behind the glass face of the tailgate digital display.

In examples, forward-looking blind-spot cameras as well as rear-looking targeting cameras may be used together with modified facial/vehicle recognition software to identify the make, model, and year of surrounding vehicles and their physical location relative to the HDS-equipped vehicle.

In examples, a small security camera may be placed or concealed inside the rear window of the truck's cab to produce a clear view of the truck bed and the truck's tailgate.

In examples, the three cameras may be linked to motion-sensing software to identify when is a person within the field of view and to reasonably determine whether any contents of the truck's bed has shifted or been removed.

In examples, the output from the motion-sensing software may be linked to a theft-prevention system to record any motion event detected by any of the truck's three cameras, to secure that video Information together with the proceeding five minutes of video from, said cameras.

In examples, a GPS tracking system may be embedded inside the tailgate assembly for the purpose of tracking the location of the tailgate—whether or not the tailgate is attached or detached from the truck.

In examples, a tamper-proof, battery-powered theft-prevention system may be incorporated inside the tailgate, structure which may provide alerts in the event the tailgate is opened closed, removed or abused, and to then transmit an encoded alert and tracking signal to the owner's smart phone, laptop, or other designated devices, and if so directed, to law enforcement authorities and to the tracking receivers of other HDS-equipped vehicles within the vicinity.

In examples, a receiver may be incorporated inside the tailgate assembly or within the immediate surrounding truck structure which is designed to receive content requests from a vehicle, a mobile device or a network.

In examples, received content may relay requests (together with related/pertinent data) from said receiver to the onboard DVR/microprocessor and content storage database.

In examples, content may be displayed on the tailgate video display in response to signals received by the receiver.

In examples, the onboard DVR may be used for such other functions as an accident/event or crash recorder, a video trip recorder, all content storage, onboard memory, software storage, media distribution/confirmation data, marketing data, GPS data, queuing & playback software, downloadable content and entertainment, onboard signage, public service announcements, maps and systems information, the real-time recording of imagery from onboard security cameras, storage w/access for use by law enforcement or insurance entities, and other operational or storage requirements.

In examples, a forward-looking video camera may be placed on the front of the vehicle, or alternatively inside the windshield of that vehicle to capture a forward-looking point of view from the vehicle. Additionally, the view may be used to replicate the forward-looking camera in real time on the rear-facing digital display of the tailgate to achieve a "see-through" or blind-spot elimination capability for following vehicles intending to pass, as well as for other purposes.

In examples, the forward-looking video camera on the front of the vehicle may be used as a trip recorder, an accident or hazard recorder, for insurance purposes, for marketing and targeting purposes, for vehicle security, for documenting the presence or movements of other vehicles (such as vehicles which are stolen or are sought by law enforcement, for hobby or competition, purposes—to capture and distribute such imagery in either real time, delayed time or for later use, together with imagery from other on-board cameras in the memory of an on board vehicle DVR.

In examples, rear-looking video cameras may be used for any of the above purposes but to also enable a unique automotive vehicular "facial recognition" system in which visual characteristics and features of automobiles, such as make, model, year, style, color, condition, features (including license plates if deemed lawful) are identified and optionally compared with a database or used with algorithms for marketing, security, performance, social media, entertainment, personal, business, military and/or law enforcement purposes.

In examples, a vehicle's on-board video cameras may be used to create an ad hoc, automatically expanding tracking database capable of capturing images of other vehicles (or vehicle components) within eyesight when so directed by an on-board processor, remote beacon or signal from an owner user or law enforcement.

In examples, vehicle recognition, facial recognition, security and theft monitors may be used together with alert beacons and on-board camera video time-stamped with GPS coordinates to monitor physical theft of tailgates, payloads or property on an ongoing, real time basis and reporting same to law enforcement or to vehicle owners.

In examples, the proceeding five (5) or ten (10) minutes of video from said onboard cameras may be saved for use in an onboard crash-recorder for law enforcement, accident or insurance purposes.

In examples, DMV license plates, current registration, VIN Numbers and other essential data relating to motor vehicle Identification may be stored in the database of the HDS onboard DVR and, additionally, that information may be allowed to be called up and displayed on a requesting handheld or personal device by law enforcement.

In examples, an accurate, confirmed representation or facsimile of said vehicle's license plate and current registration may be called up from, an onboard vehicle database and may be immediately displayed, and said representation or facsimile may be locked in real time on the digital rear-end or tailgate video display. Additionally, that same imagery may be captured on a personal device or a smartphone.

In examples, a license plate and registration on an external video display affixed to said vehicle may be requested, permitted, enabled and irrevocably displayed and lock in a true and accurate image, and concurrently on any requesting handheld mobile device or smartphone.

In examples, the capture and storage of said imagery of said license plate and registration by a driver requesting said information may be enabled using the tactile or touch controls in a steering wheel, while in the act of driving, and may be recorded and/or archived in the form of a full-area screen-save from the HDS display transmitted wirelessly for said purpose, or by a POV camera attached to the front or other areas of said requesting vehicle.

In examples, the automatic capture of the information (including, but not limited to license plate, current registration, VIN number, make, model, year, street-view or stored photograph and GPS location) may be enabled, thereby creating an accurate freeze-frame snapshot simulation of all vehicles within an immediate vicinity of an accident and to store that information in the memory of any or all said immediate vicinity vehicles.

In examples, information about immediate vicinity vehicles may be captured and preserved for personal, insurance and/or law enforcement purposes to store and secure said information, and further to document the movements of said vehicles for the three (3) minutes proceeding any form of accident involving physical contact between vehicles or pedestrians.

In examples, content presentations may be automatically linked with highway traffic intersections, traffic signals and roadside infrastructure in which signal timing is used to calculate the available display slots for HDS messages prior to a signal change which in turn is used to queue content.

In examples, HDS content delivery may be linked on viewed vehicles to each vehicle's own FMVSS lighting and safety systems so that said systems are always assured priority over the display of HDS commercial content.

In examples, HDS display capabilities may be linked with local, national & global highway signage content for the real time interactive display of unique or enhancing highway roadside messaging.

In examples, DSRC V2V/V2I "roadside content" provisions may be used for the transmission, receipt, encoding, queuing, monitoring, security and implementation HDS content.

Eye-Tracking HUD for HDS Multi-Tasking

Examples of Heads-Up Display (HUD) with Eye-Tracking capability are provided. In examples, a system is disclosed which allows the driver of a first, moving object to manipulate visual imagery appearing on the exterior surface of a second moving object within his near field of view by using a windshield style Heads-Up Display (HUD) with Eye-Tracking capability and trackball thumb touch-screen controllers that are mounted on a steering wheel. The controllers may additionally or alternatively be mounted on other exposed surfaces within a vehicle, such as a shift knob, side panel, or central control panel. The controllers may be used to manipulate imagery on either the first or second objects and to move or process content appearing on the displays of either of such objects. A first display may be private, viewable only by its driver. Accordingly, in examples, a two-screen multi-tasking experience with non-moving motor vehicles may be provided.

Figure 11:
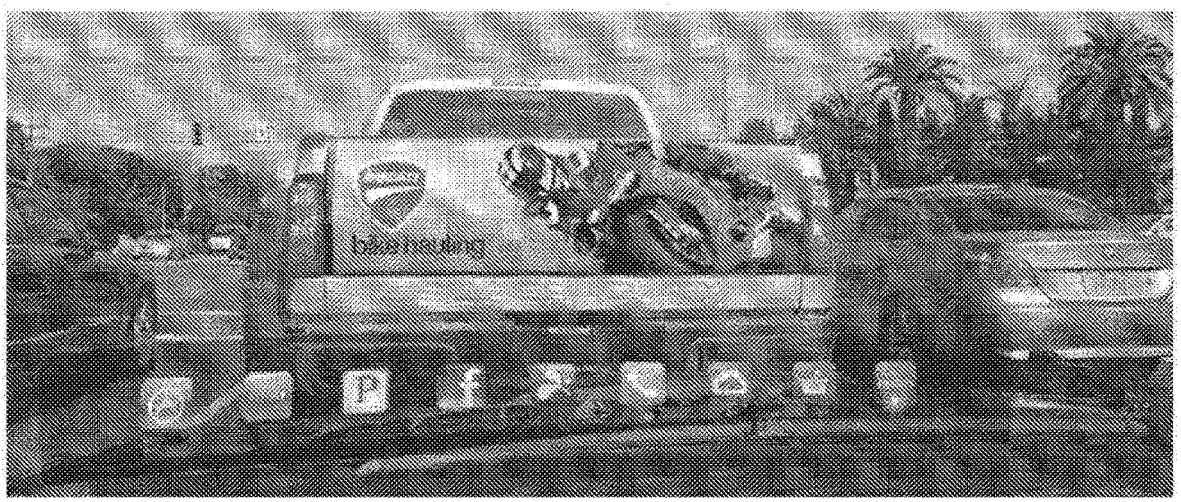
FIG. 11 illustrates a hyper-relevant digital surface integrated into a tailgate of a first vehicle, the hyper-relevant digital surface displaying an image coordinated with a heads-up display in a second vehicle, in accordance with embodiments of the invention.
Figure 12:
FIG. 12 illustrates a hyper-relevant digital surface integrated into a tailgate of a first vehicle, the hyper-relevant digital surface displaying an image selected by a user in a second vehicle, in accordance with embodiments of the invention.
Figure 13:
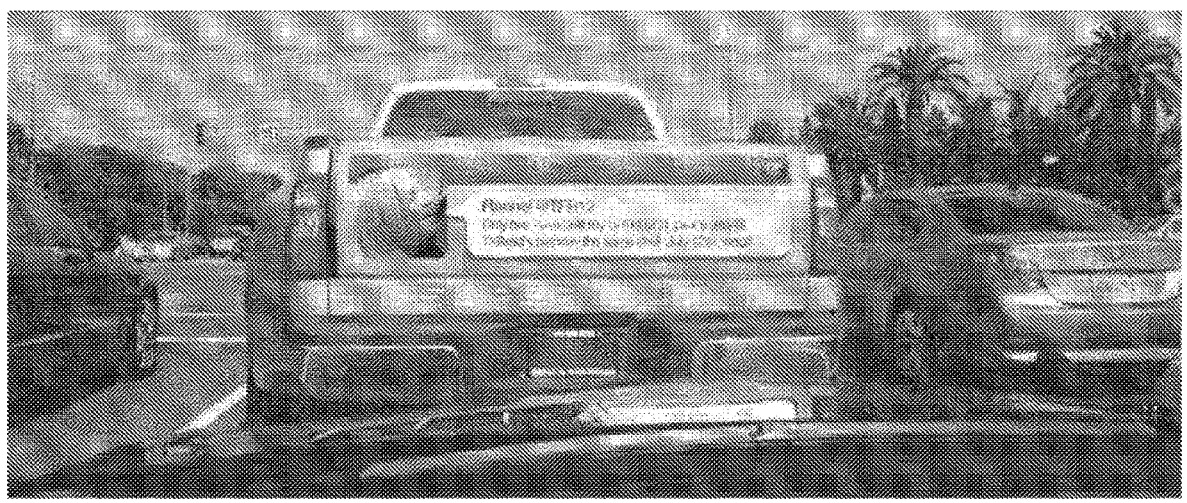
FIG. 13 illustrates another hyper-relevant digital surface integrated into a tailgate of a first vehicle, the hyper-relevant digital surface displaying an image selected by a user in a second vehicle, in accordance with embodiments of the invention.

FIG. 11 illustrates a hyper-relevant digital, surface integrated into a tailgate of a first vehicle, the hyper-relevant digital surface displaying an Image coordinated with a heads-up display in a second vehicle, in accordance with embodiments of the invention. Additionally, FIG. 12 illustrates a hyper-relevant digital surface integrated into a tailgate of a first vehicle, the hyper-relevant digital surface displaying an image selected by a user in a second vehicle, in accordance with embodiments of the invention. FIG. 13 illustrates another hyper-relevant digital surface integrated into a tailgate of a first vehicle, the hyper-relevant digital surface displaying an image selected by a user in a second vehicle, in accordance with embodiments of the invention.

Figure 14:
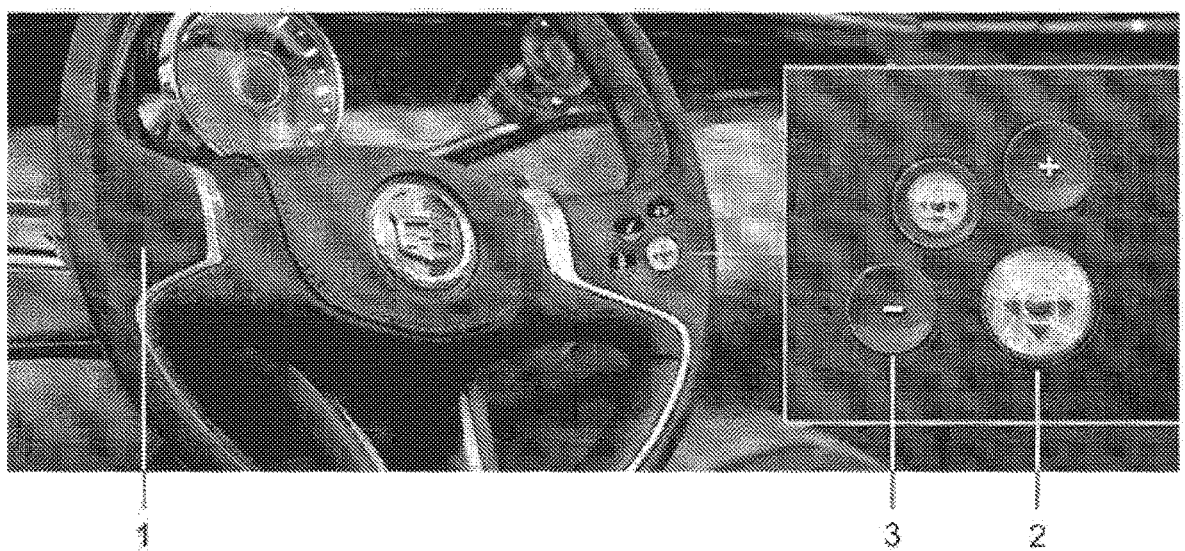
FIG. 14 shows a steering-wheel having a trackball and satellite buttons embedded therein, for controlling a heads-up display in accordance with embodiments of the invention.
Figure 15:
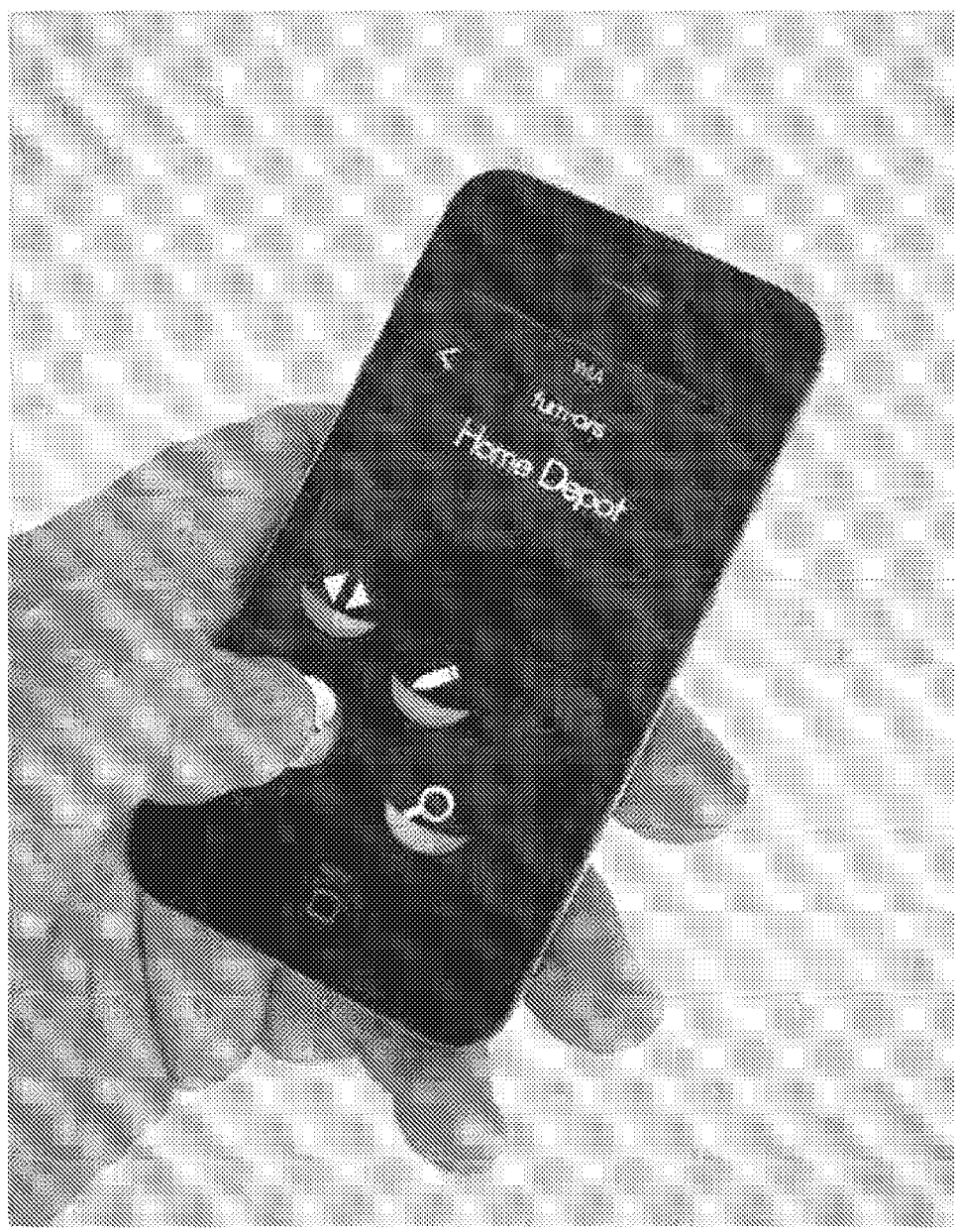
FIG. 15 shows a trackball with satellite buttons simulated on a smartphone, for controlling a heads-up display in accordance with embodiments of the invention.

FIG. 14 shows a steering-wheel having a trackball and satellite buttons embedded therein, for controlling a heads-up display in accordance with embodiments of the invention. In particular, FIG. 14 illustrates a quad controller on a right side of a steering wheel. Additionally, component 1 illustrates a position for a left-hand quad; component 2 illustrates a right thumb hand capacitive trackball with +/− change icons, and functions on satellite buttons. Further, component 3 displays options in HUD. FIG. 15 shows a left-thumb trackball with satellite buttons simulated on a smartphone for controlling a cursor or engaging buttons or icons on a remote HDS fixed or mobile exterior digital display on another vehicle, or in a heads-up display in accordance with embodiments of the invention. In particular, FIG. 15 provides a quad controller in a left-hand configuration on a smartphone with a FlashTag window active, said quad controller being flippable to a sight-thumb trackball with satellite buttons array on said smartphone.

Figure 16:
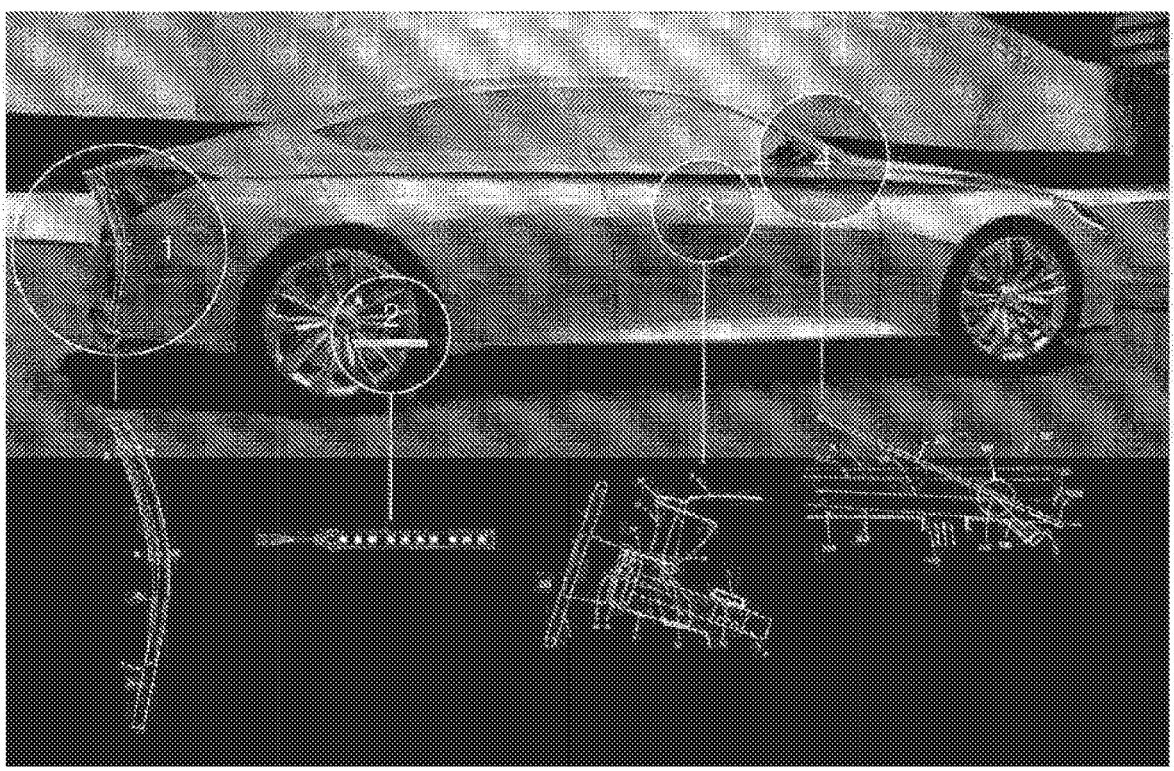
FIG. 16 illustrates a plurality of sites within an automobile for hyper-relevant digital surfaces or heads-up displays, in accordance with embodiments of the invention.

FIG. 16 illustrates a plurality of systems within an automobile for hyper-relevant digital surfaces or heads-up displays, in accordance with embodiments of the invention. In particular, FIG. 16 provides a proposed technology carve-outs for future automaker control of global media, communications, and advertising. FIG. 16 includes a component area 1 that provides for a rear-facing HDS body panel, however panels may be placed throughout. Additionally, component 2 provides a content database storage and distribution center, to assure the safe, governed display and consumption of content from foreign devices entering the automobile throughout, an automobile including wearables; component 3 provides advanced tactile controls and visual displays for steering wheels offering coordinated performance with HUD for hands on wheel and/or eyes on road driver communications. A visual display portion may a resolution of a least 300 ppi. In examples, the visual display-portion may have a resolution of at least 50 ppi, 100 ppi, 200 ppi, 300 ppi, 400 ppi, 500 ppi, or more than 500 ppi. Additionally, component 4 provides HUDs for the on-board data display of vehicle data and the reproduction and manipulation remote HDS imagery when superimposed in the HUD for driver multi-tasking.

Heads-Up Displays (HUDs) may be used in aircraft and a variety of automotive displays to supplement instrumentation and/or provide data (such as critical performance data or targeting information as in fighter aircraft). Such an overlay may be transparent so that a pilot, or driver simultaneously sees both the real-world view beyond with said instrumentation or critical, data superimposed on top. This may be done to allow a driver or pilot to keep his eyes on the road (or direction of flight) while keeping his hands free to drive/fly or perform related tasks.

Although pilots (and to some extent drivers) can change or influence the imagery they see on a HUD, as one can do with virtual reality (VR) gaming, HUDs may more commonly be read-only informational displays, in other examples, a driver/pilot, may alter, select, manipulate, or process the imagery he views, not merely on his own HUD but on the digital display surfaces of other moving objects which are independent, remote from his yet in his vehicle's path and/or line of sight.

In examples, eye-tracking technologies may be used to determine where a person looks for marketing purposes, and/or in what order they see things to judge the graphic layout and effectiveness of a web page, an advertisement, or a photograph. Eye-Tracking may also be used to control cursors on computer screens for the purpose of manipulating or processing information.

Systems and methods provided herein may allow owners/drivers to pull-up on a HUD horizontal rows of icons. Systems and methods may be personally arranged by the owner/driver into preferred groups relating to one or dozens of common functions, groups, services or categories, for example, in-vehicle entertainment, social media, navigational functions, communications, etc. that may be called collectively in automobile design, "infotainment." These in turn can be moved laterally (individually or in groups much like the App icons on a smartphone). This is made possible by left or right hand steering wheel mounted Quad Controllers disclosed in Applicant's U.S. Patent Provisional Application 61/613,898—"QUAD CONTROLLER FOR MOBILE TOUCH-SCREEN NAVIGATION" Assignee:

vie, Inc/Filed: Mar. 21, 2012. Quad controllers may include a capacitive/touch-screen trackball (which performs similar to a trackpad but can carry nomenclature, color and functionality which can be altered, by software). Quad controllers may have arrayed around them three satellite buttons or touch-sensitive areas, each of which may lead to further menu branching and functionality. By using both the left and right Quad controller trackballs in combination images. Icons and content on the HUD can be highlighted, deleted, moved, copied and generally manipulated in a similar manner as with a mouse (or trackpads) when using desktop computers.

Additionally, users can set up their HUD (or activate an on-screen icon) so that at the time a Quad controller is touched and held by the left or right trackball (a user preference), an eye-tracking cursor of an HUD may appear and can be moved with only a user's eye movements. As the cursor passes an icon (e.g., image, text, data, button, etc) it may highlight the same. Additionally, when the desired button or icon is highlighted, a release of the trackball by the user may engage that icon or function. When used in combination, a Quad controller and an eye-tracking system may perform any and all functions commonly found on contemporary computers, such as laptops. In contrast to using a laptop, the quad controller and eye tracking system may be used while seated comfortably and properly belted behind the wheel of a motor vehicle, with both hands ON the steering wheel, eyes forward and alert, engaged with the vehicle, the road beyond, and any vehicle or object in their path. As such, the quad controller and/or eye-tracking system may be used while a user is focused on the vital and informative communications area where one may naturally expect to receive such information which is also critical to the vehicle's operation and its driving environment.

Using the right and left thumb quad controllers may be used at the same time. As such, it may be possible to pop-up a qwerty keyboard into the HUD's display and use both thumbs to generate communications. In examples, the right and left thumb quad controllers may be used to generate, for example, a Tweet, a response to an email, or to caption a picture to post to Pinterest. These communications may be generated while using the same, moves that a user may use on a smartphone keyboard. In some examples, the quad controllers may be used in greater comfort, on a larger and dedicated display, without a driver taking eyes off the road or hands off the wheel. And without a doubt, much of the comfort may come from this system's ease of operation. In examples, comfort may be generated by eliminating pressures which may compromise one's concentration from having to glance up or worry about a changing traffic signal or blocking traffic due to being preoccupied. Instead, a system may alert a driver to a nearing light change or may alert the driver that traffic has begun to move a predetermined number of cars ahead of the driver's car. Additionally, a system as describe, herein may meet conditions to be an approved/legal system which may automatically manage a free moment or break so that a driver may complete tasks while waiting at a stop light.

V2V/V2I DSRC systems may alert a driver in the number of seconds needed on average to secure for the next stop before the light changes and traffic flows. Documents such as emails, phone book entries, calendars, memos, reminders or Tweets can be "read" audibly, or reviewed privately and quietly with "your eyes-only" protection in the HUD when your vehicle is not moving, in examples, the system, may use Flash Tags, which can visually stream individual words, or short, groups of words, into the HUD display where they flash-appear in sequence, in a size, a font and at a speed controlled entirely by the driver. FlashTags may be used to speed-read "incomings" whether they are personal notes or emails, edits in a business contract, or ads. Additionally, fixed-point read-in-place text may be an efficient method of reading offering greater comprehension with larger text in a smaller space. Additionally, fixed-point read-in-place text may also be easier to consume than moving one's eyes across a line of text. This may be especially true in examples when there is limited space to provide text. FlashTags may also allow on-the-road, stop'n text messaging with large well-framed words in a contemporary HUD presented in a size, contrast and word speed selected by users with delivery controlled by the slightest +/− movements of either thumb on the steering wheel trackball, always with eyes on the road ahead. FlashTags may also represent an effective over-the-road, device-free text-messaging platform highly functional in confined display spaces—from smartphones screens for which Applicant first applied for protection, up through the viewing of the large HDS displays on the digital rear ends of production cars and trucks.

The HUD and quad controller with eye-tracking may allow drivers viewing HDS displays to move cursors on remote objects to branch web pages, expand ads, highlight and/or engage icons. Additionally, the HUD and quad controller may be used to present, select, confirm and execute functions of a laptop or desktop using little mom than a user's thumb and eyes. An example of a quad-controller with its software-driven satellite options and FlashTags is described in detail in Applicant's previous filings: "FLASHTAGS FOR EXPANDING ELECTRONIC USER PROFILES and QUAD CONTROLLER FOR MOBILE TOUCHSCREEN NAVIGATION". Additionally, the use of a quad controller may make it possible to move a cursor, which can be selected from a number of visual tools, over the surface of a remote display by virtue of the direct interaction and real-time visual feedback of moving one's eyes to a point on the remote object. Additionally, that action as read by the eye-tracker may be replicated on a remote object, using software to assist in snap-aligning the remote cursor, thereby causing it to highlight the nearest most likely Icon or graphic element. Additionally, the user's confirmation may be followed by releasing the quad controller cursor button or making a subsequent move with his eyes. There may also variations where the cursor can be activated with one thumb and then guided in its motion by the other thumb, such as using the opposing quad controller, for control systems lacking an eye tracker, in one embodiment, cursor movement on the remote HDS display may be facilitated by the eye-tracker generating motion signals on a local computer duplication of the remote display graphic, then replicating that movement on the remote HDS display. In examples, the movement may be replicated via Dedicated Short Range Communications (DSRC), WiFi, or other types of closed circuit V2V systems which may be produced expressly for HDS.

The net experience may be a relaxed, automatically timed interactive experience at any traffic signal or stop where it is used. In examples, the net experience may be automatically timed via placement of a vehicle at an intersection. Examples of the invention may allow drivers to passively view content on an HDS-equipped vehicle in one's path. Additionally, examples allow drivers to actively use available time and technology to "borrow" and use the remote HDS display proactively and interactively in the time available for one's own purposes, e.g. to check email or to upload a Tweet on Twitter or a message for HDS distribution by Snapchat. As such, examples of the invention may be a safer way to consume content while behind the wheel compared to drivers who may use smartphones, tablets, or other computing devices that may otherwise distract a driver from the task of driving.

By combining the functionality of a HUD with the innovative viewing of a tandem positioned HDS-equipped vehicle, it is possible to perform graphic tasks not previously possible. When stopped or when the vehicles are paused within established motion parameters, a viewing driver to the rear of an HDS vehicle can, using his HUD and Quad controller, or a special App with a smartphone or wearable, project a cursor forward onto said HDS, so that with a tap and movement of a thumb, he can manipulate it using one or both of his Quad controllers or the App and the mobile device. As such, the driver can engage with, or respond to, interactive content presented in real time.

Additionally, business entities that wish to engage in mobile business, such as merchants, services, and/or advertisers, may eventually adapt the HDS platform by formatting new mobile pages in aspect ratios that are consistent with presentation on an HDS which is integrated into a tailgate of a vehicle. Additionally, design and graphics standards may also be developed and standardized so as to be consistent with presentation on an HUD that is integrated into an exterior surface of a vehicle. These assure pages may be simple to read in a V2V scenario—easy to access and use from the road where seamless browsing and buying can occur as easily as from a desktop. This may include examples that may be used to click on items, to scroll, to search, and to select objects.

In some examples, if a passenger is in a vehicle with a driver that wishes to engage with personal content presented on an external HDS, the driver may transfer arriving content from an external HDS-display to an HUD for private viewing. This can be done automatically through Preferences where users can designate the nature of content they wish to view or be presented under various circumstances, in certain locations, with certain company, at designated times or on certain issues. For example, a system may automatically present an Alert in a HUD or automatically shift a display from an external HDS display to an HUD display for private viewing if the system senses more than a threshold amount of weight on a passenger seat. This preference may be disengaged, such as if the driver is using a passenger seat to hold groceries, thereby potentially having more than a threshold amount of weight on a passenger seat. Additionally, each HUD display may have a "private" mode and a 'forward/back' control graphic which may allow viewers to instantly shift certain types of content from a public view to a personal view quickly and easily into the HUD where it can only be seen by the driver. This may be done, for example, when a driver might receive a Tweet or a mobile SnapChat and wish to reply in a confidential text or post a personal photo; when a driver might receive a promotion from a name brand retailer but then search, browse or purchase a very personal or sensitive item or surprise gift; and/or when a businessman might send or receive confidential information while others were present, who are not privy to the information.

In examples, mobile purchases can be accessed through your non-mobile web network as usual. If a driver in traffic is interacting with a website and a transaction is interrupted because traffic has re-started, a driver can complete the transaction at work or later at home. Alternatively and unless time shifted later, an HDS may automatically resume exactly where it left off when you pause behind the next HDS vehicle. By merging your IP Address your GPS location and VIN under a unique, constantly fluid security gold code, HDS presentations and user transactions may not be hacked or intercepted by others and accounts are secure.

Drivers can participate in mobile communications or not. In examples, content that is provided to users may be reflected in requests received from users. Users may view the content or may tune-out the content, in examples. When a user may opt to engage content, the users may do so without taking their hands off the wheel or their eyes off the road. Additionally, the users can respond or interact with the comfort of knowing they may be alerted before traffic begins to flow so they may not block nor impede traffic or find themselves caught up and unprepared to drive. Before a signal goes green, an alert may appear, either visually in the HUD or on an HDS display, or as an audio tone through the vehicle's sound system. Additionally or alternatively, as a signal changes or approaches changing, components of the system may be closed. In examples, documents and desktop may gently fade. In other examples, components of the system may automatically reappear at the next stop.

In examples, functional icons may be activated and queued in a vehicular Heads-Up Display (HUD) using driver/pilot eye-tracking with an interactive steering wheel quad controller.

Functional icons may be engaged in a vehicular Heads-Up Display (HUD) using a capacitive trackball (or trackpad) in a left or right thumb steering wheel Quad controller.

In additional examples, functional icons may be selected and activated in a vehicular Heads-Up Display (HUD) using driver/pilot eye-tracking with left hand or right hand thumb-entered Inputs from a capacitive trackball (or trackpad).

In examples, imagery from a vehicular Heads-Up Display (HUD) may be combined with real time imagery superimposed over digital video imagery displayed on the aft-facing exterior surfaces of moving objects. In additional examples, an HDS display may be engaged by a passerby (e.g., a driver in a following car or a pedestrian). The passerby may engaged the HDS display using a smartphone and/or a wearable device which may replicate a steering wheel quad controller/trackball to allow the passerby to link with and/or manipulate a cursor. The passerby may manipulate a cursor or engage buttons on an HDS display using the smartphone and/or wearable interface instead of having an automobile or up-to-date steering wheel control. Additionally, the HDS may be used to present content that may offer viewers a real-time linkup (e.g., marketing opportunity) that may be used to wirelessly accept new portable/mobile devices and, upon approval of the device's owner, to receive an instant download that may enable sign-ups, membership enrollments, registrations, and further downloads. Examples of service start-ups may be completed at a later time period using; the same or distinct device, such as completing the service start-ups in an on-line environment after an initial pitch has been initiated, such as using an HDS display using near-field communications.

HDS Vehicle Ownership Financial Model

In examples, a pair of business scenarios may provide innovative financing to prospective vehicle owners who may have limited resources, strained credit, or other challenges. In some examples, the innovative financing may be offered to a subset of potential consumers, such as those consumers who have otherwise demonstrated responsibility in other areas of their lives. Examples of innovating financing may be used to build-out and expand a mobile advertising network. For example, an ad-revenue generating model may be used to finance the special equipment and vehicles; both offer the similar income streams to individuals who need it and may have few options for financing, fueling, and insuring a motor vehicle. Each business scenario may represent a possible embodiment of the invention. Additionally, each scenario may support a long term success and growth of the platform. In examples, each scenario may support a long term, success and growth of the platform, in a unique way. Accordingly, a first business model may provide a unique method of system, financing through the distribution of newly manufactured HDS-equipped vehicles through automobile dealerships. Further, a second business model may allow the owners of both new and older vehicles to add the HDS system and, as such, participate in a similar way as new vehicle owners.

In some examples, an Applicant may have one or more of four considerations when describing business models and to generating consumer acceptance of the display of commercial messages on personal vehicles, such as their own vehicles. These four considerations may include: having few or zero driver distractions; having little or no invasion of personal space; having user-requested content & control; and having financial rewards.

As such, HDS may offer consumers a unique and exceptional financial return as compensation for displaying personal or commercial content on vehicles they own or hope to own. In some examples, owners may foe asked to, for instance, just do their normal day-to-day driving to earn benefits as discussed herein. Additionally, initial projections based on charging advertisers foes that may be lower than those charged by Google for considerably less in terms of targeting quality, non-video display, and largely inattentive audiences may indicate that the average driver can generate enough revenue to cover a $300+ monthly lease or purchase. This amount of revenue may be enough to cover the full cost of new car ownership.

A first business plan may include a relationship with a major automaker providing access to all-new production vehicles, appropriate volumes for critical mass of the ad network, and a dealership network. Such a first business plan may alternatively be structured around a major retailer representing a source of logistics, or quite possibly a combination of an automaker and a retailer. HDS pickup truck tailgates, may be produced in one location (e.g., country then shipped or imported to another location where they are incorporated into the OEM production lines. A second business plan may suggest an independent automotive conversion start-up in which specific products, such as HDS pickup truck tailgates, may be produced in one location (e.g., country) then shipped or imported to another location where the products may be retrofitted to currently or previously owned motor vehicles. Such a retrofit model may be enabled nationwide, such as through the same new car dealerships, or they might be handled through franchises set up by a parent HDS company. In addition, the first and second business plans may be combined in some examples. In these examples, the operations of the first and second business plans may be expanded beyond basic pickup trucks to other types of commercial and personal vehicles. In other examples, the first and/or second business plans may be used for marketing, procurement and incentivized purchase, modes intended for use or with any type of automotive vehicle, aircraft, bus, truck, boat, billboard, property or display surface whether or not generated, projected or temporarily created, or use with such other fixed or mobile objects, real property or visible surfaces which may be used to display personal and/or commercial, revenue-generating content.

A rewards model may be structured in numerous ways. In examples, a rewards model may be based on the use of compensation scenarios other than cash (e.g., insurance, discounts, gifts, bonuses, and/or premiums). In another example, a vehicle manufacturer, and/or a vehicle retailer who might buys such vehicles, may make its vehicles available to customers with little or no cash down payment, and possibly without even monthly payments, or dramatically reduced payments, while it retains title to the vehicle. The vehicle manufacturer may collect 100% (or some portion thereof) of the advertising revenue that is generated by the financed vehicle as a result of the buyer/driver/prospective owner's use of said vehicle until the contract has been paid off.

In an example, a prospective HDS owner may shop for a pickup truck model at dealership or online. The prospective owner may complete a detailed application and contract. The detailed application and contract may include at least one of 1) a preliminary personal profile, including a proposed driving profile (e.g., hours, routes, time of day, etc); a driving and police record check; a proof of valid driver's license and present insurance and/or future insurance capacity; downloads mandatory Pic'UPs App & Program Profile and sets up an account; and executes contract/submits application, to a vehicle company for approval.

Upon approval, the prospective owner may take delivery of the HDS-equipped pickup truck. In examples, no down-payment (or, alternatively, a minimal down-payment) with little or no monthly payments may be required. In other examples, an HDS driver may complete additional profiling on himself and his family at home, such as on his own time. In additional examples, an HDS driver may be required to submit to HDS mandatory on line safety & best practices reviews, or substance abuse testing, or to participate as desired, in a vehicle manufacturer's online programs with respect to; HDS safety/driving guidelines; use of HDS entertainment features: use of HDS for his own business purposes; how to optimize HDS personal mobile advertising incomes; managing/maintaining the proper insurance; what an HDS does for each owner and the community (e.g., DMV, legal, membership, environment), etc. In further examples, an HDS driver may download a desired mobile and/or desktop application, in examples, the desired mobile and/or desktop application may include desired business and/or social services, such as a v!e social fulfillment app; a vehicle manufacture special connections program; a small business branding/support component; an HDS support/alliance group engagement component that may be used for engaging, for example, Angie's List, TaskRabbit, LinkedIn, etc. Additionally, the desired business and/or social services may include a launch of a v!e App for at least one of specialized jobs & employment; buying/selling; moving & hauling; skills & learning (e.g., professional); education/learning; personal relationships; business connections/opportunities; and personal & business research platform. It is possible that the social fulfillment/social services App may be branded to include the name(s) or mark(s) of any partnering automaker or retailer.

In examples, an HDS driver may conduct his own normal business and personal driving activities. An HDS vehicle may display ads, lawful signage, public service announcements (PSA's), requested messaging, or branding with paid or personal content based on owner preferences, contractual obligations, and/or various other HDS media and communications Apps and V2V/V2I wireless networking systems. As a result the system may perform, automatically so that a driver needs to do little but drive and maintain his vehicle per his HDS agreement. In some models, an HDS driver may be responsible for fuel, maintenance, insurance & repairs. In some examples, a vehicle warranty may additionally apply. Further, an HDS driver may be reimbursed for certain expenses (including fuel) under some models. Additionally, the HDS entity may remotely monitor a vehicle's GPS routes with timing, e.g. part of a distribution agreement. Such an agreement may allow an HDS driver to temporarily disable remote tracking when conducting personal business, in the interest of personal privacy. The HDS driver may also receive monthly accountings of all ad displays w/location, duration, and earnings. In other aspects of financial models, a vehicle manufacturer may receive benefits. In examples, a vehicle manufacturer may retain at least some advertiser revenue. In some examples, the advertising revenue may be applied towards a minimum, vehicle purchase. Additionally, the vehicle manufacturer may retain title to vehicle until loan/advance is paid off. The vehicle manufacturer may also, optionally, withhold revenue overages in driver escrow account to cover earnings which are below contract minimums, defaults, etc. In additional examples, a vehicle manufacturer, at its sole option (once track record is established), may pass overages on to driver, based on driver performance or other performance indicators.

In examples, when a vehicle has been fully paid off, an HDS driver may get a title and percentage of shares of future advertising revenues. Additionally, the percentage may be adjusted by driver's performance during purchase period. The purchase may allow new drivers to establish credit history plus sustained secondary incomes. Additionally, the model may increase the personal (or HDS business) State & Federal income tax base, or may enable widespread secondary jobs and incomes and instill ownership pride & confidence. Farther, the financing and use of the vehicle may be done in connection with a Pic'UPs Application or Business Model or with quick-loading GPS/ULD storage modules, as discussed in other parts of this document.

In additional examples, a user can disable ad-tracking system for personal privacy however this cannot be done during a delivery mission where delivery security may be an issue. Disabling may terminate revenue tracking. Sustained violations, misrepresentations, record falsifications, etc., could lead to driver termination or possible forfeiture of vehicle or 'theretofore earned" revenues or ownership in said vehicle. In other examples, however, traffic, PSA, and/or safety systems continue functioning and reporting normally.

Numerous alternative business model formats are possible for enabling a variety of vehicle purchase or lease opportunities. Additionally, in examples, an individual can buy and/or pay for an HDS vehicle by paying for it outright or financing it conventionally.

For an HDS pickup truck tailgate retrofit model (or retrofits for other classes of vehicles) a prospective HDS owner may shop online (e.g., in response to Company promotions or advertising) to determine the availability and type of conversion for his/her existing personally-owned vehicle. Additionally, a fleet operator might do much the same for specific makes, models, years, and numbers of vehicles. Prospective HDS owner/operators may then complete a detailed company order form, application, and contract requirements, such as: a preliminary personal profile, including proposed driving profile (e.g., hours, routes, time of day, etc); a possible credit check, driving and police record check; a proof of valid driver's license & current insurance and/or future insurance capacity; download an HDS and/or Pic'UPs App and sets up account; and execute a contract/submit an application for company approval.

Additionally, upon company approval, prospective HDS owner/operators may set appointment(s) for conversion of personal vehicle or fleet vehicles at local company-operated conversion facilities. The HDS owner/operator may pay service, installation, set-up, software and insurance fees. Additionally, the HDS driver may complete additional profiling on himself & family at home on his own time. An HDS driver may also offer participation in company-operated, income-generating opportunities. Additionally, an HDS driver may participate, as desired, in company HDS programs with respect to: HDS safety/driving guidelines; use of HDS entertainment features; use of HDS for his own business purposes; optimizing HDS personal mobile media and advertising incomes: managing/maintaining the proper insurance; determining what HDS does for each owner and the community (e.g., DMV, legal, membership, environment), etc.

Additionally, a new HDS owner/operator may download, desired Mobile or Desktop Applications offering the desired company business and social services, such as: v!e Social Fulfillment Hyper-App; Pic'UPS—a special connections program; Small Business Branding/support; Engages HDS support/alliance groups (Angie's List, TaskRabbit LinkedIn, etc); Launches v!e App for: specialized jobs/employment; buying/selling; moving & hauling; skills & learning (professional); education/learning; personal relationships; business connections/opportunities and personal & business research platform. An HDS driver may also conduct his own normal business & personal daily driving activities. For example, an HDS owner/operator and vehicle may display ads, lawful signage, public service announcements (PSA's), 1st responder signage, alerts or branding. Examples of the system may perform such that a driver needs to do little but drive and maintain vehicle per contract. HDS owner/operator may also be responsible for all vehicle fuel, maintenance, insurance & repairs. HDS driver may be reimbursed for certain expenses (including fuel) under some models. Additionally, an HDS owner/operator may receive monthly accounting of advertisement displays w/location, duration and earnings, less connecting commissions and platform fees withheld by company, manufacturer, partner or any other entity. An HDS owner/operator may pay income taxes, costs and fees relating to his/her ongoing maintenance, purchase, lease, operation, insurance or other related costs such as traffic citations, parking fines, repairs, insurance payment defaults, traffic school expenses or other fees and expenses related to owner/operator's business or personal use of vehicle(s). Such fees or expenses if unpaid could result in driver/owner's forfeiture of membership, termination or suspension from certain business models or repossession of an HDS vehicle. HDS owner/operator may also pay monthly charges (if any) for his/her lease or purchase of HDS platform hardware & software. The foregoing description may include and apply to the use of the vehicle in connection with the Pic'UPs Application or Business Model or with quick-loading GPS/ULD storage modules, as discussed below.

This is but one of many possible business scenarios which may be made available to prospective HDS owner/operators as embodiments to the invention, individuals can buy and/or pay for an HDS vehicle by paying for it outright, financing it conventionally, by putting up an item, such as an existing vehicle, as security. In examples, an HDS display may be integrated into an exterior surface of a vehicle. In additional examples, an HDS display may be integrated into an interior surface of a vehicle. As such, the HDS display may be viewed by a third-party, such as a passenger, pedestrian, or passing vehicle, when presenting content on an external, surface or an interior surface of a vehicle.

In examples, revenue may be generated from the display of content on the exterior surfaces of fixed or moving objects and to simultaneously engage an optimum number of volume-produced objects for this purpose within the least amount of time.

In other examples, revenue that is generated from the display of content on the exterior surfaces of said fixed or moving volume-produced objects may be applied towards the purchase of those objects, in particular, revenue that is generated may be simultaneously applied towards the purchase of those objects.

In additional examples, a dedicated computer application may be enabled for use with said fixed or moving volume-produced objects, to enable, enhance, sustain and optimize said object's abilities to generate revenue.

In further examples, consumers may be offered an affordable model for acquiring a new vehicle with little or no money down, low to moderate credit scores and minimal (if any) monthly payments, thereby affording potential new owners an exceptional opportunity to establish a new business with a new commercial vehicle and accompanying income to get started.

In additional, examples, income may be earned by displaying commercial content on said personal vehicles while doing little more than normal everyday or day-to-day driving.

In other examples, students, immigrants, unemployed drivers, veterans, blue collar workers, and/or a person in need who is a qualified driver with a current driver's license and clean driving and police record may be given an opportunity to pay for their cost of new vehicle ownership while searching for or actually working a full-time job.

In some examples, a partnership with an established motor company may be generated so as to make said partner's new vehicles available on terms acceptable to the company, new partner and new buyer or lessee—and to sell or lease said new vehicles where new partner holds title on said new vehicle(s) and holds revenues generated from the display of commercial content on said vehicles until said vehicle or purchase contract has been properly paid off.

In examples, a tailgate retrofit model is enabled for the general public for personal or business purposes in which new HDS digital video communications systems are installed with onboard security systems and related hardware and software, on pre-owned, retired, reconditioned or earlier-produced vehicles in which the foregoing financial model is applied to all such equipment, labor or operations.

In other examples, Vehicle Lease/Purchase Financial & Marketing Model is enabled that is applicable to any type of automotive vehicle, aircraft, bus, truck, boat, billboard, property or surface—whether generated, projected or temporarily created, or to such other fixed, or mobile objects, real property or surfaces—which could conceivably be used to display personal or commercial revenue-generating content.

In examples, critical mass is built for a unique mobile advertising platform by enabling the very low cost mass ownership and operation of new cars and trucks which are capable of displaying said advertising.

In additional examples, critical mass is built and maintained for a mobile advertising platform through the creation a computer implemented social fulfillment & delivery application designed to keep the maximum number of participating vehicles on the road as a distribution platform.

In further examples, participation and individual performance is incentivized by linking the purchase/lease and access to their vehicle to its regular and sustained use for its contractual purposes.

Shared-Logistics Collaborative Application for Motor Vehicles

In examples, "Pic' UPS; A Shared-Logistics Collaborative App for Motor Vehicles" is a free Application ("App") which allows HDS-equipped vehicles to generate sustained incomes that may be used to enable their prospective owners to pay off financing contracts sooner and/or generate sustained revenue from the display of commercial content. The Pic'UPS App may be used to accomplish three key objectives: (1) generate critical mass for a mobile media platform; (2) advance the state of the art of Mobile and Digital Out Of Home advertising, and; (3) produce sustainable incomes to enable early funding and sustained operations for an ad-supported On-Demand global delivery network.

With respect to generating critical mass for a mobile media, platform, an innovative mobile media & communications platform, which would normally require substantial financial investment in start-up equipment, labor, overhead and infrastructure is provided. By linking HDS technology exclusively or almost exclusively to pickup trucks and commercial vehicles, and by incentivizing their use and compensating its drivers while paying the costs of transportation services from the 40%-60% profit margins generated from hyper-targeted display or "branded delivery" on each trip, the Pic'UPS App may be used to create high earnings for the company, a reliable job network for its drivers, a free anytime/anywhere personal service for consumers, an order of magnitude increase in truck sales for vehicle manufacturers, and a powerful advertisement and fleet presence for the retailers it serves.

Additionally, innovative financing and new vehicles may provide thousands of sole proprietors with head starts in their own business, education, jobs, connections and incomes in the fields of Mobile Advertising, Digital Out Of Home advertising, and On-Demand Pickup & Delivery, which may sometimes be called Same-Day Delivery (SDD) or Last-Mile Delivery or Logistics. Thanks to the HDS' unique vehicle financing model, first time buyers may not only get financially advantageous deals, and possibly interest-free loans, on a new cars or commercial vehicles, they may also get a job with protected positions and stable earnings to pay them off.

Additionally, an HDS may not limit a user's options or opportunities. In particular, the HDS may be used to generate an income with flexible hours, unlimited locations, terrific wages, a secure/private place to work and the transportation to get there, and a freedom to work where and when they want or need and a way to pursue independent personal opportunities along the way. In examples, pickup trucks, including HDS-enhanced pickup trucks or light and heavy duty commercial trucks and vans may be used along with an application, such as a Pic'UPS App. A Pic'UPS App may be a shared-use, truck-accessing collaborative that is designed to connect truck owners with people in their immediate areas who need a truck temporarily, have special jobs or drive missions which can use them, or need one to pick up a special order you may have placed online and get it to you ASAP! The Pic'UPS App may allow consumers who need a truck to connect with nearby truck owners & drivers using smartphones, wearables or any variety of mobile devices.

In this way, Pic'UPS app may be used as a connecting resource which introduces consumers to truck owner/operators to perform temporary or short duration jobs at mutually convenient times or by special reservation. The PicUPs app may be used for projects in a given city, and may be used for a given, mission. Pic'UPS may also be used as an app that connects a user with one or more favorite stores where the users shops. Once connected to one or more stores, a user can order online and then click on the "Pic'UPS" Icon at checkout and get the item or items delivered to an address associated with the user. The address may be a residential address, the address may be a business address, or the residence may be another address that is input by or connected to the user. In some examples, items that are delivered to the users may be delivered without charge. In additional examples, items that are delivered to the users may be delivered overnight. In still other examples, items may be delivered within minutes or within hours of placing an order.

In additional examples, a Pic'UPS app may be used as a business model in combination with an HDS digital, media/communications platform. In examples, the resulting model may be used to offset costs of conventional vehicle rentals, collaborative ride-sharing, and even courier-based same-day or $2^{nd}$-day delivery. In particular the Pic'UPS app may generate revenue from the display of hyper-targeted advertising which may produce sustained profit margins of from 20% to 60%. In other words, Pic'UPS may be used as a way for collaborating drivers to generate new incomes while using their existing vehicles (over and above say, their normal everyday business) and a way for customers who need trucks for spontaneous purposes to gain affordable access along with experienced drivers for far less cost and greater convenience than the customers would find elsewhere.

In some examples, Pic'UPS and v!e may use photo-recognition as a profile veracity check to assure a member matches the visual identity of the person(s) they are connecting with. For example, Pic'UPS & v!e may link one or more photo(s) supplied to it for the purposes of membership and ID to internal and external, public and/or private photo-recognition databases. In this way, Pic'UPS and v!e may be used as a security and veracity-check option for Pic'UPS and via members/users and may be created and deployed by Pic'UPS and v!e as either a fee-based business, a fee business, or customer service. As such, a Pic'UPS service may allow users to perform personal instant facial-recognition searches to reveal any negative or positive information about the person with whom they are about to connect or do business.

Additionally, a consumer use model may be used to provide trucks or commercial vans to consumers who need them. Trucks that are used by the consumer user model may also be used to pick up and deliver packages; to haul items (such as trash) to a dump; to transport items to storage; and for other purposes. Accordingly, a consumer may engage a Pic'UPS smartphone App and request a truck. In examples, a truck may be requested by providing information to the Pic'UPS App.

When requesting a truck, a consumer may have a customer profile and photo that is already in the PicUP's App database, Additionally, the consumer may store payment information in the customer profile, such as credit card information or PayPal information. The consumer may also snap a photo of the job to be performed and attach it for bidding on manual labor when the user is requesting the truck or commercial van. Additionally, consumers may use Pic'UPS as a mode of travel, where the travel may be at a stated rate unless a special vehicle or route is requested. The consumer may also specify a desired time that the user wants the vehicle to show up, when the consumer wants the job to commence, and when the user wants the job to end. Further, the consumer may specify a pickup point and a delivery point for a truck request. In particular, the consumer may have miles and times automatically estimated using traditional mapping algorithms. Within minutes of submitting a truck request, a customer may receive quotes for the job based on special labor, unique equipment, or expenses. Additionally, drivers may be rated by customers. Customers may also request a driver they may have used previously. Once a truck request has been made, a customer and driver can confirm a place to connect or RSVP a time and place. In addition, drivers may confirm arrivals in advance and may get paid for special labor after a requested job is successfully completed.

After a truck request has been made, the drivers, trucks, and any needed assistants may come to the consumer within a predetermined period of time. The amount of time between a consumer providing a truck request and a truck arriving may range from a few minutes to a few hours to a few days, depending on traffic and truck availability. Alternatively, the truck, driver, and/or assistant may arrive at a prearranged time. Once a truck arrives, a consumer may direct loading of the pickup track, may have others load the pickup truck, or may load the pickup truck themselves. Once a tack is loaded, the truck may move on to its destination. In examples, the drivers may have the delivery destination and/or the preferred route programmed into their on-board navigation system(s). Additionally, delivery logistical information may have been transmitted to the company. In examples, the trucks may be followed by the consumer in a separate car. In other examples, the consumer may arrange for someone else to meet them at their point of arrival (e.g., the consumer's specified destination). Additionally, a consumer can track the cargo and the trip's progress in real time on a smartphone. Additionally or alternatively, the consumer can monitor his cargo and/or possessions en-route through constant secure video streaming. In examples, constant secure video streaming may be provided to a consumer using a link that is accessible by the consumer and/or the Pic'UPS entity. As such, a consumer may constantly monitor his shipment as it progresses and retains a full video record of the service to assure there has been no damage and that services were rendered properly. Once the consumer's pay load arrives safely at its destination, either the consumer or the recipient can confirm that the payload has been delivered, in examples, after the delivery has been completed, the consumer may confirm the delivery has been completed and may authorize the job to be charged to the consumer's credit card.

Drivers that are hired to drive for requested truck assignments may be carefully screened by a company that organizes truck requests. In examples, each driver may have a profile photo and each driver may be required to pass a background check and/or driving checks. Additionally or alternatively, each, driver may hold a valid driver's license for the areas in which they intend to operate together with personal, and/or commercial insurance covering private vehicle and transportation activities and traditional coverages. Some drivers may use their own trucks to complete truck requests when the drivers are experienced behind the wheel of their own vehicles, are fully trained in Pic'UPS operations, company procedures & policy and have had their vehicles inspected and have been mentored by a company-operations professional. In examples, drivers' performance for the company may be properly licensed, bonded, and insured by the Pic'UPS entity. Pic'UPS drivers may be rated by consumers (and consumers may be rated by Pic'UPS drivers) after a delivery has been conducted. Low ratings, complaints, or unimproved sub-standard driver performance may be reasons for suspension of a driver by the company.

Additionally, company drivers may be required to carry their own collision and comprehensive insurance in foil force to participate in truck requests. The company may also provide drivers with additional commercial coverage for all Pic'UPS operations including: excess liability of $1,000,000 or more covering driver liability for bodily injury and/or property damage of passengers and/or cargo or 3rd parties (from trip acceptance to conclusion); Contingent Comprehensive & Collision; Excess Uninsured & Underinsured Motorist Coverage; Contingent Liability Coverage covering driver liability for bodily injury, property damage of passengers and/or 3rd parties; additional insurance coverage as deemed necessary.

Drivers may be screened for criminal offenses and driving infractions through resources such as countywide/nationwide databases, social media sites and sex-offender registries. Reasons for disqualification of drivers may include: the driver is under 21 years, the driver has inadequate driving experience, the driver has an invalid license; the driver has invalid personal insurance; the driver has moving violations within specified periods or circumstances; the driver has DUIs or drug-related driving violations; the driver has severe or extreme infractions with respect to lifetime driving histories; the driver has been convicted of violent crimes, sexual offenses, theft, property damage or felonies; and/or the driver has damaged, sub-standard or unacceptable vehicle conditions.

Drivers may receive weekly or monthly payments as a percentage of receipts by the company for services rendered based on computer documented travel and CPS records and the nature and ratings for the display advertising content while performing independent or Pic'UPS activities. Drivers may also be reimbursed (or they bill and collect directly from clients) for personal labor and out-of-pocket expenses negotiated by contract. Additionally, drivers may choose their own hours of operation providing it conforms to Pic'UPS' company operations and regulations.

Additionally, a consumer's possessions and/or a Pic'UPS driver(s) may be monitored constantly. In examples, the consumer's possessions may be monitored from the time the consumer places an order until the time the consumer signs-off after delivery. The arrival of possessions at a delivery point, the load-in, the trip, and the destination including the load-out may be covered from beginning to end by GPS and video security cameras which may retain the video and route data until the trip is complete, and in examples, for extended periods there-after. Additionally, accidents or breakage of possessions may be fully documented on video and are time stamped with the GPS location.

Further, if a Pic'UPS driver alters his route, stops, is delayed, goes offline, or terminates live transmissions during a trip, certain events may immediately occur based on the details: Pic'UPS may be promptly alerted and law enforcement may be dispatched to the vehicle's or driver's last known location(s); the removal of a payload may be recorded from multiple cameras and recorded imagery from the trip may be stored at a secure, remote location until the company can assure a job or mission has been properly completed. Deviation from planned routes, disappearance, or disturbance of trucks or payloads, theft or accidents, may be monitored in real time by the Pic'UPS secure network of video cameras aboard each vehicle and throughout an operating community. In the event of a lost, stolen, or suspect Pic'UPS vehicle or vehicle contents, a tamper-proof security beacon installed in that vehicle can be remotely activated to alert other Pic'UPS drivers and vehicles nearby and along a known, anticipated or projected route based on algorithms and GPS tracking. When a suspect vehicle alert is received by another nearby Pic'UPS vehicle, the 3-camera video surveillance system of the nearby Pic-UPs vehicle may be activated to capture multiple surrounding views with GPS time-stamped imagery of the suspect vehicle as it passes within range, Additionally, a composite array of images that reflect the movements of a stolen or suspect vehicle can be compiled as an aid to law enforcement or to confirm a vehicle's true movements for a court of law. The foregoing may also apply to the use of quick-loading GPS/ULD storage modules, which are explained in this application.

In some examples, Pic'UPS can guarantee the lowest possible pricing for connecting services because the company may generate revenue from operations which may be supported by an advertising & media/communications network generating 20% to 60% free and clear profit margins from the display of hyper-relevant advertising, rather than relying on the very slim margins from grocery retail or the high cost of route-based bulk early delivery. Additionally, the Pic'UPS app may be used to make shopping more convenient. Additionally, the Pic'UPS app may be used to interact with HDS systems, such as interacting with HDS screens at various locations.

A Pic'UPS driver base and fleet capacity can be additionally incentivized and grown through an FIDS Consumer Financial Model which provide the company with the necessary vehicles and qualified driver/owners under its shared-revenue collaborative in which Pic'UPS team owners may be compensated both for physical delivery and the delivery of commercial content via their personal, or soon to be owned HDS vehicles.

In an embodiment, Pic'UP's owner/drivers; may be independent contractors in which their delivery labor, overhead, G&A and profit is paid through their own delivery and Pic'UPS task operations. Additionally, working; from this base driver's further benefit from the automatic hyper-relevant presentation of commercial content normally "branded delivery" that may represent, the immediate retailer being serviced, promotions related to that retailer, client or its products, or special promotions for the Pic'UPS service that may he designed to attract additional retailers and engage new On-Demand, Same Day/Same Hour delivery customers. For these services, Pic'UPS drivers may receive a percentage of revenue that Pic'UPS collects from its advertisers.

In an embodiment or use model where specific 3rd party trucking, delivery, or moving services are not provided, a company may simply issue owner/drivers a monthly check as earned income with a Statement and an Accounting of commercial content, public content, or personal content which has been displayed to others. Under this latter model, the owner/driver may remain responsible for his own vehicle and operating costs including fuel, maintenance, insurance, and taxes. In some cases, the company may underwrite certain owner/driver expenses.

The Pic'UPS Free Pickup & Delivery Service may be presented to both online and conventional brick & mortar retailers as a way of providing quick turnaround, On-Demand (second day, same day, same hour, or special) delivery services to its customers at a lower cost than customers may currently pay courier services (FedEx, UPS, etc) for the same service. In particular, Pic'UPS may work with member retailers to offer a program in which Pic'UPS provides a specialized, usually free "branded delivery" service to that member retailer's store or store chain, and may further promote and provide the member retailer's customers with information regarding the member retailer's free On-Demand, Same Day or Same Hour delivery; free anytime/anyplace delivery, and/or last-mile home delivery. As part of Pic'UPS' "branded delivery," Pic'UPS may create, design, enable and implement mobile outdoor HDS ad campaigns for presentation to consumers along a member retailer's delivery route, from start to finish. Pic'UPS may also create, design and implement in-store product or service promotions for member retailers. Such products or services may include, but may not be limited to, the promotion of special products within member stores highlighting the member's new Free Pic'UPS delivery service; the display and attaching of point-of-sale signs of such promoted merchandise subject to free delivery; the briefing of on-floor sales associates of the member stores in the act of informing member store customers of its new service and in the task of placing a Pic'UPS FREE SHIPPING and branded delivery buttons or icons on such in-store merchandise, and next to the online sales and/or member retailer's check-out Website pages. Applications, and/or shopping cart pages, e.g., as a checkout option; access to purchaser data about merchandise purchased, through the Pic'UPS service (along with available privacy-compliant demographic and geographic data on the buyer).

Pic'UPS may use this information to target and trigger programmatic advertising over its own websites, mobile Apps, Mobile/Digital Out Of Home & HDS digital platforms. When a user (a consumer, retailer, advertiser, shipper or other party) chooses a Pic'UPS transportation, route, usually defined as a (GPS) starting point and a (GPS) final destination, a variety of marketing features along that route may be identified and combined with other factors such as time-of-day, known audience demographics along that route within the projected timeframe, weather, terrain, traffic, traffic signals, traffic flows and other conditions, including but not limited to, the locations of other marketing members, users or their assets, any of which may impact or determine a route's optimum audience for specific content and the associated viewing opportunities. This content display opportunity is then presented instantly in real time to any or all advertisers who might wish to sponsor, "buy" or "brand" that specific route essentially by having its content displayed during the course of vehicle travel. Route-Based/Real-Time Programmatic Bidding is thus designed to pair an advertiser's content with its unique ad campaigns) with the ever shifting live audiences along varying routes to optimize that content's engagement and exposure and thus its revenue and earnings for Pic'UPS drivers, advertisers and managing HDS entities, and is applicable to any vehicle class.

Pic'UPS may also provide each retailer with a unique "branded delivery campaign" creating for each participant a corporate street presence and image during the delivery route by presenting the retailer's logo and personal message ("1-Hour Delivery by PetCo") or ("another 10 minute Free Delivery by your Laguna Hills Trader Joe's"), or optionally feature any new products being offered or delivered by the store (eg; BLEU de CHANEL at NORDSTROM'S) which Pic'UPS may offer to deliver at no cost, or a nominal cost, which, the retailer may charge back if desired to the product manufacturer or distributor.

Additionally, an owner-operated, ubiquitous, and/or collaborative fleet of pickup trucks or commercial vans using HDS with a connecting App to promote delivered products and retail stores, in addition to their own "presence" campaign while profiting from hyper-targeted mobile advertising may allow Pic'UPS to offer a broader general retail pickup & delivery service covering a greater area, with more drivers and more access and availability hours and travel routes than single route-based couriers or store-operated trucks for deliver and return trips. Additionally, Pic'UPS may be used to move a variety of objects, such as a delicate arrangement of special-order flowers or several sheets of 4×8' plywood, which basic automobiles may be ill-equipped to do.

Further, the HDS Entrepreneurial Ownership Lease/Purchase opportunity, together with its companion Social Fulfillment App (v!e) and the collaborative transportation model, "Pic'UPS", may offer ground breaking societal possibilities for the less-privileged, or the educationally, economically, demographically or geographically challenged in a modern transportation ecosystem. For those who might be impoverished, disadvantaged, or simply one of those individuals struggling to make ends meet, such innovations may offer opportunities to begin anew, start businesses or pursue dreams of family and education largely because two of their most fundamental needs (income and transportation) are met on a daily basis, Pic'UPS participants may find themselves on a faster track to independence, acceptance, and success. Additionally, consumers may also have the option to donate ad-generated earnings to charities or other causes and, if desired, to make a contribution known by promoting it on their own or their company's vehicles.

Additionally, an example of a phased implementation of embodiments discussed herein is provided. In particular, during a first phase, design and development may be a focus for implementing aspects of the invention. In particular, during a design and development phase, hardware may be developed for an HDS tailgate video communications system, such as HDS/tailgate new vehicles; HDS/tailgate retro-fit and/or pre-owned vehicles; and quick-loading GPS/ULD shipping and storage modules.

In examples, infrastructure may also be developed. In particular, an HDS pickup truck tailgate purchase/lease financial model may be developed. Vehicle manufacturer and/or vehicle dealers may develop dealer sales and service associated with the HDS new and/or retrofit models. Additionally, an ad and media network may be developed. Further, a mobile and/or desktop application may be developed, such as a v!e social fulfillment basic app or a Pic'UPS delivery app. Further, distribution may also be coordinated. For example, HDS conversion center planning may be coordinated. Additionally, quick-loading GPS/ULD storage module manufacture planning; quick-loading installation center planning; and retailer Pic'UPS stage and stop (e.g., kit design) may be coordinated.

In a second phase, proof of concept may be developed. In particular, retail partners may be engaged. Retail partners may be engaged to beta test an application; to beta test advertisement targeting systems; and/or to provide a test market. Further, during a proof of concept phase, HDS owners and/or driven; may be pre-signed. In particular, owners and/or drivers may be signed up for an HDS financing; additionally, pre-signing may require mandatory participation in an application associated with HDS systems, such as Pic'UPS. In examples, Pic'UPS may be launched prior to the availability of HDS integration into exterior components of a vehicle.

During a third phase, buildout and production may begin. In particular, facilities may be built. For examples, HDs conversion centers may be built as stand-alone facilities or as additional facilities that complement other facilities. For examples, an HDS conversion center may be added to an HDS auto dealership; may be associated with non-dealer activities; or may have components associated with the use of quick-loading GPS/ULD storage modules (e.g., installing and managing these components).

In an additional phase, embodiments of the invention may be rolled out into production. This roll-out may include HDS sign-ups, such as from new vehicle owners; retrofit owners (e.g., install HDS/TG on late trucks). Additionally, critical mass of customers may be hit, which may ease new truck demand; quick-loading GPS/ULD storage modules may be introduced (e.g. to enable module heating, refrigeration, security and video advertisements via any-brand trucks). Further, produced products may be delivered to customers. New deliveries may be provided for new vehicles, retrofit/owned vehicles, and quick-loading GPS/ULD storage modules.

A further phase may be used to expand operations. In examples, advanced vehicles may be used. In particular, HDS systems may be expanded to other vehicles beyond pickup trucks or commercial vans. In particular, HDS systems may be integrated into large step vans, SUV's sedans. Crossovers, minivans or other vehicle classes. Additionally, in the expansion phase, a mobile application that is used to may be expanded to include advertisement-supported fleet connectivity; AS/AR systems, as described below; full-size fleet cost reduction using mobile advertising; full-size truck financing; and additional features that may be used with a mobile application such as the Pic'UPS app as discussed above.

Additionally, customer uses may be expanded to include v!e Social Fulfillment Hyper-App, such as discussed in U.S.P.T.O. application Ser. No. 11/552,932; Pic'UPS as a special connections program; quick-loading GPS/ULD shells and modules; small business branding and/or support; and engaging HDS support/alliance groups (Angie's list, TaskRabbit, LinkedIn, etc). Additional uses may include specialized jobs/employment; buying/selling; moving & hauling; skills & learning (professional); education/learning; personal relationships; business connections/opportunities; and personal and business research platform.

Pickup Truck Community applications and additions may be generated around the use of HDs systems. In particular, enthusiast reviews and newsletters may be generated. Additionally, enthusiast e-Magazines and how-to blogs may be written. Additional information may be provided that relates to HDS Profitability, such as how to optimize one's earnings; quick-loading GPS/ULD storage, modules, and how to use quick-loading GPS/ULD storage modules to one's best advantage; pickup trucking events and gatherings; club and local activities; club outings and gatherings; pickup movies and outdoor entertainment; hauling information for pickup relating to boats, trailers, cars, toys, and equipment; pickup classifieds such as buying and selling; special jobs and pickup truck owner opportunities; camping and outdoor activities; pickup tailgating and partying; sports activities and venues; travel and family vacations; guides to trucking; buying, insuring, and financing; and other applications.

In examples, authorized Pic'UPS dealerships may deliver new HDS-equipped cars, trucks or conversions Free of charge to qualified drivers who agree to drive a minimum number of hours per week to assure ad revenue and platform performance. Qualified owner/drivers may execute a purchase or lease agreement with authorized dealers which often involves no money down and no monthly payments since the dealer holds the title and collects the ad revenue which the vehicles generate from hyper-targeted, mobile communications on HDS panels. Additionally, Pic'UPS drivers can use their vehicles as they see fit under reasonable contractual requirements regarding maintenance, insurance and minimum commercial exposure while on the road. Further, each Pic'UPS owner may be automatically, or as a user opt-in, enrolled in the Pic'UPS Service for which they may receive alert and may bid on spontaneous On-Demand pick-ups and deliveries based on consumer or retailer requests in their immediate travel and response area. Additionally, Pic'UPS drivers may bid on/pursue or perform at their discretion legal, personal or business mission or any Pic'UPS logistics opportunities the company publishes online, and is free to negotiate their own fees for special labor or handling expenses within company guidelines.

Pic'UPS drivers may also receive a percentage of fees collected by company for ad revenue displayed on their specific vehicle once the vehicle is paid off, and may also possibly as a bonus or for performance above and beyond, at the company's sole discretion. Additionally, Pic'UPS drivers may receive slightly higher delivery compensation when fulfilling services for member retailers because they are more consistent and based on longer term campaign rates or agreements with the Pic'UPS managing entity.

In additional examples, a retailer (such as Home Depot, Best Buy or Lowe's) may charge consumers a fee for the home delivery of bulky purchased items (i.e.: plywood, dishwashers, 5 gallon drums, barbeques, etc), or it may advise the customer that they have the option of choosing (while either in-store or online) Pic'UPS Free Home Delivery if the purchaser is willing to allow the store to disclose to Pic'UPS privacy-compliant information regarding the purchase it may be delivering, revealed for the sole purpose of improving both the retailer's and Pic'UPS targeted messaging and advertising. Or the store can still offer the customer Free immediate delivery by charging the delivery to the store's "branded delivery" account from which its cost may be deducted.

For spontaneous pickups with easily transported items where a Pic'UPS driver is close to a pick up point but where the delivery destination is too far away (e.g.: beyond a driver's desired range, simply too far or "out of the way" on the return leg, etc.) that Pic'UPS driver can so indicate and the Pic'UPS App and algorithm may locate a second or third alternate Pic'UPS driver in the target area(s) and enable the original driver to negotiate online for a delivery "hand-off" or relay such second or third Pic'UPS drivers working more in that target area, or heading that way after, to complete that run. The mid-delivery transfer may be documented by both GPS mapping and video and the credit for the split run and the ads presented by each driver during that run are automatically documented and accounted for. In examples, Pic'UPS driver performance may rated, both by consumers and by the company. Personal ratings and performance may affect future percentages paid out. Further, improper, illegal, inappropriate, inefficient or inept service (per company guidelines) may result in warnings, suspensions, terminations or even vehicle repossessions. A driver may also bid on "delivering" payloads under company-established pricing. In other examples, the driver may bid on a special hauling or handling directly with the customer, a requesting consumer or member user. In the event of disputes, drivers and customers may agree to arbitration. Further, full Pic'UPS advertising services may be available wherever a vehicle manufacturer can make available HDS-equipped vehicles or where the company can perform conversions and enable online services. Additionally, Pic'UPS can be deployed globally on a moment's notice since these vehicles are owned everywhere and can be engaged on a spontaneous ad hoc basis.

In examples, the Pic'UPS model can move On-Demand/Same Day orders from either name brand or small mom & pop retailers at potentially no charge to customers because the company offers retailers branded delivery on a membership/subscription or ala cart basis and typically delivers these promotions en-route to or from a specific engagement over a pre-determined route. In return for HDS mobile, online or in-App advertising and promotion, retailers can opt to share their purchaser data and information with Pic'UPS as a component of a partial or full compensation plan.

In examples, revenue may be generated from the display of content on the exterior surfaces of fixed or moving objects. In additional examples, revenue generated from the display of content on the exterior surfaces of said fixed or moving volume-produced objects may be applied towards the purchase of those objects. In other examples, a dedicated computer Application may be enabled for use with said fixed or moving volume-produced objects, to enable, enhance, sustain and optimize said object's abilities to generate revenue.

In further examples, a new service may be enabled which makes available to the general public for personal or business use, pickup trucks together with their owner/drivers with labor assistants if requested, e.g. through a communications and connections business model as opposed to a transportation entity. In additional examples, privately-owned new or pre-owned pickup trucks may be used in a collaborative business model wherein the connecting entity neither owns nor provides vehicles or transportation services but instead connects those wishing to use them on a temporary basis. Other examples may Include responding to significant delivery volume increases during heavy demand or seasonal periods by enabling connections with a massive user base of pickup truck owners at such times when they are available, are in close proximity to pick-up or drop-off locations or have plans to be in or near a specific delivery destination. In additional examples, a pickup truck's outer surface(s) may be branded or re-branded with signage representing a specific company, an order, a delivery, a wholesale source, a retail supplier, a courier or a delivery entity in order to enable "branded deliveries" and to claim or earn revenues relating thereto.

In other examples, a courtesy or security service may be enabled in which a prospective user of the (Pic'UPS) service creates and sends a digital photograph of an anticipated pay bad or trucking job to prospective pickup truck owners in order to facilitate a job-bidding and/or connections process. In additional examples, a courtesy or security service may be enabled in which a prospective user of the (Pic'UPS) service receives in advance of arrival, a digital photograph of the driver; his truck, and any assistant(s) expected to participate in the pending job. In further examples, job ordering and bidding may be facilitated through an App format in which a prospective customer completes an electronic request for trucking or transportation services by responding to menu-driven (yes/no) selections and/or text-based inputs to at least the following questions: Who? What? When? Where? How? Why?

In additional examples, a job request and bidding process may be facilitated in which a prospective customer discloses: Who is requesting? What is task to be performed? When is the job or the delivery to start and end? Where is the job or delivery to be started, ended or performed? How is the job to be accomplished? And, how many vehicles and vehicle types may be required? In other examples, a simple, pick-up & delivery request may be initiated by a consumer, a retailer or a third party, either online, by telephone, or in person or optionally with the assistance of another party inputting information into a communications device to initiate an order or a competitive bidding process.

Other examples may include a job and a delivery bidding process that may be facilitated using an algorithm which may weigh, consider, sum and present to drivers a bid representing the "best" or most cost-effective solutions or "offers" to prospective delivery customers for his or her acceptance based on such factors as: a payload to be transported; a starting point and an ending point; the time of day for the transportation to occur; the route or route options available; the anticipated overall duration of the trip; the nature of the area (commercial, residential, etc) to be travelled through; the trip's revenue generating potential based the commercial content display opportunity; the present weather conditions over the route; the demographics of the area or neighborhood to be travelled through; the number of traffic stop lights on the route; the levels of traffic at the time of transportation; the safety of the area; accidents, detours or construction anticipated over the route; alternate routes available; return route options and factors; the vehicle type, size, age and other factors; the driver's driving history; the driver's ratings (by the company, by consumers, by retailers, etc); other factors impacting the nature and duration of the delivery mission such as: labor or equipment required to perform the delivery, loading or unloading hazardous conditions, for highways, passengers, vehicles or cargo.

Additionally examples may include, as part of the bidding process, options to grant drivers a brief period to make reasonable adjustments or form a counteroffer to the proposed "offer" based on a driver's or a consumer's present situation including, but not limited to: his/their current location; his/their intended/alternate business or personal plans; the payload to be trans posted; the starring and ending points; the time of day for the drive; the route options available; and the re-venue-generating potential of the offer based upon any one of the Pic'UPS proposal, the demographics of the area, the length of the trip, the number of stop lights (where ads can be presented), the current driving conditions or hazards, his driver's comfort level with area and the environment, any specialized or additional services to be performed, and any additional potential earnings based on the above.

Examples may also include following said offer(s) or counteroffer(s) to allow said driver(s) and customer(s) to electronically reach mutual agreement and confirm acceptance by informing the other party(ies) via text, email or other means. Additionally, examples may include facilitating a video/GPS monitoring system in which a user of the service can monitor their payload or belongings from a remote location during transit. Other examples may include to use one vehicle's onboard camera security system in to communicate with many similarly-equipped vehicles thereby forming a collaborative ad hoc vehicle tracking network in the event of suspected theft or loss while in transit. In addition, examples may include allowing owners to offset the costs of their delivery operations through revenues generated from the display of mobile advertising.

Further examples may include to compensate participating owner/drivers as independent contractors in which a sales or connection fee is retained by the (Pic'UPS) entity.

Other examples may include to facilitate a connections service for vehicle owners and operators other than pickups trucks. Additional examples may include to facilitate the creation of Apps and algorithms which may optimize for drivers the routes, zones, areas and locations where the revenue from advertising may be greatest. Further, examples may include to enable a system of compensation wherein HDS owners are rewarded for the use of their personal property for commercial purposes in the most democratic way at ail times under reasonable circumstances.

GPS/ULD Quick-Loading Storage Modules

Systems and methods for building and deploying quick-loading storage modules are provided. The storage modules may be designed to fit into a cargo hold of a vehicle. In particular, the storage modules may be designed to fit into a cargo hold of a pickup track. The storage modules may be rugged, aesthetically-decorated, mission-targeted, and/or lightweight shells. Additionally, the storage modules may be tailor-made to fit the bed of a pickup truck. The storage modules may also contain storage components. Examples of storage components may include a variety of moving shelves, racks. Insulated, heated, and/or cooled compartments. Storage components may be loaded into storage modules independently by humans or robots. In examples, the storage components may be inserted in seconds into the storage modules and, further, may be inserted into the vehicle.

GPS/ULD Storage modules may be used for a quick change-out of pickup truck payloads which can be loaded without the vehicle present and then Inserted much like a cargo container once it arrives. Additionally, storage modules may be used to create a payload module. The payload module may have the appearance of a large cardboard box which completely fills the bed of a pickup truck including its tailgate area when the truck's tailgate is open (e.g., horizontal). Additionally, in examples, storage modules may be used to create a payload module which in one embodiment has the appearance of a large cardboard box which completely fills the bed of a pickup track when the truck's tailgate is fully closed (e.g., vertical). Storage modules may also be used to create what appears to be a single oversized cardboard box filling the complete bed of a pickup truck, in width with its sides against the pickup bed's left and right inner sides, in length from the forward most bulkhead of the bed to the rearmost edge of the tailgate in its open (or horizontal) position, and optionally to the inner surface of the tailgate if in its closed (or vertical) position, and in height, within a foot or two of the tallest part of the truck's cab.

Additionally, storage modules may be used to create a payload module which in one embodiment has the appearance of a large cardboard box which is capable of displaying the logo(s), advertisements or promotions for the merchandise being carried. Storage modules may also be used to create in an alternate embodiment a payload module with the physical sizes described above, however with, an exterior surface which is pure white and having the general appearance of a refrigerator/freezer. In examples, storage modules may be used to create in an alternate embodiment a payload module with the physical sizes described above, however with an exterior surface which appears to be black glass similar in general appearance to the dark face of an iPad.

In some examples, a quick-loading storage module may be lowered vertically into a truck. The rear wheel well projections within the truck bed may restrain it from forward or aft movements. In some examples, the forward-most bottom corners of the quick-loading storage module may be modified so that the entire module can be slid in from the rear of the truck bed without raising and lowering it in the process.

A quick-loading storage module may be insulated. In some examples, a module may comprise equipment for the refrigeration of said module. Alternatively, a module may comprise equipment for the warming or heating of contents, e.g., food, at a sustained preset temperature inside said module. Additionally, quick-loading storage modules may comprise digital video display surfaces integrated into the exterior walls of said modules, optionally to be used for the mobile presentation of commercial messages and branding.

Aspects of the invention may comprise a system of internal removable shelves, drawers and compartments. Humans or robots may load the shelves, drawers, or compartments. In some examples, the shelves, drawers, or compartments may be inserted into the payload module whether it is in or out of a truck.

In some examples, individual packages may be identified with an electronic address or GPS location. Said packages may convey this information to the truck's internal shelf, drawer and/or compartment system, A module may receive and convey GPS information to the truck's internal shelf, drawer or compartment system. In some examples, the track may locate a specific package or item within its payload, identify its shelf, drawer or compartment and then physically move that package or item to a point in the opened module where it may be instantly accessible to the vehicle's driver or delivery assistant. A package may be moved to an exterior rear, on either side, or at the front of a unit in which a pickup truck's rear cab glazing may be removed. Alternatively, portions of the truck cab's rear bulkhead may be modified or removed. In examples, this latter arrangement can replace the rear interior seat of a pickup truck's quad cab with specialized equipment for sorting mail and/or distributing small parcels.

A payload module, in a similar fashion, may receive return packages introduced along the route by the driver. In some examples, the module may document the GPS location and the address of said return package into the systems' computer. Pertinent return information may be linked to the package. In some examples, package information may be linked to the particular shelf, drawer or compartment on which the driver has placed the package in. This may have the effect of automatic log-in and tracking of a return trip.

Aspects of the invention may provide video cameras embedded into the interior and exterior surfaces of the payload module. One or more cameras may capture and process images of one or more of surrounding objects, people and environments to be used for one or more of data collection, image targeting, security and package delivery confirmation. In some examples, front, side or rear video cameras may communicate with a signal, beacon carried by the delivering truck driver. This may allow said cameras to follow the driver's movements outside the vehicle. Package deliveries may be visually confirmed, when said cameras are within line of sight. Optionally, a wearable camera by the driver can capture still or video images. Such a system may allow deliveries which are left on the front porch of customer's homes to be documented as proof of delivery in some cases, and offer an additional level of driver security when operating at night or alone.

GPS/ULD Payload modules may display digital video images of specific brand names, which may optionally include Amazon, Amazon Fresh, the Amazon smite logo, the UPS logo, the FedEx, logo or other brands or logos. The digital video images may appear to be printed on the surface of a simulated cardboard box. In some examples, a perforated, printed vinyl, sheeting may be applied to the module. The vinyl sheeting may simulate the color and texture of a cardboard box. In some examples, perforated, printed vinyl sheeting may be used in combination with integrated digital video flatscreen televisions. This may simulate the color and texture of the immediately surrounding cardboard box surface as a background to pictorial graphics and text.

Aspects of the invention may provide an accessory rear platform structure to be attached to a pickup truck's trailer hitch. This may create a horizontal platform at a plane-level with the truck's rear bumper. The platform may be foldable and collapsible for storage. In some examples, an accessory rear platform is used for seating. Optionally, the platform may comprise a barbeque, cooking surfaces, or an auxiliary table. Accessories may be attached to the platform. Optionally, the platform may protect the lower rear surfaces of the payload module and the HDS tailgate when lowered to the open (or horizontal) position. A rear platform may include supplemental lighting, for example, tail lights, turn signals, brake lights, reflectors, running lamps, emergency flashers, license plate lights and/or backup lights.

Pickup trucks that are fitted with HDS tailgates may be used to generate revenue. In particular, the pickup trucks having HDS tailgates may be used to generate a revenue source that augments normal trucking and delivery missions. In examples, pickup trucks may be able to present hyper-relevantly targeted full-motion video commercial messages and communications on aft surfaces of the pickup truck. Additionally, pickup trucks may have added features such as storage modules. When a pickup is augmented using a GPS/ULD storage module, the pickup truck may have uses in a diverse, mission-flexible, rapid response pickup and delivery network.

An aspect of the invention provides systems, devices, and methods for delivering and shipping parcels. More particularly, aspects of the invention describe storage modules that may fit into the bed of a pickup truck for the purpose of housing and transporting parcels, in examples, the storage modules may be quick-loading.

A quick-loading storage module may comprise a shell that is designed to fit into the bed of any pickup truck (e.g., as shown in FIG. 17A, component 12). In some examples, a quick-loading storage module may be designed to fit one particular make and model of pickup truck. Quick-loading GPS/ULD storage modules may be constructed out of a durable material that minimizes weight. The interior of the shell of a storage module may be designed to hold or secure one or more parcels for transport, for example, on one or more shelf, rack, or compartment. In some examples, said shelf, rack, or compartment may be moveable, either manually or automatically. Additionally, a quick-loading GPS/ULD storage module may be configured such that a human or a robot can load parcels inside of the module.

Aspects of the invention may provide GPS-guided drops of parcels to a delivery location. The individual internal shelves, racks and compartments may be additionally identified with, address and/or GPS locations along a planned route. The contents of the shelves, racks, and compartments, e.g., the parcels, may be identified with address and/or GPS locations along a planned route. In some examples, the appropriate shelf, rack or compartment may automatically queue itself at a particular address and/or GPS location. The appropriate shelf, rack, or compartment may, when prompted, open at a particular address and/or GPS location, for example, exposing to the driver the parcel scheduled to be dropped at that location. A moveable platform having automatic cargo location may allow for more efficient use of the volume of a quick-loading GPS/ULD storage module, as any parcel may be located and retrieved instantly upon arrival at a location regardless of route, route changes, timing, or order of loading without stacking packages on top of each other. In some examples, this GPS location and queuing feature may reduce package drop times by at least 10%, at least 20%, at least 30%, at least 40%, at least 50%, at least 60%, at least 70%, at least 80%, or up to at least 90% per stop compared to parcel delivery methods without GPS location and queuing systems.

One method of the invention for linking specific packages to GPS coordinates is to embed or record such coordinates onto an RFID chip. In some examples, the RFID chip may be embedded in the shipping label or the container itself. Alternatively, an optically-scannable label, may be used to identify a parcel. Parcels stored within the volume of a quick-loading storage module may be located and queued when that module arrives at a particular GPS coordinate using the RFID chip or optically-scannable label.

Additional aspects of the invention provide GPS tagging of return shipments. Parcels may also be picked up on a drivers delivery route. In some examples, a parcel may be linked and logged-in by GPS at the pickup point, complete with an address. In one example, a driver may insert the parcel being returned into a shelf or compartment and the system may automatically link that item and location with the sender's address and/or account information. This may speed handling of the parcel on return to a warehouse where the quick-loading storage module, or separately its internal shelves, racks or compartments, may be extracted and processed.

Some aspects of the invention provide options for module extraction. The internal racks, shelves and compartments of an incoming quick-loading storage module may be removed from the shell and an outgoing set of inner containers inserted. In an alternative example, the entire quick-loading GPS/ULD storage module, contents and all, is lifted from, the bed of the pickup truck with a forklift or overhead crane and replace with a fully-loaded unit. In some examples, the time the vehicle remains 'grounded' at the warehouse or consumes valuable space at a loading dock is reduced compared to alternate parcel shipping processes.

Aspects of the invention may include methods for securing a quick-loading GPS/ULD storage module. Quick-loading storage modules may nest against the exposed inner wheel-well intrusions inside the bed of a pickup truck. In some examples, the module may contact other contours of the bed of the pickup truck. This nesting may secure the load against forward, aft and lateral accelerations. In some examples, a quick release hold-down mechanism is used to secure the module to the bed of the pickup truck. A quick-loading GPS/ULD storage module may comprise a locking mechanism to deter theft. In some examples, a quick-loading storage module may contain a video surveillance system and GPS tracker.

Additional aspects of the invention provide robotic loading of a quick-loading storage module. The inner stacks of shelves, racks or compartments may be both arranged and loaded manually or by robotic assist. On the floor of a warehouse, arrays of cargo-carrying shelves, drawers, compartments or stacked "pods" may be composed by robots similar to the Kiva robots used by Amazon and other logistics companies. An algorithm may be used to match packages or parcels to a type of shelf, rack, or compartment (or to pods in the case of larger delivery vehicles). Once composed, an array of shelves, racks or compartments may be moved robotically into a waiting quick-loading storage module on the warehouse floor, or moved into a shell already mounted in the bed of a pickup truck. In some examples, a shipping algorithm tracks an array and its contents with the truck throughout the delivery day and pickup route. Parcels picked up by the driver may be logged by the same system. Suitable software may record with video each delivery as it is made.

A quick-loading GPS/ULD storage module may be inserted into a standard or extended bed pickup truck with its tailgate open (i.e.: in the down or horizontal position). This may increase both the quick-loading GPS/ULD storage module's and the truck's overall, payload capacity. In some examples, the module's lower structure is designed to accept handling loads from a specially-equipped forklift truck, in which the module is lifted vertically to clear the truck bed's wheel-well inner projections, then moved aft and onto a standard shipping dock, pallet or other conveyance. A shipping dock may be designed with exacting internal quick-loading storage module handling equipment. In some examples, a quick-loading GPS/ULD storage module provides higher-level rear bumper crash protection for the truck in which it is mounted, its contents and its tailgate, using new, emergency illumination for the extended-length bed base vehicle. Several exemplary quick-loading storage module designs and structures based on the kind of delivery mission anticipated are described below.

Aspects of the invention provide insulated quick-loading storage modules. A quick-loading GPS/ULD storage module may be insulated to protect contents from temperature extremes. In some examples, the insulation protects parcels from shock or vibration. An insulated Quick-loading storage module may protect against theft. In some examples, the shell of a Quick-loading GPS/ULD storage module comprises double walls with insulation. A Quick-loading GPS/ULD storage module may have a lightweight moment of inertia structure which enables the Quick-loading storage modules to be removed, stacked, or shipped. In some examples, Quick-loading GPS/ULD storage modules are stacked and shipped on a flatbed truck. Stacked Quick-loading GPS/ULD storage modules may be stored in a warehouse environment. Empty Quick-loading GPS/ULD storage modules may be shipped in a flat (i.e., a condensed) format, in some examples, a flat Quick-loading GPS/ULD storage module is assembled by a user. A Quick-loading GPS/ULD storage module may be shipped in a condensed format, then "popped open" to the full, truck bed size for insertion. A Quick-loading GPS/ULD storage module may be finished in a variety of colors. In some examples, the texture or surface of the Quick-loading GPS/ULD storage module contributes to a particular functionality.

Figure 22:
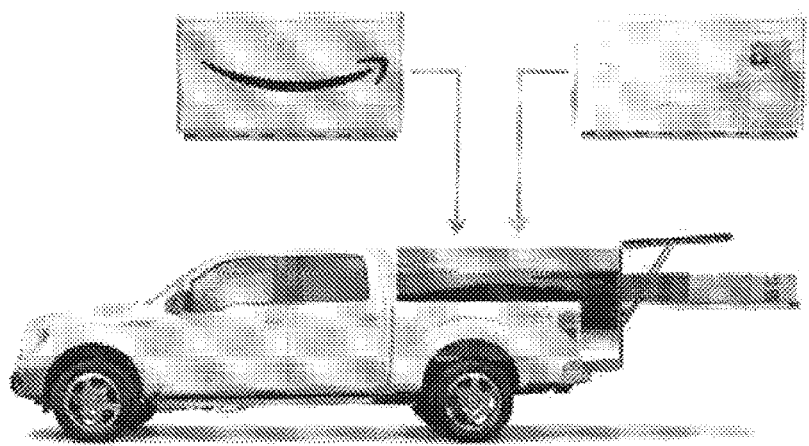
FIG. 22 illustrates a plurality of storage modules that are compatible with a vehicle, each storage module having distinct dress displayed by a hyper-relevant digital surface integrated into the respective storage modules, in accordance with embodiments of the invention.

Additional aspects of the invention provide refrigerated Quick-loading GPS/ULD storage modules, as shown in FIG. 22. A Quick-loading GPS/ULD storage module may be refrigerated to allow transport and preservation of fruits, meats and vegetables for the Same Day Delivery of groceries as with the Amazon Fresh model. In some examples, a Quick-loading GPS/ULD storage module comprises a refrigeration unit. Refrigerated Quick-loading GPS/ULD storage modules may be self-contained. In some examples, a Quick-loading GPS/ULD storage module may be stored, emptied, cleaned, or reloaded while the internal temperature of the contents is preserved. A refrigerated Quick-loading GPS/ULD storage module may use the same or similar interior containers, racks and sliding shelf systems (or on larger vehicles, pods). Payloads may be assembled on a warehouse floor, e.g., a refrigerated warehouse, and then inserted into insulated and/or refrigerated Quick-loading GPS/ULD storage modules. The Quick-loading GPS/ULD storage module may be loaded with contents, then mounted in the bed of a pickup truck. Alternatively, contents may be inserted into a Quick-loading GPS/ULD storage module that is already mounted in a pickup truck bed. A Quick-loading GPS/ULD storage module may comprise a fully-sealable door. In some examples, the door is easy to open and close. A Quick-loading GPS/ULD storage module may comprise a door that minimizes the escape of refrigerated air. An insulated Quick-loading GPS/ULD storage module door may insulate the contents from exterior heat, for example, heat from a video display mounted to the Quick-loading GPS/ULD storage module. In some examples, the rear door is top hinged, as depicted in FIG. 17A, component 18 and FIG. 22. Alternatively, the rear door may be hinged at the bottom. The door may open to the side. In some examples, the door slides along a track.

Aspects of the invention may include heated Quick-loading GPS/ULD storage modules. A Quick-loading GPS/ULD storage module may comprise a heating element. In some examples, the Quick-loading GPS/ULD storage module is heated to a temperature greater than the ambient temperature. A Quick-loading GPS/ULD storage module may be insulated. In some examples, a Quick-loading GPS/ULD storage module comprises one or more compartment that may maintain a specified temperature. The Quick-loading GPS/ULD storage module may be heated using power or energy from a source selected from electric, solar, solar-electric, gas, and the base vehicle's internal heating or power systems. In some examples, only a portion of the Quick-loading GPS/ULD storage module is heated. Alternatively, the entire interior of a Quick-loading GPS/ULD storage module is heated. In some examples, a heated Quick-loading GPS/ULD storage module may be used to minimize heat loss of a parcel, e.g., hot foods, including but not limited to pizza or BBQ delivery.

Additional aspects of the invention provide HDS advertisement-supported free deliveries. A Quick-loading GPS/ULD storage module may comprise a video display, for example, an HDS video display, as shown schematically in FIGS. 17B and 17C. In some examples, the video display is located in the aft access door (e.g., as shown in FIG. 17C, components 11 and 18). Alternatively or additionally, the video display may be located on the side panels of the Quick-loading GPS/ULD storage module (e.g., as shown in FIG. 17B, component 14). The video display may be visible from the right, left, rear, or front of the Quick-loading GPS/ULD storage module, or any combination of viewing angles thereof. A Quick-loading GPS/ULD storage module may further comprise a component for receiving or displaying a video, for example a receiver, transmitter, database, microprocessor, video driver, or targeting camera. The video display may be connected to an umbilical in the bed of the pickup truck, in some examples, the Quick-loading GPS/ULD storage module's video displays are connected to the Pic' UPS communications system. The video displays may present full HDS hyper-relevant 1-on-1 HDTV commercials or hyper-targeted communications to surrounding neighborhoods, households, vehicle occupants or pedestrians.

Additional aspects of the invention may include audience video targeting. Audiences or surrounding individuals and environments can be documented and Identified using privacy-compliant data or simple visual (gender, clothing, height, weight, or company data) or demographic, time and geo-location data. Such information may be retained for short periods to assess any loss or damaged goods claims. The information may be used to target local or passing individuals who may be curious about the presented video or offered retailer's services.

Aspects of the invention provide delivery video confirmation. A Quick-loading GPS/ULD storage module may comprise one or more video cameras, for example, three video cameras. FIGS. 17A, 17B, and 17C depict several camera placement options. The one or more video cameras may be used for ad targeting. A video camera may be used for payload security (e.g., as shown in FIGS. 17A and 17B, component 3). In some examples, a video camera is used to confirm parcel delivery, for example, through video documentation. Camera 15 of FIGS. 17A and 17B having field of view 16 may capture video or a still image of a parcel. In some examples, a video camera provides delivery confirmation, for example, by capturing images of deposited parcels left at a recipient's front door as depicted in FIG. 13. This may relieve the driver of the task of documenting or confirming delivery. A Quick-loading GPS/ULD storage module may comprise one or more aft-looking camera (e.g., as shown in FIG. 17C, components 4 and 5). In some examples, a Quick-loading GPS/ULD storage module comprises a camera (component 15) looking out each side of the vehicle. The side-looking cameras (component 15) may function as tracking and security cameras. A video camera may follow a driver's location (e.g., as shown in FIGS. 17A and 17B, components 15 and 16) while he is on the street by responding to a tracking beacon in the driver's mobile device or smartphone. A Quick-loading GPS/ULD storage module may visually confirm when a parcel has been moved and/or left at a specific location. Optionally, a visual record can be maintained. In some examples, a still photo confirming delivery can be sent to the recipient, e.g., via text or email. A Quick-loading GPS/ULD storage module may comprise a forward-facing camera, e.g., nose-mounted camera 2 as shown in FIGS. 17A and 17B.

Figure 18:
FIG. 18 illustrates a storage module in a trade dress displayed by a hyper-relevant digital surface integrated into the storage module, in accordance with embodiments of the invention.
Figure 19:
FIG. 19 illustrates another storage module in a trade dress displayed, by a hyper-relevant digital surface integrated into the storage module, in accordance with embodiments of the invention.

Additional aspects of the invention provide aesthetic designs of Quick-loading GPS/ULD storage modules. A Quick-loading GPS/ULD storage module may lend itself to unique marketing concepts where a strong, novel street presence can be created, through their use. In some examples, the Quick-loading GPS/ULD storage module is a simulation of a large cardboard box comprising the logo or identification of a particular company, for example, a cardboard box with the Amazon "smile", a FedEx logo, or a UPS logo, as depicted in FIGS. 18, 19, 20, and 21. A recognizable street identification may relate to the delivery operation being performed. In some examples, the aesthetics of the Quick-loading GPS/ULD storage module may be practical, functional, and/or humorous. A Quick-loading GPS/ULD storage module may be attention-grabbing. The dimensions of a Quick-loading GPS/ULD storage module may appear to represent the largest possible package that one could fit into the bed of a pickup truck with its tailgate open; its width (left to right sides) may appear to be touching the pickup truck's inner bed side rails, and its length may consume the entire bed length, from the most forward bed/cab bulkhead to the extreme aft edge of the opened (horizontal) tailgate (i.e., the longest possible distance between the extreme front of the bed measured to the furthest rearward point of the lowered tailgate. The height of a Quick-loading GPS/ULD storage module may span the distance measured from the horizontal bed surface to the uppermost point of the truck's cab at its centerline (e.g., as shown in FIGS. 17B and 17C, component 10), or to an extended height of up to two feet (e.g., as shown in FIG. 17B, component 9) as desired or as is necessary for payload volume. The dimensions of the Quick-loading GPS/ULD storage module may accommodate video displays (e.g., as shown in FIGS. 17B and 17C, components 11 and 14). The top surface of a Quick-loading GPS/ULD storage module may be extendable, i.e. raised to accommodate taller loads internally. Alternatively, the top of a Quick-loading GPS/ULD storage module may be opened to allow loads taller than the internal dimensions of the Module to be transported. In some examples, one or more video display, e.g., an HDS digital video display, can be easily incorporated into the flat sides or door(s) of a Quick-loading GPS/ULD storage module. A video display may present corporate, retail or marketing messages, for example, as depicted in FIG. 19.

Figure 20:
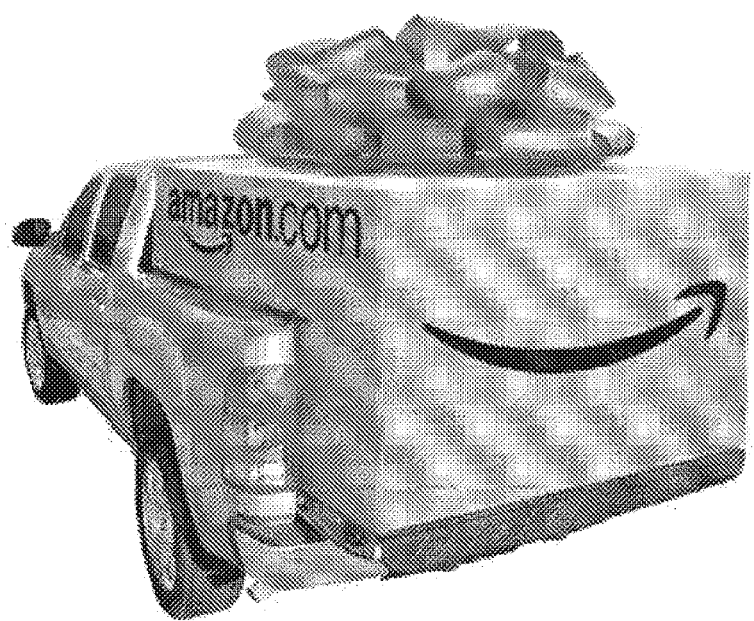
FIG. 20 illustrates the storage module in a trade dress with seasonal, decoration, in accordance with embodiments of the invention.
Figure 21:
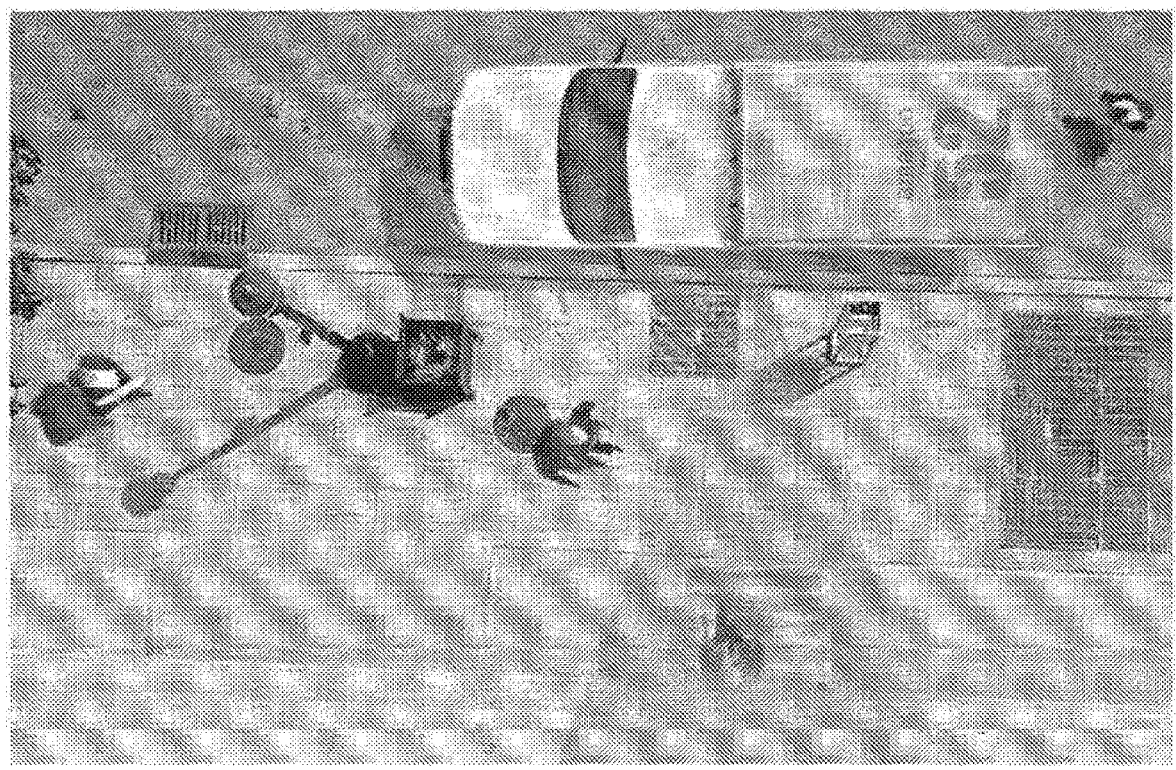
FIG. 21 illustrates a storage module having an integral video delivery-confirmation camera, in accordance with embodiments of the invention.

In some examples, a Quick-loading GPS/ULD storage module is covered in a wrap, including, for example, a vinyl, wrap similar to those used to wrap automobiles. The Quick-loading GPS/ULD storage module may look like a corrugated cardboard box, for example, as shown in FIGS. 18, 19, and 20. The covering may achieve a realistic corrugated cardboard box "look" using a similar technique to that used by vehicle advertising wraps such as those used on busses. In some examples, the bus passenger windows are covered with a plastic appliqué' which, shows an advertisement on the outside, yet due to perforations in the material, allow occupants to see through to the outside. The appearance of box corrugations, cardboard coloring, and any permanent graphics may be printed on a perforated vinyl sheet to deliver the desired cardboard box coloration and corrugated effect. In some examples, bright digital imagery penetrates the decorative sheet allowing for the presentation of large scale digital imagery. Coloration, lighting, and brightness may be optimized or blended to enhance the appearance of the surface to give the appearance of corrugated cardboard. A glossy transparent, white, or black surfaces (i.e., similar to an iPad or TV display) may be used, for example, as shown in FIG. 22. The surface may be mirrored. In some examples, the surface may transmit, light. The surface may allow light to pass through it, i.e., a video display may be visible through a perforated vinyl wrap, optionally, as depicted in FIG. 13.

Aspects of the invention may include a bumper extension, FIGS. 17B and 17C depict an optional bumper extension. A Quick-loading GPS/ULD storage module may be installed in a pickup truck having an open, i.e., horizontal, tailgate. The lower rear corners of the Quick-loading GPS/ULD storage module and the tailgate may be vulnerable to accidental impact damage. The bumper of a pickup truck is well beneath and forward of the end of an open tailgate and may not protect the Quick-loading GPS/ULD storage module from, rear impact, in some examples, a steel tube structure may be attached to the vehicle's trailer hitch (e.g., as shown in FIGS. 17B and 17C, component 8). The steel tube structure may span the full width of the truck's rear bumper face. In some examples, a pair of triangular arms may extend from the steel tube structure snugged against the truck's bumper to 90 degrees on either side. The triangular arms may rotate aft about a vertical axis. In some examples, these arms are secured by an additional aft cross member attached parallel to the truck's bumper, A series of steel tubes and arms may create a new cantilevered shelf and support structure, i.e., a structure similar to the original tailgate, but at a lower elevation, roughly in-line with the truck's rear bumper beneath the tailgate in its opened position. The tailgate of the pickup truck may be lowered without contacting the shelf structure. In some examples, the shelf structure comprises an extension of the original bumper of the pickup truck. The shelf structure may absorb shock, e.g., shock from rear impact from another vehicle. The shelf structure may function as a light impact bumper. The surface of the shelf structure may comprise supplemental lighting, e.g., running lights, turn signals, brake lights, emergency/hazard flashers, loading caution flashers, reflectors, license plate lights or a backup light. In some examples, the lighting may be comprise an LED bulb. In some examples, two or more angled struts may extend aft and upwards as they move aft at approximately 25-30 degrees. The struts may comprise steel. These angled struts may reinforce the shelf. In some examples, energy from an impact is conducted to the truck's bumper. Energy from a rear impact may be deflected downward. Energy from a rear impact may be expended upward by the support structure.

An attached support structure—may protect the original or HDS tailgate and Quick-loading storage module from damage. In some examples, accessories may be attached to the support structure, e.g., video displays, barbeques, cooking surfaces, workbenches or seating. FIG. 17B depicts an optional accessory bumper and lighting strip (component 17). In some examples, a video display, e.g., an HDS tailgate, may be used to display video, e.g., ballgames or movies. Alternatively, a tailgate comprising an HDS display may be unlatched and swiveled to the right or left side, i.e., parallel to the truck's sides. In some examples, the support structure may be used in the same position as the original tailgate. The support structure may be detached from the pickup truck. In some examples, it may be folded up. The support structure may be stored or carried in the bed of the pickup truck.

AS/AR Disclosure

Figure 35:
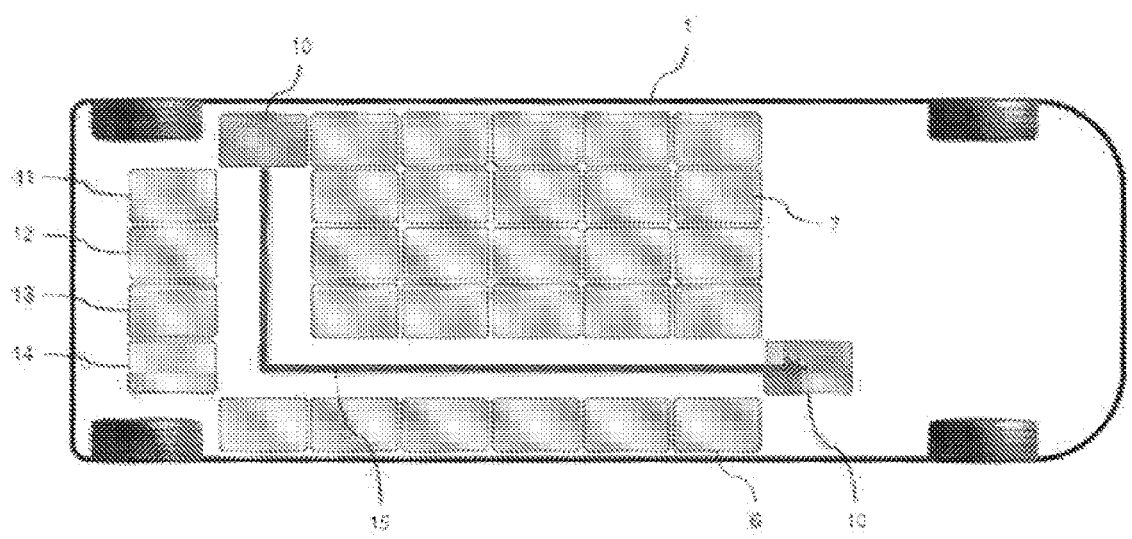
FIG. 35 illustrates a top view of an automatic storage/automatic retrieval process applied to the individual tower of FIG. 34, in accordance with embodiments of the invention.

In an aspect, the present disclosure provides methods for modular loading and unloading of a delivery vehicle's cargo. Modules can be loaded with cargo and prepared for shipment outside a vehicle. Optionally, a module can communicate with a means to move itself. Thus, a module can insert itself onto a vehicle and position itself with respect to other modules once inside the vehicle. Modules can be condensed outside or inside a vehicle to enable quick insertion or retrieval. Each module can receive and store information about the destination of its cargo and information about the vehicle's actual or anticipated location. Alternatively, module movement, position, and cargo information can be entered into, stored, and otherwise managed from a central platform, potentially an application on a mobile device, or a computer onboard the vehicle. Modules can dynamically position themselves so that those having cargo whose destination is geographically closest to the vehicle's actual or anticipated location are most accessible to personnel who retrieve cargo (FIG. 35). As the vehicle moves, information about the vehicle's location can be updated.

Figure 23:
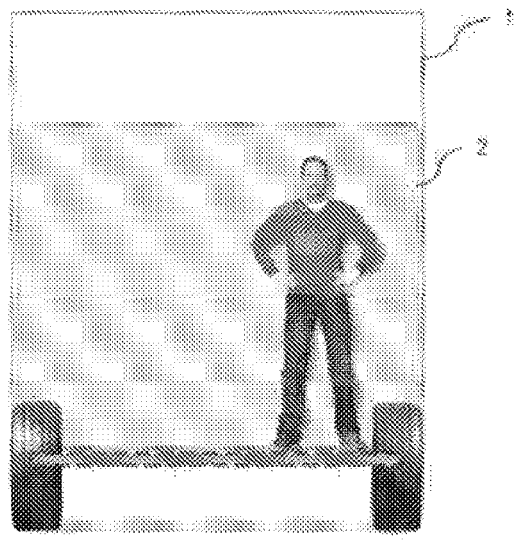
FIG. 23 illustrates a rear view of an empty cargo space of a vehicle.
Figure 24:
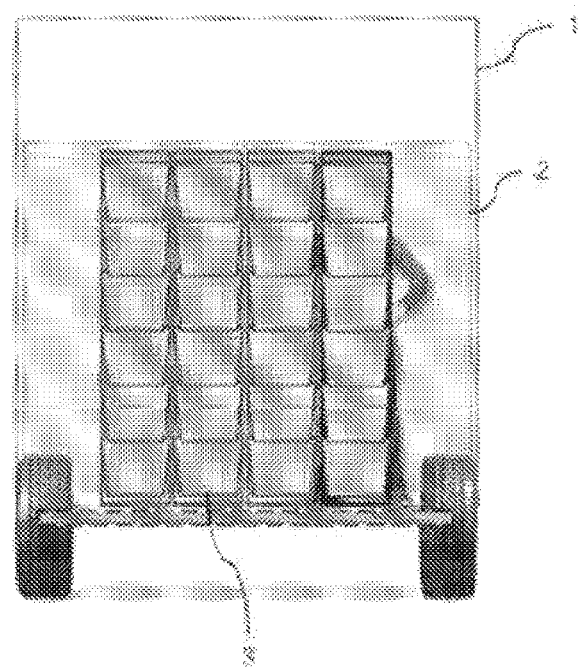
FIG. 24 illustrates a rear view of a cargo space of the vehicle of FIG. 23 packed with cargo stacked on sliding row towers, in accordance with embodiments of the invention.
Figure 25:
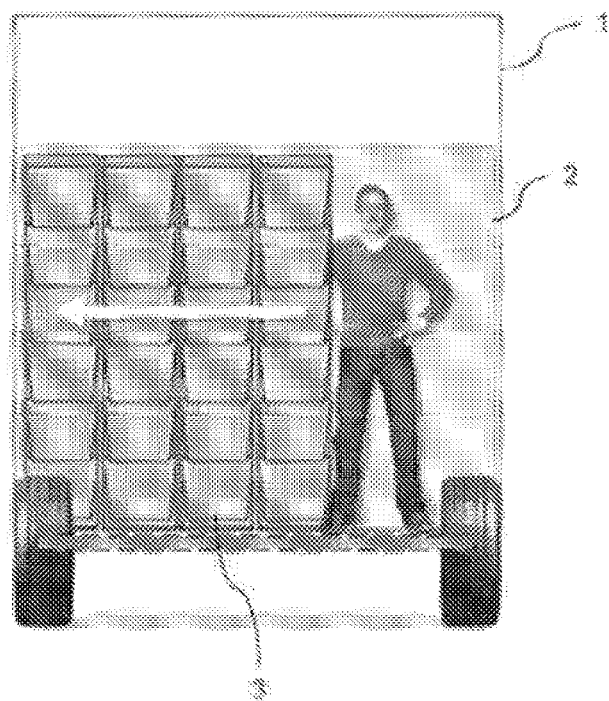
FIG. 25 illustrates a rear view of the cargo space and the cargo of FIG. 24, the cargo positioned after being slid around and in front of a first rear wheel well, in accordance with embodiments of the invention.
Figure 26:
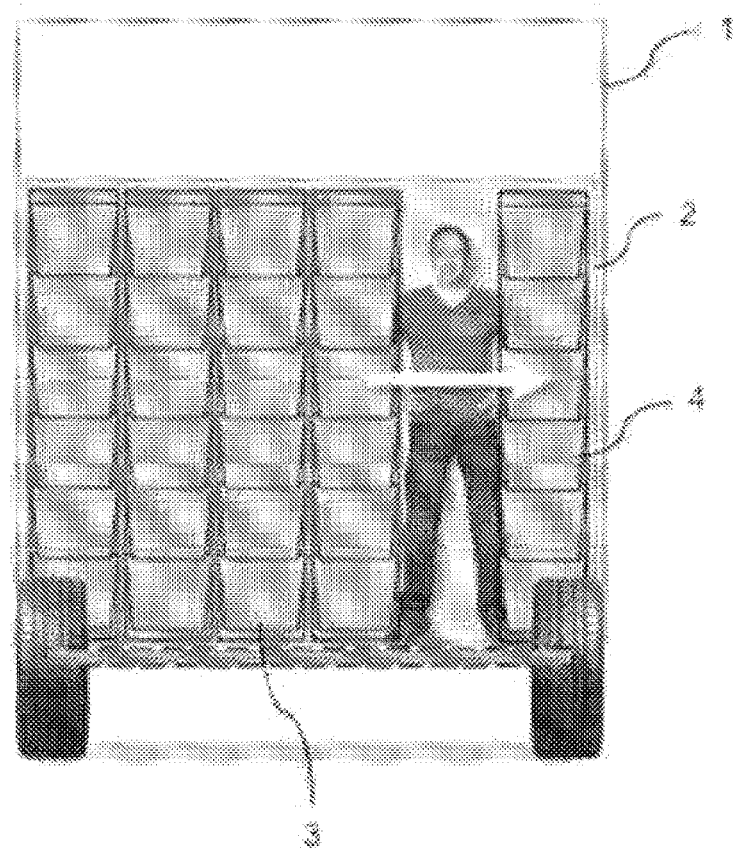
FIG. 26 illustrates a rear view of the cargo space and the cargo of FIG. 25, with an additional row tower of cargo positioned after being slid around and in front of a second rear wheel well in accordance with embodiments of the invention.
Figure 27:
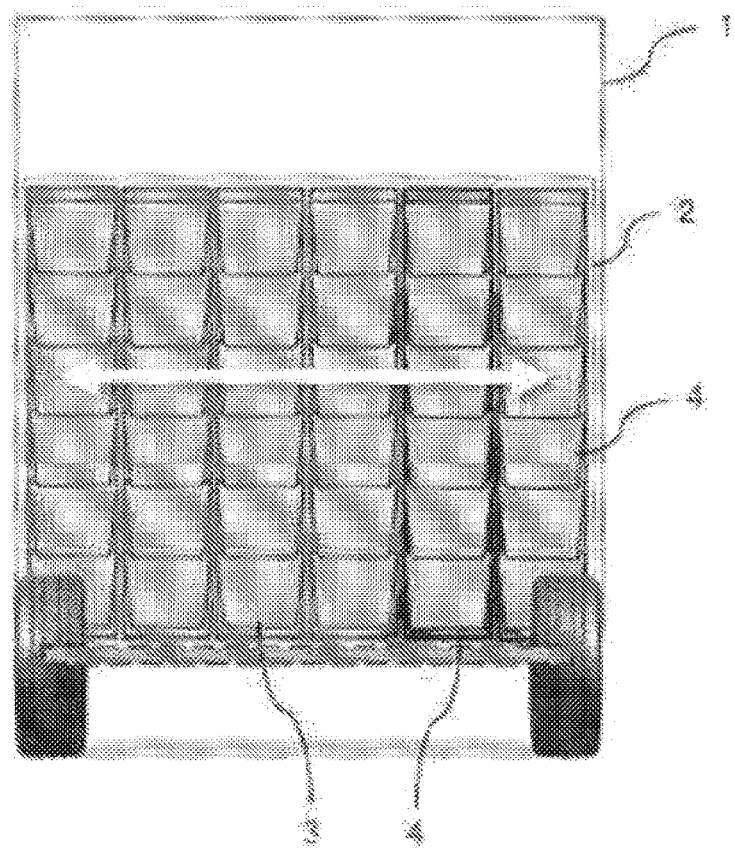
FIG. 27 illustrates a rear view of the cargo space and the cargo of FIG. 26, with an additional row tower of cargo positioned after being slid between the previously loaded row towers, in accordance with embodiments of the invention.
Figure 28:
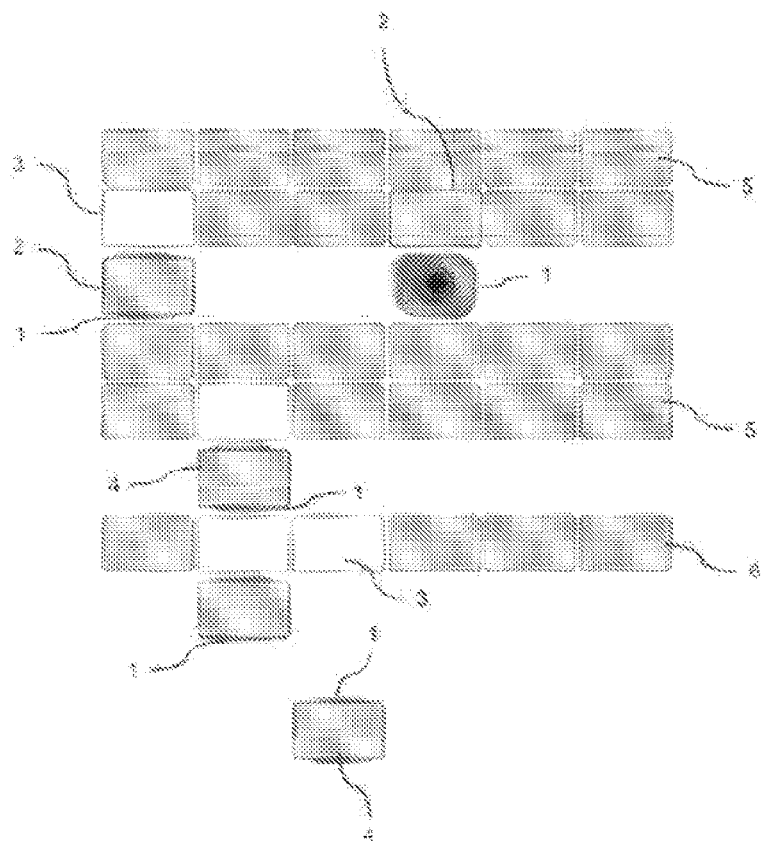
FIG. 28 illustrates a top view of omnidirectional robots that lift and rearrange individual towers of cargo, in accordance with embodiments of the invention.
Figure 29:
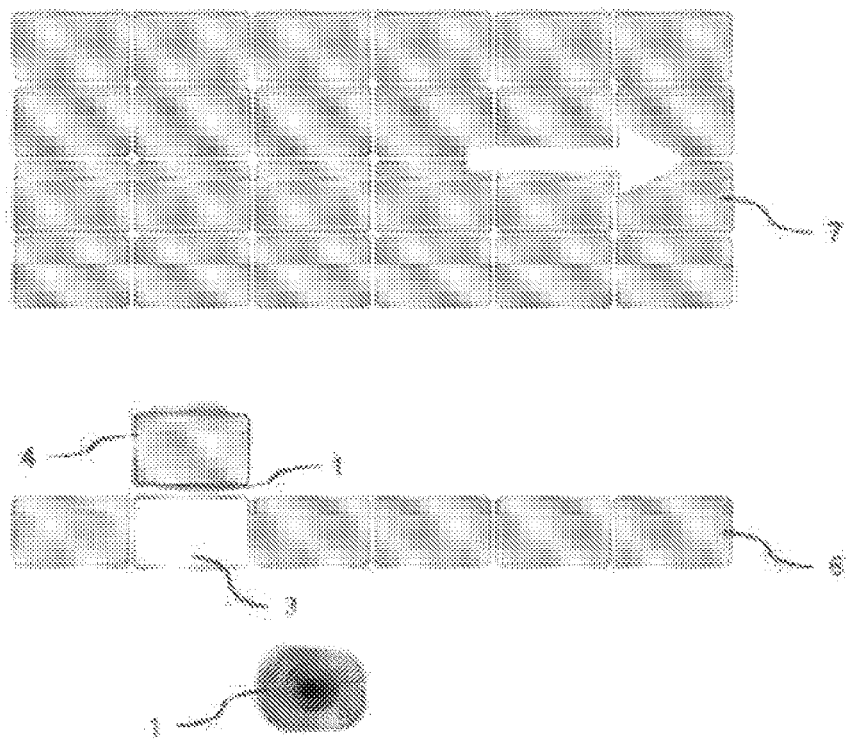
FIG. 29 illustrates a top view of omnidirectional robots that compress the individual tower of FIG. 28 into a rectangular module of cargo that slides as a unit, in accordance with embodiments of the invention.
Figure 30:
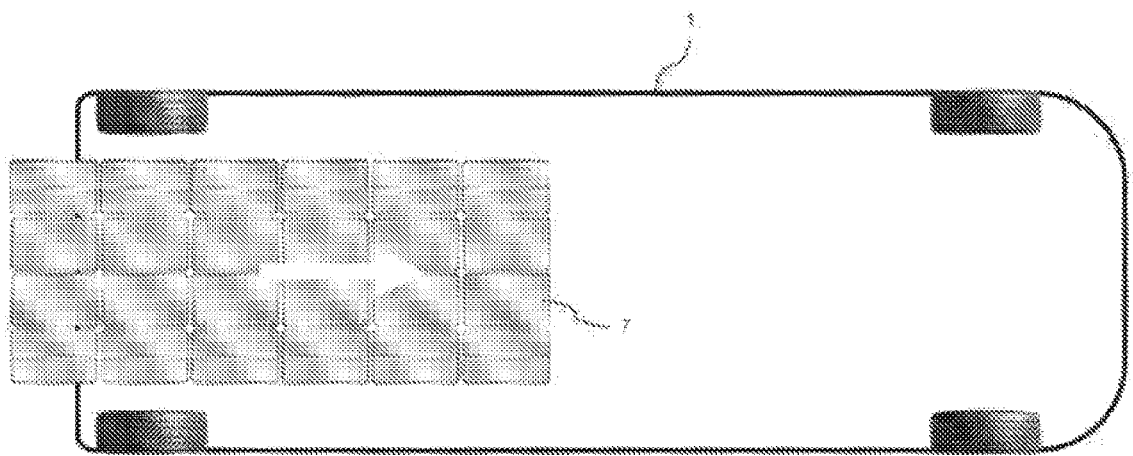
FIG. 30 illustrates a top view of the rectangular module of FIG. 29 positioned after being slid into a cargo space as a unit, in accordance with embodiments of the invention.
Figure 31:
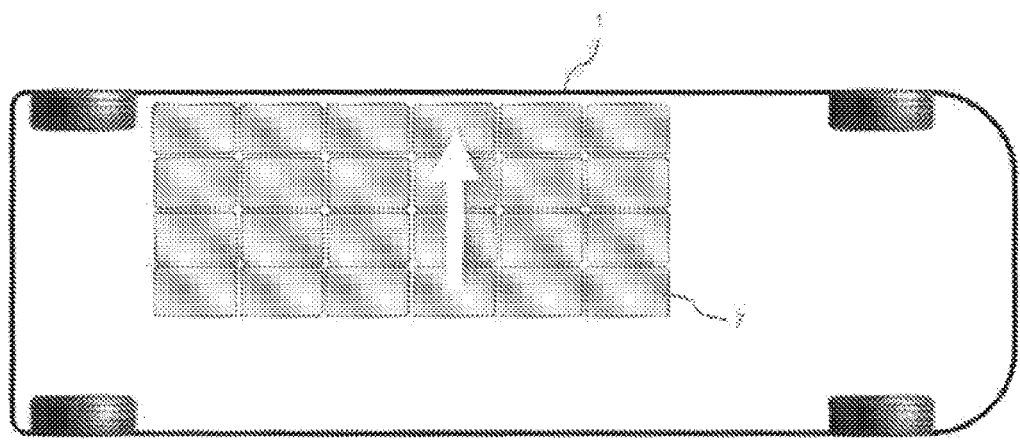
FIG. 31 illustrates a top view of the cargo and the cargo space of FIG. 30, the rectangular module of FIG. 29 positioned after being slid around and in front of a first rear wheel well, in accordance with embodiments of the invention.
Figure 32:
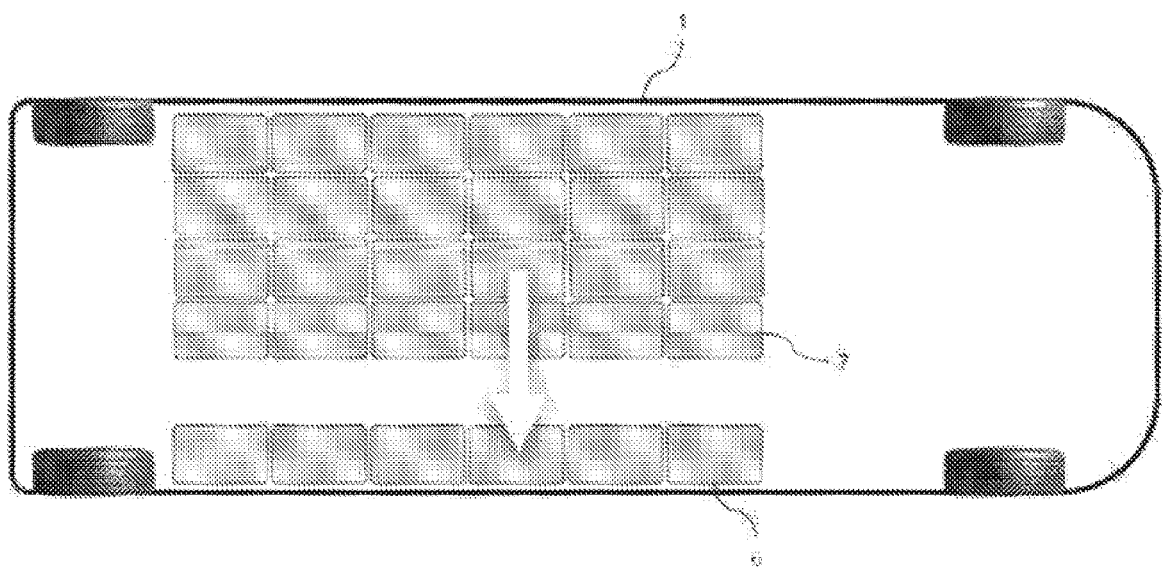
FIG. 32 illustrates a top view of the cargo and the cargo space of FIG. 31, with a first additional row tower of cargo positioned after being slid around and in front of a second rear wheel well, in accordance with embodiments of the invention.
Figure 33:
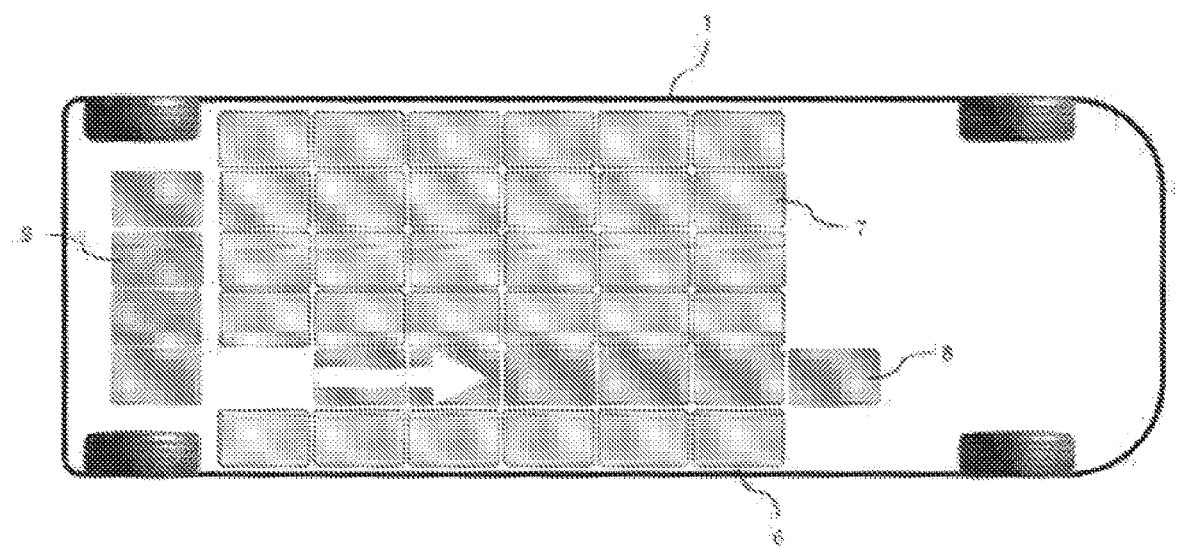
FIG. 33 illustrates a top view of the cargo and the cargo space of FIG. 31, with a second additional row tower of cargo positioned after being slid between previously loaded cargo and a third additional row tower of cargo positioned after being slid behind previously loaded cargo, in accordance with embodiments of the invention.
Figure 34:
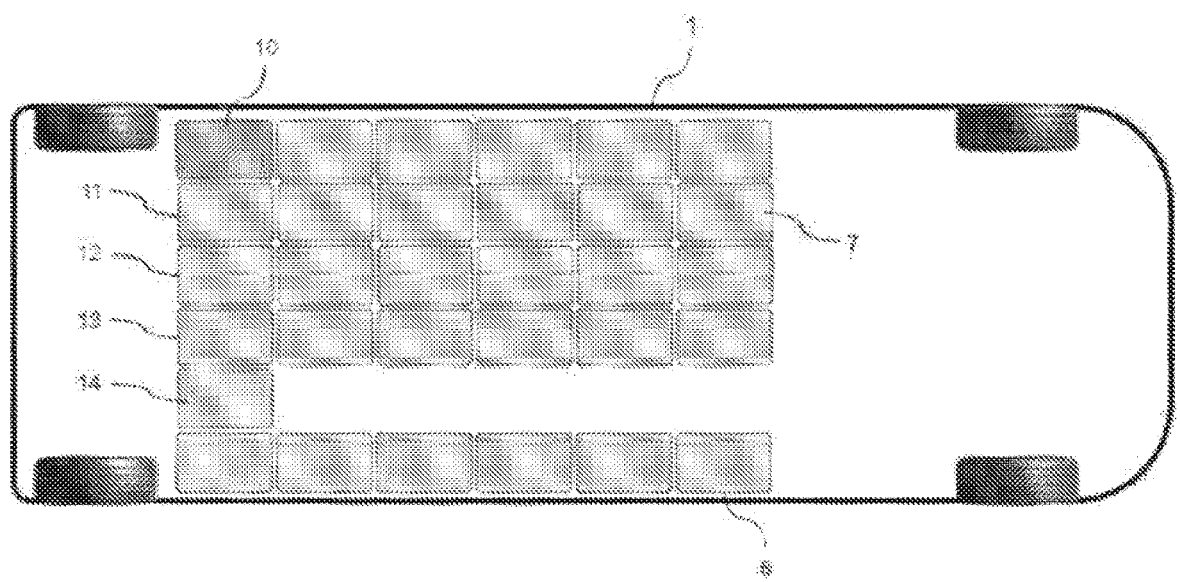
FIG. 34 illustrates a top view of an individual tower of cargo that is not accessible to the driver.
Figure 36:
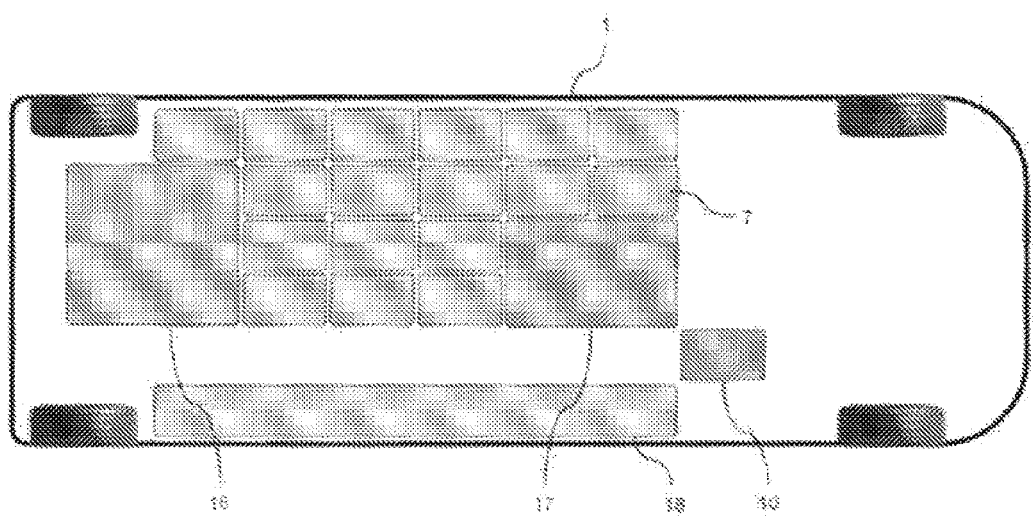
FIG. 36 illustrates a top view of irregular cargo positioned after being slid among a plurality of row towers of cargo, in accordance with embodiments of the invention.

FIG. 23 illustrates a rear view of an empty cargo space of a vehicle. FIG. 24 illustrates a rear view of a cargo space of the vehicle of FIG. 23 packed with cargo stacked on sliding row towers, in accordance with embodiments of the invention. FIG. 25 illustrates a rear view of the cargo space and the cargo of FIG. 24, the cargo positioned after being slid around and in front of a first rear wheel well, in accordance with embodiments of the invention. FIG. 26 illustrates a rear view of the cargo space and the cargo of FIG. 25, with an additional row tower of cargo positioned, after being slid around and in front of a second rear wheel well, in accordance with embodiments of the invention. FIG. 27 illustrates a rear view of the cargo space and the cargo of FIG. 26, with an additional row tower of cargo positioned after being slid between the previously loaded row towers, in accordance with embodiments of the invention, FIG. 28 illustrates a top view of omnidirectional robots that lift and rearrange individual towers of cargo, in accordance with embodiments of the invention. FIG. 29 illustrates a top view of omnidirectional robots that compress the individual tower of FIG. 28 into a rectangular module of cargo that slides as a unit, in accordance with embodiments of the invention. FIG. 30 illustrates a top view of the rectangular module of FIG. 29 positioned after being slid into a cargo space as a unit, in accordance with embodiments of the invention, FIG. 31 illustrates a top view of the cargo and the cargo space of FIG. 30, the rectangular module of FIG. 29 positioned after being slid around and in front of a first rear wheel well, in accordance with embodiments of the invention. FIG. 32 illustrates a top view of the cargo and the cargo space of FIG. 31, with a first additional row tower of cargo positioned after being slid around and in front of a second rear wheel well, in accordance with embodiments of the invention. FIG. 33 illustrates a top view of the cargo and the cargo space of FIG. 31, with a second additional row tower of cargo positioned after being slid between previously loaded cargo and a third additional row tower of cargo positioned after being slid behind previously loaded cargo, in accordance with embodiments of the invention. FIG. 34 illustrates a top view of an individual tower of cargo that is not accessible to the driver, FIG. 35 illustrates a top view of an automatic storage/automatic retrieval process applied to the individual tower of FIG. 34, in accordance with embodiments of the invention. FIG. 36 illustrates a top view of irregular cargo positioned after being slid among a plurality of row towers of cargo, in accordance with embodiments of the invention.

Each module can position itself automatically based on its cargo's destination and the vehicle's anticipated location, as determined by a programmed route. Alternatively, modules can position themselves according to the vehicle's actual location, as determined by a global positioning system. Modules position themselves by distance between the vehicle's actual or anticipated location and their cargo's destination. The module having the least such distance can position, itself in the most accessible location for retrieving personnel (FIGS. 35 and 36). When a parcel of cargo is placed in the module, cargo destination, including zip code and street address, can be read and stored automatically by barcode scanners or optical address readers, optionally equipped on the module. The module can further store the cargo's specific subcompartment, if any. The module can also store the recipient's name, cargo identification, or other information. Once a module is positioned to be accessible for retrieval, any relevant information can be relayed to the driver's mobile handheld display, heads-up display, or other output means. After positing itself or being positioned for retrieval, the module can identify the specific subcompartment, if any, containing the cargo by indicator lights, sound, or other signals.

Module insertion, positioning, and retrieval can occur automatically within a variety of motor vehicles. The disclosed methods can be adapted to motor vehicles of many sizes, including pickup trucks, step-up vans, and tractor trailers. Any motor vehicle with a cargo storage space (FIG. 23) that is essentially a rectangular box comprising a floor, a rear cargo access opening, and left and right side walls is suitable for the presently disclosed methods. Optionally, the cargo storage space can have an overhead door, a ceiling, wheel-wells or other obstructions on the floor, or shelves for stacking boxes on the side walls. In addition to having these optional features, a compatible cargo storage space can open forward or be open to the driver's compartment.

Modules can be pods, towers, or other compartments that can contain boxes or items for shipping. Optionally, modules can be condensed laterally by sliding a first module and a second module against each other after removing any spaces or loading aisles between them (FIG. 29). Sliding against each other links the modules into a group through a mechanical means so that the group moves as a unit during insertion, positioning, or retrieval (FIG. 30). Linking is reversible, so groups of modules can be separated into individual modules as needed for retrieval. Larger modules that are multiples of smaller modules in length and width are especially compatible with the disclosed invention.

Modules can be inserted, positioned, and retrieved manually or by an electro-mechanical means such as powered tension cables, linear screw actuators along tracks, or retracting pawls. For example, pawls can be electrically extended to engage the modules to be moved. Another example is the use of electric drive motors in individual modules that can optionally engage with a guideway within the floor of a cargo space. Another example is the use of magnetic or pneumatic suspension to lift modules to facilitate positioning.

The process of inserting modules into a motor vehicle depends on the size and type of motor vehicle and the size and type of modules. Insertion typically comprises four sequential stages. First, approximately four single-file rows of previously linked modules can be grouped into a single unit outside the truck (FIG. 24). Second, the unit can be slid aboard, forward past a wheel-well or other obstruction and then laterally against a side walls of a cargo space (FIG. 25). Third, a first additional single-file row of modules is inserted into the cargo space in the same manner. Once clear of any wheel-wells or other obstructions, the additional row can be moved laterally against a side wall of the vehicle's cargo storage space. Moving the additional row against a side wall potentially creates art aisle between the additional row and the previously inserted unit (FIG. 26). Fourth, a second additional single-file row can be inserted into the cargo space, filling the remaining available space. (FIG. 27). Alternatively, modules or a central platform can be programmed to position the modules to maintain an aisle inside the cargo storage space.

After insertion, space available for cargo is efficiently managed. Modules can automatically condense while the vehicle is stopped or is in transit.

A preferred embodiment of the invention uses omnidirectional robots to position modules. The omnidirectional robots can pass under a module, lift it, and then position the module before returning the module to its resting state and exiting from under the module (FIG. 28). The bottom structure of the module can be adapted to enable an omnidirectional robot to pass under, lift, and position the module.

Another preferred embodiment of the invention uses guideway floors, such as pneumatic air-bearing surfaces or roller-floors, to facilitate insertion, positioning, and retrieval of modules. Once inside the vehicle, the bottom structure of the modules can mate with a ball and guideway system which controls the sliding and positioning of modules on the floor of a cargo space. Modules can link or unlink before or after mating with the floor. A mechanically or electrically powered system, such as a network of roller ball bearings or self-cleaning half-cylinder linear guides can include detents spaced at uniform intervals throughout the guideway. Detents cause the modules to index against adjacent modules and, optionally, against upper or lower guide bars. Guide bars limit load shifting by acting as stops and absorb lateral and forward-aft loads.

A grid may be installed on the floor of a cargo storage space of a vehicle, thereby-permitting modules to move forward-aft or right-left relative to the vehicle's direction of travel. It is possible to design grids to allow modules to move on a diagonal. The invention includes a variety of grid configurations such as flat, horizon tally-articulating individual, tiles whose edges can nest to perform as adjacent tracks. Alternatively, simple bi-directional, tracks can function as a suitable grid. Tracks can mechanically engage modules via in features in the bottom of the module's structure. Guide bars in a grid, configuration, moreover, can permit a parcel of cargo to be stacked without its weight being supported by any parcels below it.

Some examples may enable a system of modules which can move autonomously within the confines of a delivery vehicle, which can know the whereabouts of specific cargo within such a payload area, and which can retrieve and move that cargo to a convenient, predetermined location where it is queued for a driver—or for other automated systems—to hand deliver from the truck to its final location. Other examples may identify specific cargo units, to move said units individually, in pairs or in multiples of themselves, to move said pairs or multiples in larger groups or in larger modules to facilitate the repositioning of cargo within a vehicle's payload area during transit in a way which conforms to a pre-programmed delivery route with precise GPS coordinates and specific addresses.

Additional examples may be capable of reconfiguring itself and its modules for the rapid loading of an existing vehicle using existing passageways and accommodating present floor, wall and ceiling structures and to then reposition itself to move cargo as described above. Examples may also be able to reverse its reconfiguration process for the rapid unloading of cargo modules. Further, examples may provide a network of said modules which can be expanded or arranged on a warehouse floor or loading dock in such a way that robotic devices can remove empty modules and replace them with full modules.

Additional examples may include a network of modules that may be collapsible for shipping, storage or transport and be easily erected, loaded, stacked or installed in vehicles with little human intervention. Other examples may automatically track the locations of specific cargo within the vehicle during transit based on its delivery destination, to move that cargo to a predetermined queue within the vehicle while underway, to cancel said delivery and locate different cargo for alternate destinations based on a re-programmed address or a current GPS location. Some examples may determine an optimum, most cost-efficient means for electro-mechanically moving said cargo and modules throughout the volume of a vehicle during transit, for identifying the most reliable and practical means for preparing, moving, inserting and extracting said system of modules to, from and between such vehicles during operations.

Additional examples may structure said network of modules to form vertical, self-supporting towers or pods which can move smoothly past each other in groups, units, or sections, which can be recomposed during transit or loaded by the type, size, weight and shape of the cargo being transported. Further examples may include a modular system to be reconfigurable in a variety of sizes and complexities to correspond with a wide variety of vehicle sizes, types and logistics missions.

See-Through Transparency

Embodiments of the invention may use an integrally mounted forward-looking video camera on or about the nose of any HDS-equipped vehicle, or in the vehicle's interior behind the windshield, to capture live streaming views of the road ahead of said vehicle and to relay said view in real time to the large scale digital display at the rear of said vehicle to produce a see-through view of the road beyond said vehicle to aid any following vehicles which might want to pass. In particular, examples of the invention may use an integrally mounted forward-looking video camera on or about the nose of any HDS-equipped vehicle to relay a view lit real time to a large scale digital display at the rear of said vehicle to produce a see-through view beyond said vehicle to be used by unequipped or older motor vehicles, motorcyclists, bicyclists, ADA/wheel chair occupants, skateboarders, runners or pedestrians without the aid of supporting hardware or software.

Figure 37:
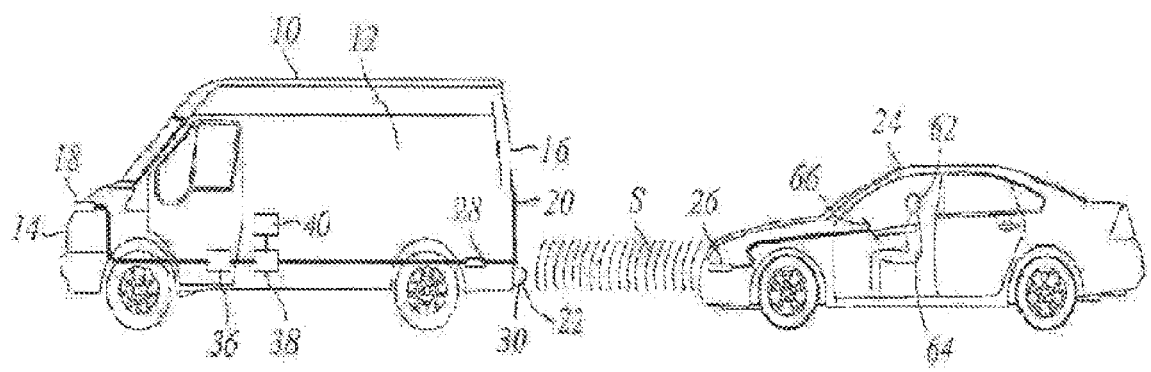
FIG. 37 illustrates a following vehicle interacting with a lead vehicle, in accordance with embodiments of the invention.

FIG. 37 illustrates a following vehicle interacting with a lead vehicle, in accordance with embodiments of the invention. In particular, FIG. 37 shows a leading vehicle, 1, a following vehicle 2, a nose camera 3, on the leading vehicle, a video/signal processor 4, a large-scale video display 5, DSRC, GPS/WiFi receivers 6, and telemetry components utilized by anticipated Connected Vehicle programs. A following vehicle, 2, could use a generally forward-looking, narrow-field optical or acoustic transmitter 8, or any number of transmitters anticipated under present day Connected Vehicle programs using DSRC or even GPS and/or WiFi. A driver's standard turn signal stalk or dedicated steering wheel controller 7, together with connections to electrical power and the vehicle's on-board RF transmitter which also enables digital windows manual activation if desired, it is conceivable that a mobile device such as a smartphone wife a mobile App could enable manually activated windows controls, however such a system should be configured so that only the driver of a following/viewing vehicle can control what is seen on vehicles ahead of him.

In practice, when the driver of a following vehicle determines he/she wants to pass, or wants to see what is beyond or blocked by a digital windows-equipped vehicle ahead, they merely tap the digital windows see-through control on their steering wheel (or light tap or fully engage the turn signal via the stalk). This sends a wireless signal from transmitter 8 to receiver 6, where the signal is forwarded (together with any proximity, range, vehicle type, relative speeds or other information deemed relevant and appropriate to vehicle identification and passing) to processor 4, which then places the image generated by camera 3, onto display 5. The process is instantaneous. After a predetermined evaluation time—after initiating a passing lane change—after manually cancelling said turning signal—or after manually turning off the digital windows (or such other procedure during which the driver of vehicle 2, decides whether or not to execute a pass, the see-through system Is automatically disengaged and the image which was previously on display 5 (if any) is replaced. If a following driver repeats the process, the system again shows the forward-looking camera image on display 5. When, the driver of vehicle 2 pulls out to pass vehicle 1, the see-through window along with, any cautionary perimeter lighting is turned OFF and the system, is reset to its normal driving condition.

Figure 38:
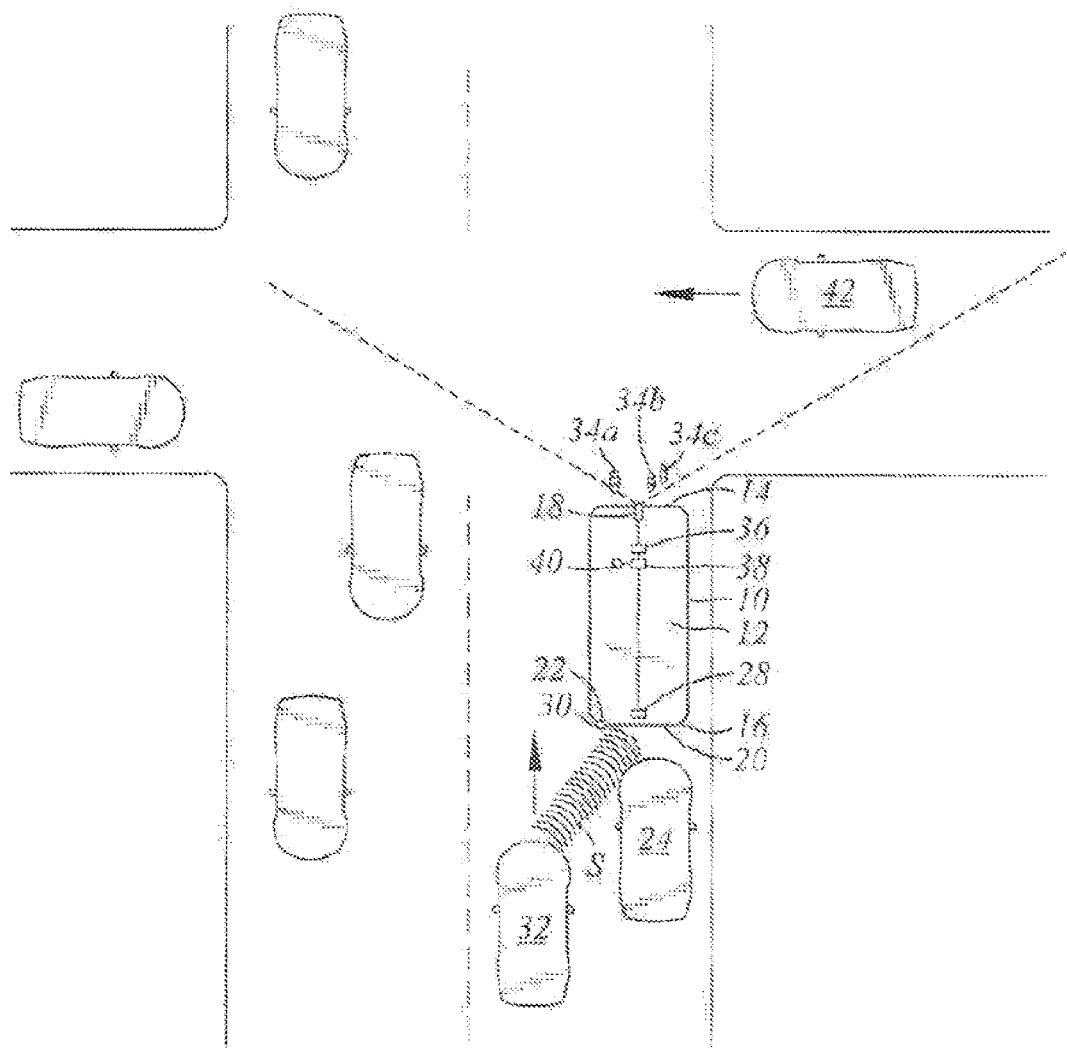
FIG. 38 illustrates vehicles at a city street intersection, in accordance with embodiments of the invention.

FIG. 38 illustrates vehicles at a city street intersection, in accordance with embodiments of the invention. In particular, FIG. 38 shows a city street intersection. At 1 is a typical large FedEx type delivery truck or step van beginning a right turn but blocking the view of car 2, which is traveling North under a green light; and car 3, also heading for the intersection. Crossing the intersection right to left is car 4, which is running the red light and invisible to cars 2 and 3. Also not visible to cars 2 and 3 are still-crossing pedestrians 5, also hidden by the view-obstructing truck. However at 6 the nose mounted camera on the truck is capturing images of both the pedestrians and illegally crossing car 4. Independent of V2V Connected Vehicle systems, the imagery from camera 6 is evaluated at image processor 7 which compares incoming CV telemetry via antenna 9 at CV processor 10 confirming that car 4 is a potential traffic hazard. The CV telematics network alerts all CV-equipped cars in the vicinity of the potential hazard and sends out in-car dash alerts. However simultaneously the "digital windows" processor 11 in truck 1 sends the camera feed along with an emergency flasher alert to rear display 8 on the truck. Cars 2 and 3 are thus given an advance visual alert revealing both the hidden pedestrian traffic in front of the truck and car 4 illegally crossing the intersection. If cars 2 and 3 were pre-CV production technology they would not have received a red light alert on their dash but would have been able to rely instead on the digital windows early-warning visual display.

Figure 39:
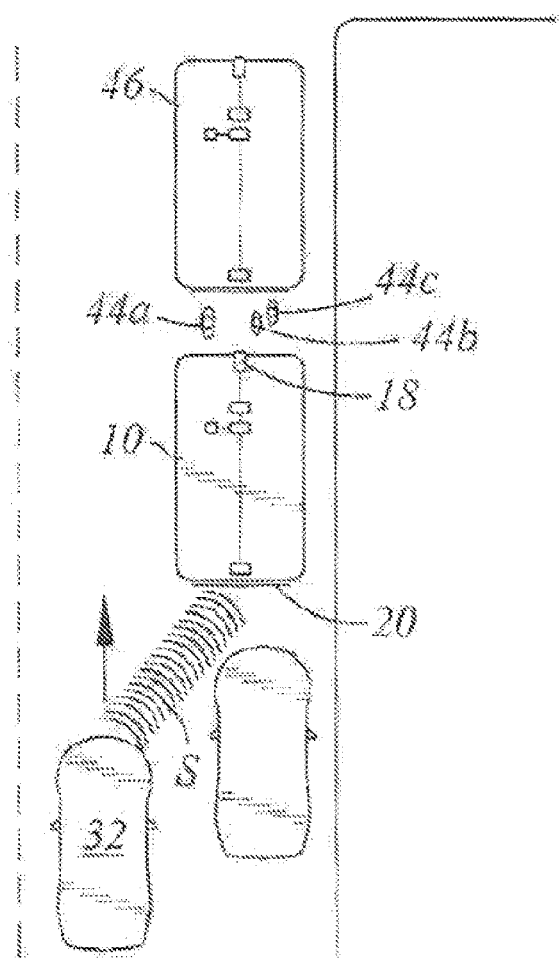
FIG. 39 illustrates a row of vehicles, in accordance with embodiments of the invention.

FIG. 39 illustrates a row of vehicles, in accordance with embodiments of the invention. In particular, FIG. 39 shows a row of parked cars (2, 3 & 4) along the right curb. Car 1 is traveling North at speed. Children are entering the street at 5, hidden from the driver's view in car 1 by car 3. However the presence of the children is sensed by the parking/backing radar of car 6; and optionally by forward-looking radar of car 3, and this movement between parked cars 2 and 3 triggers the digital windows display of both cars: thus at the rear of car 2, digital windows display 7 displays a brilliant bright color alert, while the display 8 of car 3 activates its nose camera 9 to show a real time view of the children silhouetted against the brightly-colored digital display panel of car 2.

Figure 40:
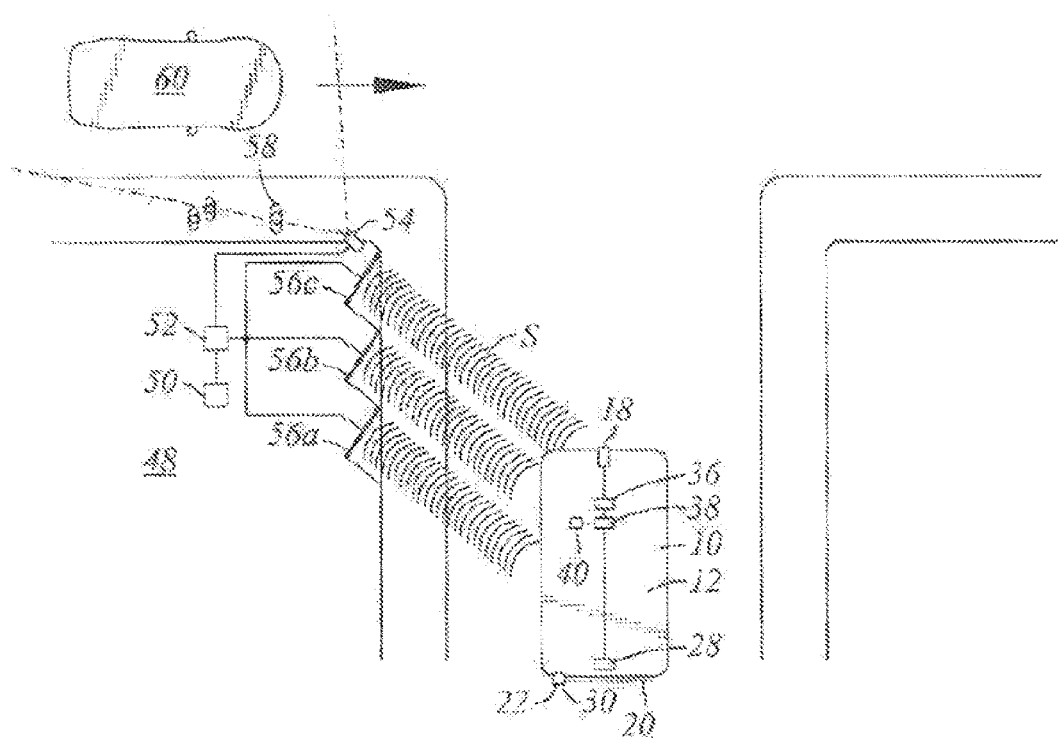
FIG. 40 illustrates a blind entry onto a street, in accordance with embodiments of the invention.

FIG. 40 illustrates a blind entry onto a street, in accordance with embodiments of the invention. In particular, FIG. 40 shows a blind entry onto a street from narrow drive 2, intersecting with sidewalk 3 in a typical downtown parking garage or narrow alleyway with restricted lateral vision for the driver of car 1. To the left of car 1 on the wall of the adjacent structure are three flatscreen monitors 4, 5 & 6 receiving live feeds from blind spot camera 7 which captures a 90 degree field of view which is distributed across the three displays for a wide field view causing pedestrian traffic 8 to become visible along with cross traffic 9, virtually eliminating the left side blind spot Such installations can enable heightened security and traffic safety in areas where it may otherwise be difficult to deal with blind spot obstructions.

Figure 41:
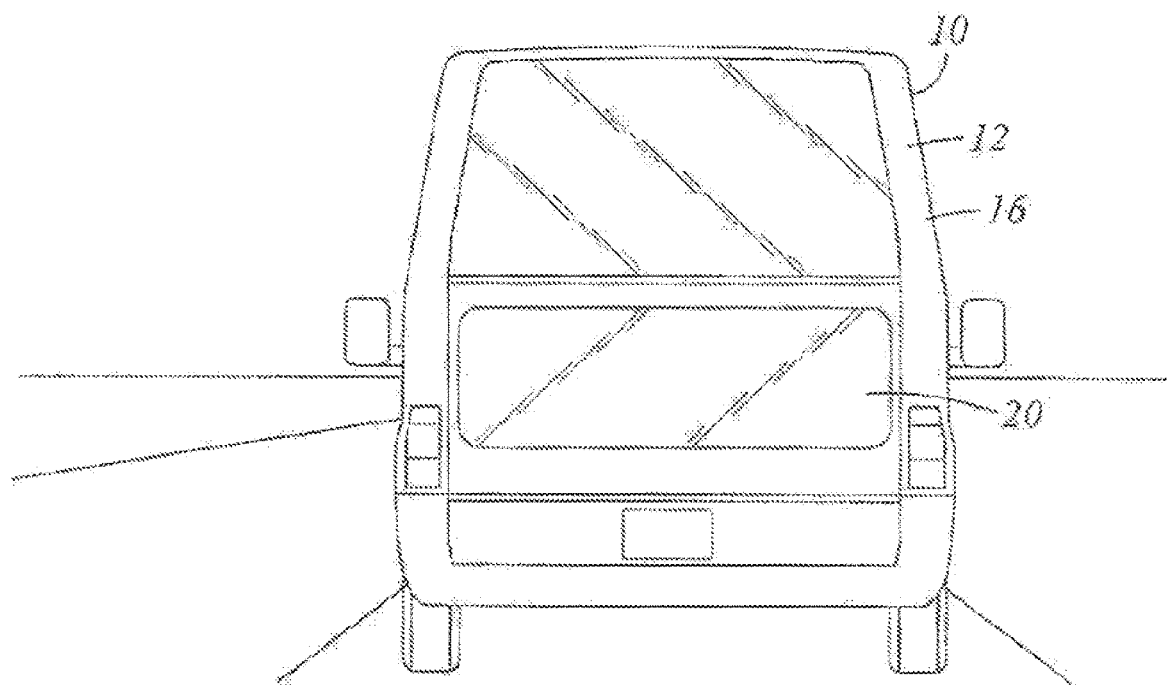
FIGS. 41 and 42 illustrate a see-through system in an activated and an inactivated mode, respectively, in accordance with embodiments of the invention.
Figure 42:
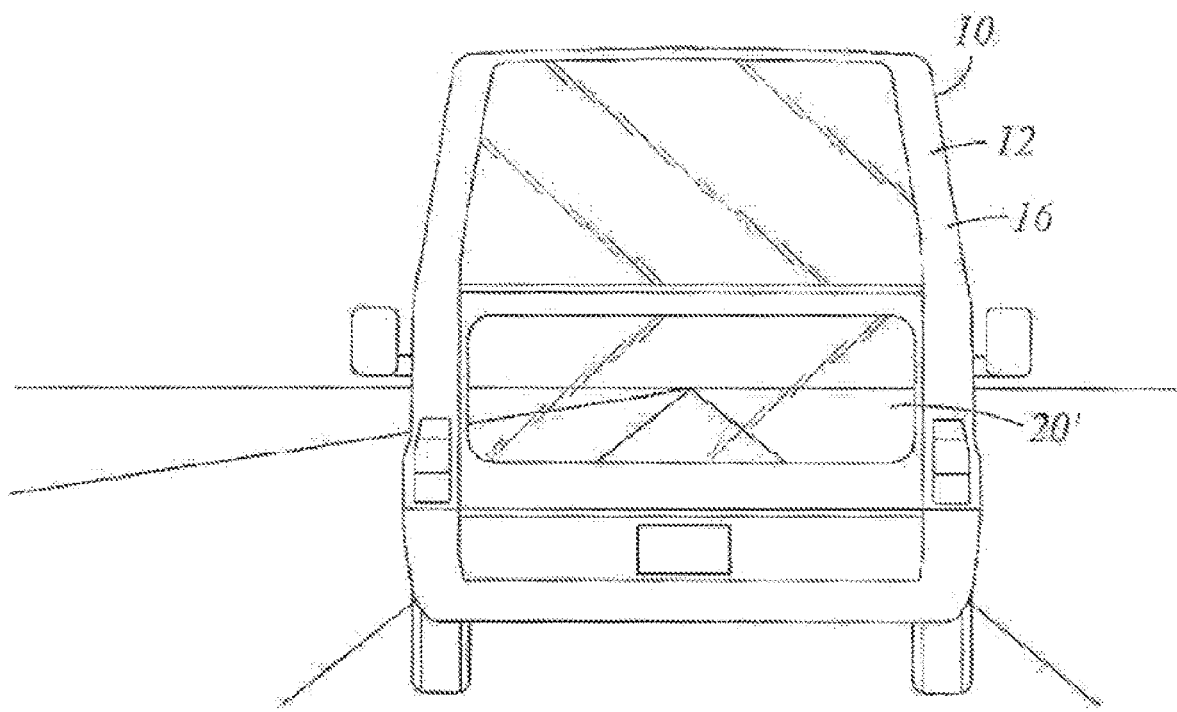

FIGS. 41 and 42 illustrate a see-through system in an activated and an unactivated mode, respectively, in accordance with embodiments of the invention. In particular, FIGS. 41 & 42 show the present invention with the single vehicle see-through system not activated in FIG. 41 and activated in FIG. 42. There are no lighted perimeter frames indicated in this example.

As such, disclosed are systems and methods for creating a form of see-through digital transparency to eliminate blind spots caused by large motor vehicles or fixed objects near roadside while driving, or passing on open or winding roads or negotiating traffic intersections. The invention may capture live video imagery from one side of an obstructing object and stream it in real time to a large display(s) on the opposing 'blind' side creating a window-like opening through any vision blocking structure. Also disclosed are examples for automatic or driver-controlled activation and for the queuing of supplementary public service announcements, V2V/V2I DSRC communications and commercial messages. As such, examples of the invention may improve the safety and operation of motor vehicles when they are closely following vehicles preparing to pass. In particular, examples of the invention may be used to improve safety when large obstructing; vehicles, such as trucks or buses, are on single lanes or winding roads and the driver of another vehicle needs to pass the large vehicle. In these situations, the ability of a car to pass the large vehicle may be minimized due to obstacles, such as large vehicles or other fixed obstructions.

Examples of the invention may improve upon see-through transparency concepts by adding a large outdoor video display to the rear-facing surface(s) of motor vehicles or the faces of blocking structures using the technology. Such a display eliminates the need for wireless real time transmission to other vehicles or positions as well as the need for complex, expensive LCD windshield-mounted displays. The invention is able to place primary functional components onto a single vehicle or into a single offending/blocking object (typically a truck, bus or a roadside architectural obstruction) to enable a more cost-effective, self-contained solution for implementing "blind spot see-through transparency", or what might be called "digital windows."

In exemplary applications, the invention may to expand see-through functionality to all types of moving vehicles, parked vehicles, stalled vehicles, stationary objects, temporary roadside or sidewalk blockages and such common obstructions as new or temporary construction sites with the final objective of enabling clear, real time views of opposing side traffic flow, intersections, blind corners, entries, exits, crosswalks and other areas where a clear unobstructed point-of-view (POV) is critical for driving and traffic safety.

In examples, these applications may be achieved by using video cameras to capture real-time imagery of a scene without the visual blockage (e.g., from the opposite side of such said blockage) then reproducing that, scene on large scale digital video display surfaces which may be attached to, integrated with, or otherwise positioned to replace the obstructed POV with a real-time visually-synchronized digital simulation of the original.

While embodiments of the invention can be passive in operation—or can be 'always ON'—the embodiments of the invention can also be triggered automatically based on specific criteria. Alternatively, it can be operated manually by a presenting vehicle's operator, or by a viewing vehicle's driver, if proven safe and lawful by an occupant of such vehicle. Imagery from the invention can also be triggered automatically by the presence of nearby pedestrians, cyclists, children or pets, by using dedicated presence detection systems (vehicle proximity sensors) or by interacting with independent systems such as car proximity radar or Connected Vehicle (CV) technologies using Dedicated Short Range Communications (DSRC), WiFi, GPS or other Vehicle to Vehicle (V2V) or Vehicle to Infrastructure (V2I) communications systems.

Importantly, where prior art systems have required that both (or all) vehicles or parties using the system be equipped with the communications technology—or that pedestrians or cyclists interacting with such systems use specialized equipment—embodiments of the present invention users to interact within specialized equipment. Additionally, users may benefit without using supporting hardware or software. The invention may also allow motorcycles, bicycles, wheelchair occupants, skateboarders, runners or pedestrians to use and benefit from such a system without the aid of specialized hardware or software.

In examples, the intent of the invention may be to electronically create what appears to be a "window" or "opening" on or through any and all surfaces causing undesirable visual blockages to essential sight lines. In particular, examples may include the rear portions of large motor vehicles which one might encounter on open highways or winding roads and wish to pass; or large moving or static blockages to visual sight lines—on, near, adjacent or tangential to street intersections, parking garages, sidewalks, pedestrian corridors or countless points where serious accidents or fender-benders can typically occur. The intent of the invention may then enable moving vehicles or static visual blockages to become permanently or temporarily transparent to facilitate safer vehicular or pedestrian passage—much as though the blockage did not exist.

Numerous types of video cameras may exist which are capable of cost-effective mounting inside the interior of a car or truck, behind a windshield, contained in an add-on external housing or of being integrated flush with the surfaces of new vehicles as with aircraft. Such cameras can use a wide variety of optics to accommodate a forward-looking field of view (or wide angle) or visual scenario—such as in this case matching the captured point-of-view field of view and scaling its displayed imagery (captured from the far side of a vehicle or obstruction) then scaling that view to a true point-of-view (POV) from a height or viewing position. There may be many cameras with options for optimizing imagery for day vs. night simulations; for driving into direct sunlight; for enhancing night driving with night-vision technologies; and/or for reproducing (or, not reproducing) such views on the desired video displays.

Trucks may have higher apparent elevations above a road surface than automobiles. The higher a point-of-view (POV), the more inclusive the view may be because it offers a more advantageous perspective with an ability to see further over rising or humped terrain contours. Conversely, an unusually high POV or an overly low POV can produce unnatural or undesirable effects, such as restricting surrounding views or causing them to differ from the immediate real world conditions. In examples, the invention may adopt vertical and lateral viewing angles which are the most appropriate for reproducing; (a) the vehicle or POV on which the "digital window" to be simulated, and; (b) the average driver eye-point for the average observing vehicle, so that the viewed image on a moving vehicle (or on a stationary structure) appears consistent and relates as closely as possible to the visible environment, surroundings, terrain and immediate conditions forward of or opposite the obstruction.

Cameras may be moved laterally and/or may be moved to convey a laterally-moving visual field to the monitor. In examples, when a vehicle pulls towards the center of a roadway to pass, or when a vehicle's POV shifts as said vehicle moves past center on a stationary video display, that the imagery can be designed to shift slightly accordingly to extend the lateral viewing range and the reality for a given observer. This may then quickly reset or fade back to its original average POV once a mobile observer passes.

Each application, whether moving or static, may differ as to selected optics, camera, display positioning and properties. However, adequate technical options may exist to reproduce and optimise the most critical and demanding viewing angles and conditions for anticipated purposes. In examples, technical options may exist to provide an immediate, realistic, and reasonably accurate appraisal of conditions on the far side of an obstruction. Beyond this, the human eye and mind may be able to adjust and interpret displayed imagery in terms of actual real world conditions and surroundings.

Additionally, examples of the invention may use in the case of a vehicle-mounted, display a video-capable digital surface appropriate for weather, temperature extremes, resistance to impact, and vibration and be of suitable brightness, power consumption, aspect ratio, curvature and reflectance to conform to the desired vehicle or stationary installations and its appearance and performance specifications. Significant progress may be made in OLED video displays which are suitable for automotive or stationary installations, e.g. needing only economies of scale for production implementation. Additionally, progress may continue in numerous alternative display technologies.

Some examples may reproduce on the visible rear surfaces or rear-facing glazing or video displays of leading or blocking vehicles a "digital window" through which following vehicles can view an accurately scaled, clearly defined, real time representation of the immediate roadway in front of said leading vehicle, including the visual brilliance, contrast, color and illumination to match the immediate surrounding highway or environment.

Other examples may capture a point-of-view (POV) at a height above the roadway surface which simulates, on average, a typical road-viewing height above the surface-corresponding to the average height of the average eye-point above said surface for the most common and highest frequency of vehicles traveled over a given roadway at a given time.

Examples may also accomplish the foregoing with moveable or adjustable optics or point-of-view (POV) devices and systems.

Additionally, examples may resolve the issues of image latency, wireless transmission interference, drop-outs and hacking by using hard-wired connections where possible or internal vehicle-restricted wireless transmissions between front-looking cameras and rear-facing displays.

In some cases, examples may eliminate a driver's need to simultaneously focus on multiple depths of fields (or multiple surfaces) as opposed, to a single area or "window" on a single vehicle (a dedicated video display) within a driver's field of view.

Further, examples may eliminate unnecessary visible distractions caused by latency and the placement of a secondary display in a viewing vehicle by incorporating said display on the exterior surface of an obstructing vehicle or any kind of visual or physical obstruction.

Additional examples may produce a system which requires the upgrading of a single vehicle, or obstructing structure as opposed to upgrading all of the vehicles or personal devices of those who would wish to use it.

Additionally, it may be unwise to allow vehicles to render all or parts of themselves "invisible" while in traffic, whether moving or stopped beside the road. As such, controls for the safe activation of such systems may be mandatory and, accordingly, may be carefully planned and consumer tested to insure safe operations and consistency in terms of deployment and use.

Further, it may be likely that some type of lighted graphic/visual alert may accompany the see-through visual activation to ensure a vehicle doesn't verge on completely "disappearing." This may be accomplished through a brightly-lighted, "outline" or "lightframe" around the perimeter of the see-through digital window. Such a lightframe may be linked to roadside perimeter beacons and, as such, may change colors to differentiate passing zones from no passing zones, and the like. This may also be linked to an instrument panel or heads-up display in the lead vehicle to ad vise its operator of a following vehicle's intent to pass. The lightframe may remain active whenever the see-through window is open to assure that a lead vehicle may not become dangerously invisible to following traffic.

In additional examples, "see-through" a vehicle may not be useful when it is at a far distance from a trailing car. In contrast, a "see-through" effect may be valuable when one is following close and in a position to pass. As such, it may be likely that examples for controlling—and for not allowing under certain circumstances—digital see-through capabilities via manually or automatic operation—and that these be tested and implemented may be based on anticipated V2V/V2I vehicle passing and driving criteria.

A motor vehicle equipped with see-through technology may remain conventionally visible with lighting and safety systems operational at all times. When a second, trailing vehicle reaches a point behind a lead vehicle where it is appropriate to pass, where its closing speed drops off and approximately matches that of the lead vehicle, it may be appropriate to automatically engage the see-through feature as a safety issue and courtesy. This may allow the trailing vehicle to see through to the highway beyond, yet may not be demanding that a passing should take place, in the event a speeding vehicle closes very quickly, a digital window-equipped leading vehicle might first flash a precautionary warning (e.g., a color bar or similar visual alert, for example) and perhaps next open the see-through window, perhaps accompanied by the previously discussed perimeter lighted/color frame to indicate the clear boundaries of the window and the presence of the leading vehicle. This feature may be used for night driving where the displayed, image of approaching headlights beyond the subject, vehicle might be misread as reflections in rear glazing from headlamps approaching from the rear. To avoid the latter, angling the top edge of the display (or its glazed surface) rearward, and inward at the bottom, or curving the glass into a convex shape top to bottom, may minimize, eliminate or condense such reflections.

Separately or in conjunction with the above, it may prove wise to also provide cars and drivers with a manual use for self-activating digital windows in vehicles ahead of them. One way to accomplish this may be to link, the turn signal, control of a following vehicle to a wireless transmission signal such as DSRC to the digital windows system of a vehicle immediately ahead. This way, driver "intent" may open the digital window. A following vehicle, upon engaging its passing turn signal, may send a DSRC transmission to the forward vehicle activating its rear-facing display and it's perimeter marker. This may also alert any vehicles to the rear.

Another way to accomplish display activation while maintaining a single vehicle, self-contained system is to use an optical sensor built into the mar-facing digital display which is able to read and interpret the left and right turn signals as soon as they are activated by a driver intending to pass. Upon such, detection, if all other parameters (such, as speed, proximity, clear road ahead, weather, road, light and other conditions) are safe for passing, then the turn signal on the passing car shall activate the see-through digital window.

When a following vehicle pulls out to pass, the DSRC signal may cancel the digital window and restore the normal view of the lead vehicle's rear surface. Manual activation may also be managed by the addition of a dedicated. On/Off button on the steering wheel, of viewing vehicles, or via an App downloaded and used in the car via portable device, touch pad, tablet or integrated Apps designed to synchronize portables with a car's native systems—such as Sony's "mirroring" system or as Apple's CarPlay System.

Pending consumer safety and road testing such controls may be used to automatically shut off the digital window after a predetermined viewing period assuming a driver in a following vehicle has opted not to pass. This may be accomplished in some embodiments with, a timed circuit (incorporated as part of any "invisibility" command). It may also allow a following driver to temporarily take a "see-through" glimpse of traffic or conditions immediately beyond a blocking vehicle to see if passing was indeed warranted—or learn what might be causing a lengthy delay—but may then automatically disengage and return to the original or opaque surface. If a following driver desires another look, he/she may tap the button/control again. Such communications may be accomplished using narrow-angle line-of-sight optical or DSRC communications between a leading and immediately following vehicle when these vehicles are in tandem occupying a single, common traffic lane. During such periods when tandem vehicles are stopped (or paused within acceptable parameters) a following vehicle might opt to use a digital window to call up the vehicle's license & registration, company data, or using his own on-board profile via DSRC requests, temporarily borrow the leading vehicle's display surface to search, present or review personal audio/video material or documents.

Because the opening of a digital window may imply that it is safe to pass, development and testing may be developed to confirm: (a) whether digital windows should open accompanied by some form of UNSAFE TO PASS announcement superimposed over the view, when that is the case; (b) whether some kind of graphic indicator is necessary to indicate approaching vehicles, detected objects, potholes, ice, snow, animals or other potential hazards; (c) whether digital windows should open/not open with respect the road itself, weather conditions, surface conditions, local traffic, time of day, historic location criteria, approved passing zones and other factors. However, when digital windows open they may be an advantage and may likely be accompanied, as precautionary measure, by the previously described lighframe or a defined/lighted perimeter so that the presence of a transparent opening does not create a hazard greater than the temporarily obscured view itself.

Systems may exist to measure and locate objects within specific proximities of motor vehicles and then take evasive or informative actions. Backup camera systems may scan a rear view for a driver and proximity radars which can sense and engage actions such as warning lights, sounds, haptic effects such as vibrating seats or steering wheels, or by simply applying the vehicle's brakes are examples. In examples, it may be appropriate to use such systems to determine the distance and speed of approaching vehicles both from in front and rear, and then take specific actions such as: activating the digital window (perhaps with the confirmation of other data points); alerting the operator of the lead vehicle that a following vehicle is preparing to pass; receiving signals from a following vehicle that a turn signal is now activate (intent); and/or receiving an alert that a following vehicle has manually opened a digital window.

Additionally, using facial recognition software/algorithms can identify people from video imagery. In examples, it may be easier to identify the make, model, year and even the condition of a motor vehicle (just as a person would be able to) and use this information to present certain types of commercial messages. If a license plate is identifiable, the vehicle may be related to a database or profile in order to direct more specific messages to specific individuals. As such, it may be possible to target certain messages to vehicle drivers—or pedestrians—as they look at digital windows, providing it is safe to do so—for example when stopped at a traffic light. Further, knowing the make, model, year or condition of a motor vehicle when preparing to pass can be used to assess a vehicle's capacity to pass (at various speeds, under various roads grades, conditions, etc). As such, passing and safety assessments and corresponding alerts may also be derived.

The same kinds or video or optical technologies can be used to determine when a following vehicle is preparing to pass, is moving laterally or has moved clear into the adjacent (passing) lane—and can then use this data to automatically terminate the digital window so that it doesn't distract or mislead other following vehicles.

Additionally, whether a vehicle surface—or the face of a stationary structure—imagery from digital display surfaces may be capable of presenting a broad range of audio/visual and animated visual messages, photographic images or flash alerts, by superimposing such imagery over a real time video stream. In other words, the area of the digital window can be used for anything from television and personal email to attention-grabbing business or emergency messages day or night, rain or shine.

Connected Vehicle/DSRC systems can indicate the arrival or presence of Emergency Vehicles at a busy intersection, detect a vehicle running a stop light, or if a large digital windows-equipped city bus or truck is present and blocking driver views of pedestrians or vehicular cross traffic (speeding cars, jaywalkers, children, motorcycles or bikes), then digital windows can also instantly activate large-scale attention-grabbing flashing light-bars or color areas, each having specific meanings or add large scale text superimposed over a clear views of the immediate surroundings. The same Connected Vehicle/DSRC systems can also be used to monitor and highlight moving or parked cars and trucks and the spaces between them. If, for example, children, pets, or inattentive adults wonder into the street perhaps unseen by approaching motorists, or if a vehicle is backing from a driveway across a sidewalk/into the street, then such systems, together with new car proximity radars can detect such intrusions and instantly queue the appropriate alert message on the digital windows display. For example, if a child were to enter the street between parked cars where street traffic is closing, and the parked cars are equipped with see-through digital windows, then the most distant car (forward of the child) could flash a brilliant color panel (alerting both the kids to oncoming traffic and alerting the approaching driver to the concealed kids, at the same time the closest parked car could engage its forward-looking camera revealing the moving child against the flashing backdrop, all framed by its brightly-colored perimeter frame. The presence of movement between parked cars (kids, adults, pets, etc) can be detected by today's backing radar systems and their output used to trigger digital windows displays. Such alerts are far superior to today's anticipated CV instrument panel red-light alert because they directly link the emergency alert with the source or location of the problem or issue. Non-specific or general use flashing red lights or LED bars on a vehicle's IP (instrument panel) is non-specific as to the type or precise location of a potential threat or collision resulting in a two-stage driver response: first to associate the red light on the dash with an emergency, and second to locate the cause or source of that emergency in one's field of view or in the real world. Digital windows, on the other hand, immediately reveals the source or approximate visual location of an event even when the actual cause (the child) may still be beyond view.

Additional see-through digital windows CV (connected vehicle) capabilities may also be provided, such as presenting large-scale visual warnings and information on the exterior surfaces of proximity-targeted vehicles; linking in-car CV alerts to real-lime/real-world events and vehicles within a driver's field of view; allowing surrounding HDS-equipped vehicles to reveal & highlight the presence of pedestrians, cyclists, children or pets w/o requiring them to carry wireless transponders or smartphones; allowing the invention to be used not only by automobiles, but also by motorcyclists, bicyclists, AD A/wheelchair occupants, skateboarders, runners or pedestrians, whether elderly or a child, without the aid of supporting hardware or software, and who's view of a hazardous situation might otherwise be blocked; graphically standardizing & visually daisy-chaining lanes of moving traffic to dramatically improve highway collaborative communications; presenting CV urgent warnings non-intrusively & naturally on the surfaces of impending hazard(s) in a driver's field of view; enabling landmark eyes-on-the-road/hawk-on-the wheel personal display experiences capable of mitigating interior and exterior driver distractions; safely presenting hyper-relevant HDTV video content to the drivers of motor vehicles which are invisible to unintended motorists; enabling marketable/mandate-able alternatives for controlling commercial roadside digital signage and distractions; and/or delivering automotive FMVSS lighting, branding, design upgrades. DMV licensing and registrations via wireless downloads (like iPhones).

While preferred embodiments of the invention have been shown and described herein, it may be obvious to those skilled in the art that such embodiments are provided by way of example only. Numerous variations, changes, and substitutions may now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A vehicle display system for a first vehicle comprising:
   one or more visual display portions detachably coupled to an exterior of the first vehicle, wherein the one or more visual display portions are configured to show digital content and includes a light emitting portion and a covering portion;
   one or more cameras affixed to the first vehicle and configured to capture images of surrounding vehicles;
   one or more computer-readable mediums configured to store computer-executable instructions; and
   one or more processors, wherein the computer-executable instructions are configured for execution by the one or more processors to cause the system to:
      capture, via the one or more cameras, first images of at least one surrounding vehicle while the first vehicle is travelling along a travel route, wherein the at least one surrounding vehicle includes a second vehicle, and wherein the travel route is associated with a user account and the first vehicle is configured to be transmitted to an advertising server;
      transmit, to the advertising server while the first vehicle is travelling along the travel route, first images, wherein an advertising service is configured to apply vehicle-recognition software to the first images to determine:
         (1) at least a make and a model of the second vehicle, and
         (2) a physical location of the second vehicle relative to the first vehicle;
      receive, from the advertising server, instructions indicating digital content for display by the one or more visual display portions, wherein the digital content is based at least in part on the second vehicle and first content provided by a first content provider, wherein the first content provider provides, to the advertising server, the first content to be shown on the one or more visual display portions while the first vehicle traverses the travel route; and
      while the first vehicle is traversing the travel route, transmit a signal to the one or more visual display portions to cause display of the digital content when the second vehicle is able to view the one or more visual display portions based at least on the second vehicle's relative physical position to the first vehicle.

2. The system of claim 1, wherein the covering portion includes a glass cover.

3. The system of claim 1, wherein the covering portion is configured to protect the light emitting portion from the environment.

4. The system of claim 1, wherein the visual display portion includes curvature over at least two non-parallel directions.

5. The system of claim 1, wherein the visual display portion has a resolution of a least 300 ppi.

6. The system of claim 1, further comprising a communication unit, configured to communicate with an external device, wherein the visual display portion is configured to show the content based on communications with the external device.

7. The system of claim 6, wherein the communications with the external device include the content to be displayed on the visual display portion.

8. The system of claim 1, wherein the one or more requests from the one or more content providers include a financial bid to provide the content for the travel route.

9. The system of claim 8, wherein the selection of the at least one content provider occurs with aid of the one or more processors, based on the financial bid to provide the content for the travel route.

10. The system of claim 1, wherein the one or more processors are configured to execute the computer-executable instructions to further cause the system to: (1) access, after the first vehicle has started traversing the travel route, at least one additional request from at least one additional content provider to provide content to be shown on the one or more visual display portions of the first vehicle while the first vehicle traverses the travel route, and (2) pre-emptively show, on the display, a second set of content different from the content received from the first content provider, when the additional content provider provides a higher priority request.

11. The system of claim 10, wherein the higher priority request includes a financial bid that is greater than an initial financial bid by the first content provider.

12. The system of claim 1, wherein the one or more processors are configured to execute the computer-executable instructions to further cause the system to:

access a database comprising marketing information, wherein the marketing information is tailored to specific makes and models of vehicles; and further affect the digital content based at least in part on the marketing information.

13. The system of claim 1, further comprising:

a transmitter; and wherein the one or more processors are configured to execute the computer-executable instructions to further cause the system to:

access a database comprising security information, wherein the security information includes information related to stolen vehicles and vehicles of interest for potential police work;

detect a surrounding vehicle that matches at least a portion of the security information; and transmit, via the transmitter, information related to the detected surrounding vehicle, time detected, and location detected to a relevant law enforcement agency.

14. The system of claim 1, wherein the one or more visual display portions is coupled to a first tailgate that is detachably coupled to the exterior of the first vehicle.

15. The system of claim 14, wherein the first vehicle is configured to detachably couple to a second tailgate as long as the first tailgate is not detachably coupled to the first vehicle.

16. The system of claim 15, wherein the second tailgate includes a visual display configured to show content.

17. The system of claim 1, wherein the one or more processors further cause the system to:

receive, from the advertising server, the travel route that is configured to optimize an audience to which digital content is displayed via the one or more visual display portions, wherein the travel route includes at least three of the following: a GPS-defined starting point, a GPS-defined final destination, time-of-day, predicted demographics of drivers or pedestrians along the travel route, weather, terrain, traffic conditions, or traffic signals.

18. The system of claim 17, wherein the one or more processors further cause the system to:

determine that the first vehicle is travelling on an altered travel route that is not the travel route; and transmit, to the advertising server, a notification indicating that the first vehicle is travelling on the altered travel route.

19. The system of claim 17, wherein the digital content is also based at least in part on the travel route.

\* \* \* \* \*